United States Patent
Ferguson et al.

(10) Patent No.: US 6,941,301 B2
(45) Date of Patent: Sep. 6, 2005

(54) PRE-PROCESSING INPUT DATA WITH OUTLIER VALUES FOR A SUPPORT VECTOR MACHINE

(75) Inventors: Bruce Ferguson, Round Rock, TX (US); Eric Hartman, Austin, TX (US)

(73) Assignee: Pavilion Technologies, Inc., Austin, TX (US)

( * ) Notice: Subject to any disclaimer, the term of this patent is extended or adjusted under 35 U.S.C. 154(b) by 645 days.

(21) Appl. No.: 10/051,266

(22) Filed: Jan. 18, 2002

(65) Prior Publication Data

US 2003/0140039 A1 Jul. 24, 2003

(51) Int. Cl.[7] .............................................. G06F 17/30
(52) U.S. Cl. .............................. 707/4; 707/6; 707/102
(58) Field of Search ........................... 707/1–100, 102, 707/104.1; 706/16, 19–22, 25–26; 703/2

(56) References Cited

U.S. PATENT DOCUMENTS

| | | | |
|---|---|---|---|
| 5,299,284 A | | 3/1994 | Roy |
| 5,553,616 A | | 9/1996 | Ham et al. |
| 5,581,629 A | | 12/1996 | Hanna et al. |
| 5,729,661 A | | 3/1998 | Keeler et al. |
| 5,752,007 A | | 5/1998 | Morrison |
| 5,842,189 A | | 11/1998 | Keeler et al. |
| 6,151,593 A | | 11/2000 | Cho et al. |
| 6,289,328 B2 | * | 9/2001 | Shaffer ........................ 706/20 |
| 6,714,925 B1 | * | 3/2004 | Barnhill et al. ............... 706/48 |
| 2002/0107858 A1 | * | 8/2002 | Lundahl et al. ............. 707/100 |

OTHER PUBLICATIONS

Zhang, Xuegong "Using Class–Center Vectors to Build Support Vector Machines", Proceedings of the 1999 IEEE Signal Processing Society Workshop, Aug. 23, 1999, pp. 3–11.
International Search Report, Application No. PCT/US 03/01372, mailed Apr. 10, 2003.

* cited by examiner

*Primary Examiner*—Charles Rones
*Assistant Examiner*—Neveen Abel-Jalil
(74) *Attorney, Agent, or Firm*—Meyertons Hood Kivlin Kowert & Goetzel, P.C.; Jeffrey C. Hood

(57) ABSTRACT

A system and method for preprocessing input data to a support vector machine (SVM). The SVM is a system model having parameters that define the representation of the system being modeled, and operates in two modes: run-time and training. A data preprocessor preprocesses received data in accordance with predetermined preprocessing parameters, and outputs preprocessed data. The data preprocessor includes an input buffer for receiving and storing the input data. The input data may include one or more outlier values. A data filter detects and removes any outlier values in the input data, generating corrected input data. The filter may optionally replace the outlier values in the input data. An output device outputs the corrected data from the data filter as preprocessed data. The corrected data may be input to the SVM in training mode to train the SVM, and/or in run-time mode to generate control parameters and/or predictive output information.

36 Claims, 35 Drawing Sheets

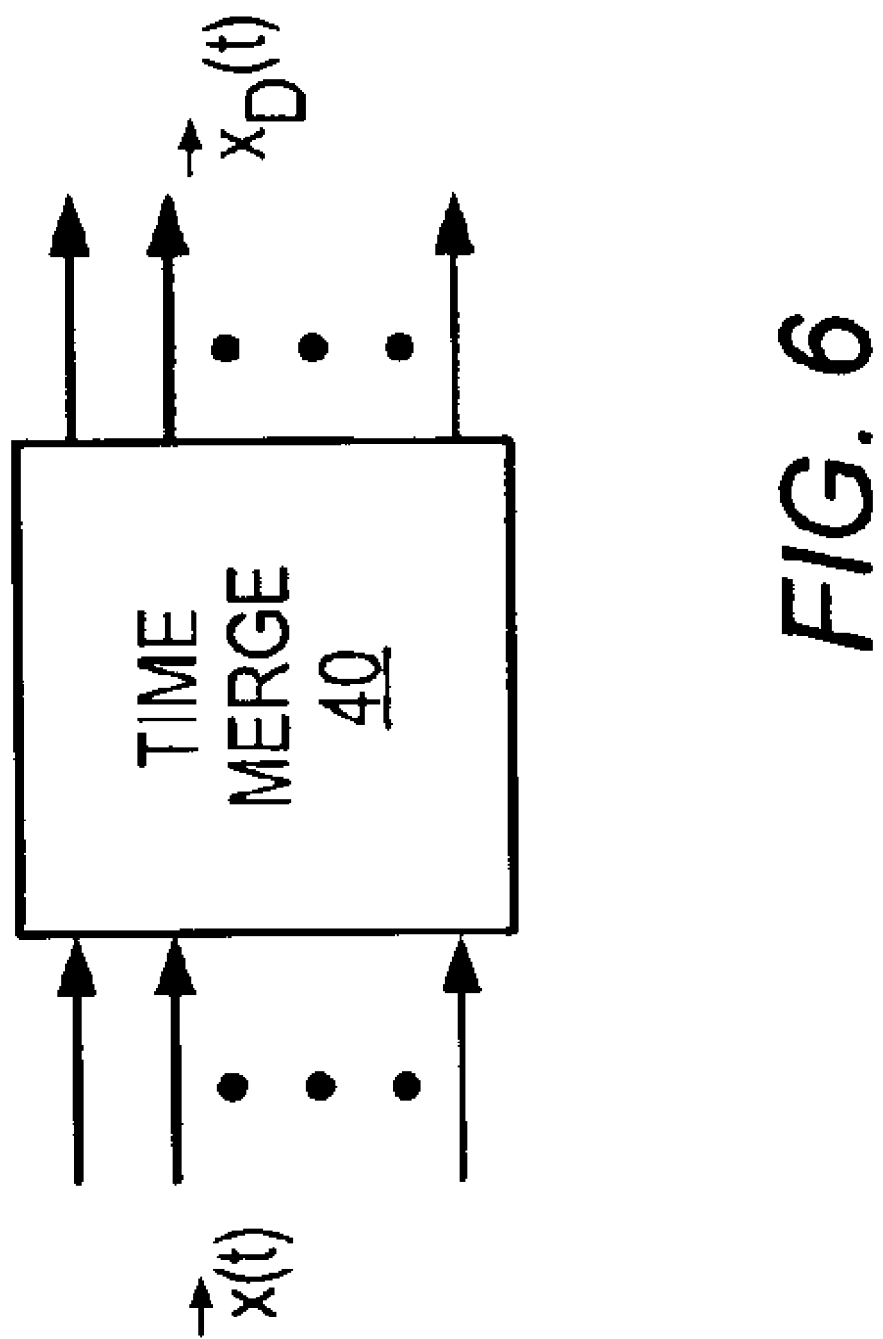

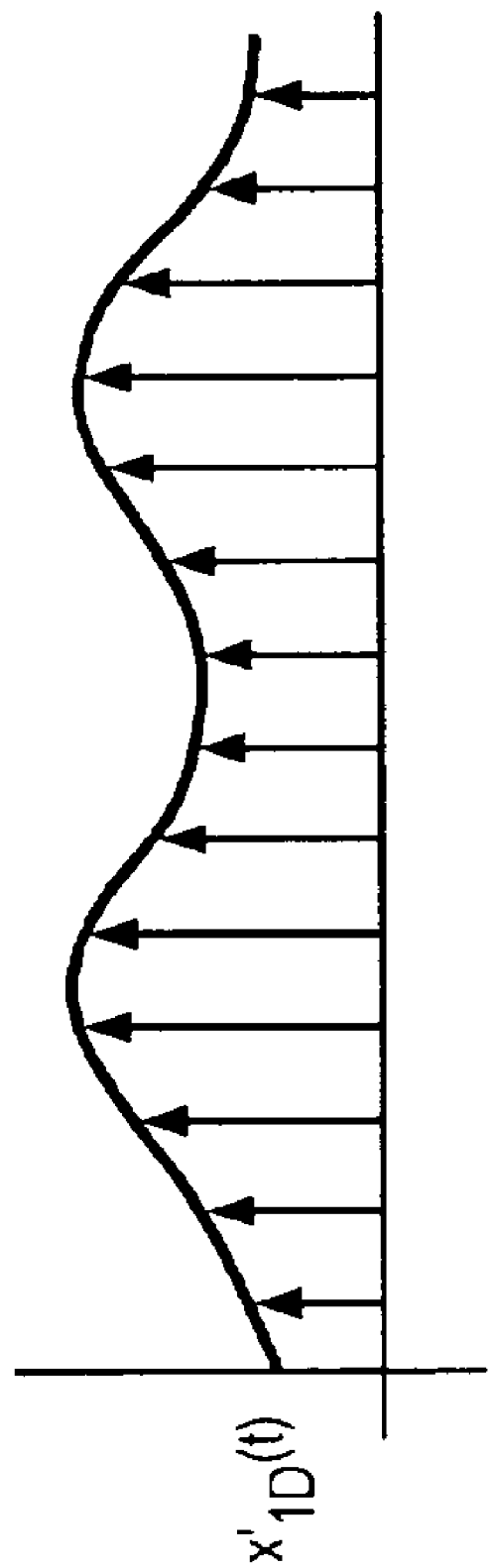

TABLE 1

| Name | DATE_1 | TIME_1 | temp1 | press1 | DATE_2 | TIME_2 | flow1 | temp2 |
|---|---|---|---|---|---|---|---|---|
| Row | Col 1 | Col 2 | Col 3 | Col 4 | Col 5 | Col 6 | Col 7 | Col 8 |
| 36 | 1/2/92 | 12:00:59 | 81.87 | 1552.80 | 1/3/92 | 23:00:59 | 1211.00 | 276.95 |
| 37 | 1/2/92 | 13:00:59 | 58.95 | 1489.19 | 1/4/92 | 01:00:59 | 1210.90 | 274.44 |
| 38 | 1/2/92 | 14:00:59 | 83.72 | 1558.00 | 1/4/92 | 3:00:591 | 1211.09 | 277.38 |
| 39 | 1/2/92 | 15:00:59 | 53.72 | 1474.40 | 1/4/92 | 5:01:00 | 1210.69 | 274.01 |

TABLE 2

| Name | DATE_1 | TIME_1 | temp1 | press1 | DATE_2 | TIME_2 | flow1 | temp2 |
|---|---|---|---|---|---|---|---|---|
| Row | Col 1 | Col 2 | Col 3 | Col 4 | Col 5 | Col 6 | Col 7 | Col 8 |
| 36 | 1/2/92 | 12:00:59 | 1.91 | 1552.80 | 1/3/92 | 23:00:59 | 1211.00 | 276.95 |
| 37 | 1/2/92 | 13:00:59 | 1.77 | 1489.19 | 1/4/92 | 01:00:59 | 1210.90 | 274.44 |
| 38 | 1/2/92 | 14:00:59 | 1.92 | 1558.00 | 1/4/92 | 3:00:591 | 1211.09 | 277.38 |
| 39 | 1/2/92 | 15:00:59 | 1.73 | 1474.40 | 1/4/92 | 5:01:00 | 1210.69 | 274.01 |

PROPERTIES 2 markcut(temp1, 1, 2068, 920.844325,1600000000000000000000000.000000)
markcut(temp1, 1, 58, 73, −1600000000000000000000000.00000001,600000000000000000000000
$log(temp1)

TABLE 3

| Name | DATE | time | temp1 | press1 | flow1 | temp2 | press2 | flow2 |
|---|---|---|---|---|---|---|---|---|
| Row |  | Col 1 | Col 2 | Col 3 | Col 4 | Col 5 | Col 6 | Col 7 |
| 36 | 1/2/92 | 12:00:00 | 1.87 | 1530.00 | 1211.69 | 274.50 | 2160.00 | 533.29 |
| 37 | 1/2/92 | 13:00:00 | 1.87 | 1530.00 | 1211.69 | 274.50 | 2160.00 | 533.29 |
| 38 | 1/2/92 | 14:00:00 | 1.87 | 1530.00 | 1211.69 | 274.50 | 2160.00 | 533.29 |
| 39 | 1/2/92 | 15:00:00 | 1.87 | 1530.00 | 1211.69 | 274.50 | 2160.00 | 533.29 |

PROPERTIES 3 markcut(temp1, 1, 2068, 938.633160,1600000000000000000000000.000000)
markcut(temp1, 57, 71, −1600000000000000000000000.00000001,600000000000000000000000
$log(temp1)
tmerge(temp1, time, 0, 1666666666634177413120.000000)

TABLE 4

| Name | DATE | time | temp1 | press1 | flow1 | temp2 | press2 | flow2 |
|---|---|---|---|---|---|---|---|---|
| Row |  | Col 1 | Col 2 | Col 3 | Col 4 | Col 5 | Col 6 | Col 7 |
| 36 | 1/2/92 | 12:00:00 | 5001.87 | 1530.00 | 1211.69 | 274.50 | 2160.00 | 533.29 |
| 37 | 1/2/92 | 13:00:00 | 5001.87 | 1530.00 | 1211.69 | 274.50 | 2160.00 | 533.29 |
| 38 | 1/2/92 | 14:00:00 | 5001.87 | 1530.00 | 1211.69 | 274.50 | 2160.00 | 533.29 |
| 39 | 1/2/92 | 15:00:00 | 5001.87 | 1530.00 | 1211.69 | 274.50 | 2160.00 | 533.29 |

PROPERTIES 4 markcut(temp1, 1, 2068,938.633160,1600000000000000000000000.000000)
markcut(temp1, 57, 71, −1600000000000000000000000.00000001.600000000000000000000000)
$log(temp1)
tmerge (temp1, time, 0, 1666666666634177413120.0000000)
temp1 + 5000

DELAY SELECTION DISPLAY

| TIME | TEMP1 | PRESS1 | FLOW-RATE1 | TEMP2 | PRESS2 | FLOW-RATE2 | TEMP3 | PRESS3 | FLOW-RATE3 | PPM |
|---|---|---|---|---|---|---|---|---|---|---|
| -4.5 | INPUT | | | | | | | | | |
| -4.0 | INPUT | INPUT | | | | | | | | |
| -3.5 | INPUT | INPUT | INPUT | | | | | | | |
| -3.0 | | INPUT | INPUT | INPUT | | | | | | |
| -2.5 | | | INPUT | INPUT | INPUT | | | | | |
| -2.0 | | | | INPUT | INPUT | INPUT | | | | |
| -1.5 | | | | | INPUT | INPUT | INPUT | | | |
| -1.0 | | | | | | INPUT | INPUT | INPUT | | |
| -0.5 | | | | | | | INPUT | INPUT | INPUT | |
| 0.0 | | | | | | | | INPUT | INPUT | |
| 0.5 | | | | | | | | | INPUT | OUTPUT |
| 1.0 | | | | | | | | | | OUTPUT |
| 1.5 | | | | | | | | | | OUTPUT |

PRE-PROCESSING INPUT DATA WITH OUTLIER VALUES FOR A SUPPORT VECTOR MACHINE

BACKGROUND OF THE INVENTION

1. Field of the Invention

The present invention relates generally to the field of predictive system models. More particularly, the present invention relates to preprocessing of input data so as to correct for different time scales, transforms, missing or bad data, and/or time-delays prior to input to a support vector machine for either training of the support vector machine or operation of the support vector machine.

2. Description of the Related Art

Many predictive systems may be characterized by the use of an internal model which represents a process or system for which predictions are made. Predictive model types may be linear, non-linear, stochastic, or analytical, among others. However, for complex phenomena non-linear models may generally be preferred due to their ability to capture non-linear dependencies among various attributes of the phenomena. Examples of non-linear models may include neural networks and support vector machines (SVMs).

Generally, a model is trained with training data, e.g., historical data, in order to reflect salient attributes and behaviors of the phenomena being modeled. In the training process, sets of training data may be provided as inputs to the model, and the model output may be compared to corresponding sets of desired outputs. The resulting error is often used to adjust weights or coefficients in the model until the model generates the correct output (within some error margin) for each set of training data. The model is considered to be in "training mode" during this process. After training, the model may receive real-world data as inputs, and provide predictive output information which may be used to control the process or system or make decisions regarding the modeled phenomena. It is desirable to allow for pre-processing of input data of predictive models (e.g., non-linear models, including neural networks and support vector machines), particularly in the field of e-commerce.

Predictive models may be used for analysis, control, and decision making in many areas, including electronic commerce (i.e., e-commerce), e-marketplaces, financial (e.g., stocks and/or bonds) markets and systems, data analysis, data mining, process measurement, optimization (e.g., optimized decision making, real-time optimization), quality control, as well as any other field or domain where predictive or classification models may be useful and where the object being modeled may be expressed abstractly. For example, quality control in commerce is increasingly important. The control and reproducibility of quality is be the focus of many efforts. For example, in Europe, quality is the focus of the ISO (International Standards Organization, Geneva, Switzerland) 9000 standards. These rigorous standards provide for quality assurance in production, installation, final inspection, and testing of processes. They also provide guidelines for quality assurance between a supplier and customer.

A common problem that is encountered in training support vector machines for prediction, forecasting, pattern recognition, sensor validation and/or processing problems is that some of the training/testing patterns may be missing, corrupted, and/or incomplete. Prior systems merely discarded data with the result that some areas of the input space may not have been covered during training of the support vector machine. For example, if the support vector machine is utilized to learn the behavior of a chemical plant as a function of the historical sensor and control settings, these sensor readings are typically sampled electronically, entered by hand from gauge readings, and/or entered by hand from laboratory results. It is a common occurrence in real-world problems that some or all of these readings may be missing at a given time. It is also common that the various values may be sampled on different time intervals. Additionally, any one value may be "bad" in the sense that after the value is entered, it may be determined by some method that a data item was, in fact, incorrect. Hence, if a given set of data has missing values, and that given set of data is plotted in a table, the result may be a partially filled-in table with intermittent missing data or "holes". These "holes" may correspond to "bad" data or "missing" data.

Conventional support vector machine training and testing methods require complete patterns such that they are required to discard patterns with missing or bad data. The deletion of the bad data in this manner is an inefficient method for training a support vector machine. For example, suppose that a support vector machine has ten inputs and ten outputs, and also suppose that one of the inputs or outputs happens to be missing at the desired time for fifty percent or more of the training patterns. Conventional methods would discard these patterns, leading to no training for those patterns during the training mode and no reliable predicted output during the run mode. The predicted output corresponding to those certain areas may be somewhat ambiguous and/or erroneous. In some situations, there may be as much as a 50% reduction in the overall data after screening bad or missing data. Additionally, experimental results have shown that support vector machine testing performance generally increases with more training data, therefore throwing away bad or incomplete data may decrease the overall performance of the support vector machine.

Another common issue concerning input data for support vector machines relates to situations when the data are retrieved on different time scales. As used herein, the term "time scale" is meant to refer to any aspect of the time-dependency of data. As is well known in the art, input data to a support vector machine is generally required to share the same time scale to be useful. This constraint applies to data sets used to train a support vector machine, i.e., input to the SVM in training mode, and to data sets used as input for run-time operation of a support vector machine, e.g., input to the SVM in run-time mode. Additionally, the time scale of the training data generally must be the same as that of the run-time input data to insure that the SVM behavior in run-time mode corresponds to the trained behavior learned in training mode.

In one example of input data (for training and/or operation) with differing time scales, one set of data may be taken on an hourly basis and another set of data taken on a quarter hour (i.e., every fifteen minutes) basis. In this case, for three out of every four data records on the quarter hour basis there will be no corresponding data from the hourly set. Thus, the two data sets are differently synchronous, i.e., have different time scales.

As another example of different time scales for input data sets, in one data set the data sample periods may be non-periodic, producing asynchronous data, while another data set may be periodic or synchronous, e.g., hourly. These two data sets may not be useful together as input to the SVM while their time-dependencies, i.e., their time scales, differ. In another example of data sets with differing time scales, one data set may have a "hole" in the data, as described above, compared to another set, i.e., some data may be missing on one of the data sets. The presence of the hole may be considered to be an asynchronous or anomalous time interval in the data set, and thus may be considered to have an asynchronous or inhomogeneous time scale.

In yet another example of different time scales for input data sets, two data sets may have two different respective time scales, e.g., an hourly basis and a 15 minute basis. The desired time scale for input data to the SVM may have a third basis, e.g., daily.

While the issues above have been described with respect to time-dependent data, i.e., where the independent variable of the data is time, t, these same issues may arise with different independent variables. In other words, instead of data being dependent upon time, e.g., D(t), the data may be dependent upon some other variable, e.g., D(x).

In addition to data retrieved over different time periods, data may also be taken on different machines in different locations with different operating systems and quite different data formats. It is essential to be able to read all of these different data formats, keeping track of the data values and the timestamps of the data, and to store both the data values and the timestamps for future use. It is a formidable task to retrieve these data, keeping track of the timestamp information, and to read it into an internal data format (e.g., a spreadsheet) so that the data may be time merged.

Inherent delays in a system is another issue which may affect the use of time-dependent data. For example, in a chemical processing system, a flow meter output may provide data at time $t_0$ at a given value. However, a given change in flow resulting in a different reading on the flow meter may not affect the output for a predetermined delay $\tau$. In order to predict the output, this flow meter output must be input to the support vector machine at a delay equal to $\tau$. This must also be accounted for in the training of the support vector machine. Thus, the timeline of the data must be reconciled with the timeline of the process. In generating data that account for time delays, it has been postulated that it may be possible to generate a table of data that comprises both original data and delayed data. This may necessitate a significant amount of storage in order to store all of the delayed data and all of the original data, wherein only the delayed data are utilized. Further, in order to change the value of the delay, an entirely new set of input data must be generated from the original set.

Thus, improved systems and methods for preprocessing data for training and/or operating a support vector machine are desired.

SUMMARY OF THE INVENTION

A system and method are presented for preprocessing input data to a non-linear predictive system model based on a support vector machine. The system model may utilize a support vector machine having a set of parameters associated therewith that define the representation of the system being modeled. The support vector machine may have multiple inputs, each of the inputs associated with a portion of the input data. The support vector machine parameters may be operable to be trained on a set of training data that is received from training data and/or a run-time system such that the system model is trained to represent the run-time system. The input data may include a set of target output data representing the output of the system and a set of measured input data representing the system variables. The target data and system variables may be reconciled by the preprocessor and then input to the support vector machine.

A training device may be operable to train the support vector machine according to a predetermined training algorithm such that the values of the support vector machine parameters are changed until the support vector machine comprises a stored representation of the run-time system. Note that as used herein, the term "device" may refer to a software program, a hardware device, and/or a combination of the two.

In one embodiment of the present invention, the system may include a data storage device for storing training data from the run-time system. The support vector machine may operate in two modes, a run-time mode and a training mode. In the run-time mode, run-time data may be received from the run-time system. Similarly, in the training mode, data may be retrieved from the data storage device, the training data being both training input data and training output data. A data preprocessor may be provided for preprocessing received (i.e., input) data in accordance with predetermined preprocessing parameters to output preprocessed data. The data preprocessor may include an input buffer for receiving and storing the input data. The input data may be on different time scales. A time merge device may be operable to select a predetermined time scale and reconcile the input data so that all of the input data are placed on the same time scale. An output device may output the reconciled data from the time merge device as preprocessed data. The reconciled data may be used as input data to the system model, i.e., the support vector machine. In other embodiments, other scales than time scales may be determined for the data, and reconciled as described herein.

The support vector machine may have an input for receiving the preprocessed data, and may map it to an output through a stored representation of the run-time system in accordance with associated model parameters. A control device may control the data preprocessor to operate in either training mode or run-time mode. In the training mode, the preprocessor may be operable to process the stored training data and output preprocessed training data. A training device may be operable to train the support vector machine (in the training mode) on the training data in accordance with a predetermined training algorithm to define the model parameters on which the support vector machine operates. In the run-time mode, the preprocessor may be operable to preprocess run-time data received from the run-time system to output preprocessed run-time data. The support vector machine may then operate in the run-time mode, receiving the preprocessed input run-time data and generating a predicted output and/or control parameters for the run-time system.

The data preprocessor may further include a pre-time merge processor for applying one or more predetermined algorithms to the received data prior to input to the time merge device. A post-time merge processor (e.g., part of the output device) may be provided for applying one or more predetermined algorithms to the data output by the time merge device prior to output as the processed data. The preprocessed data may then have selective delay applied thereto prior to input to the support vector machine in both the run-time mode and the training mode. The one or more predetermined algorithms may be externally input and stored in a preprocessor memory such that the sequence in which the predetermined algorithms are applied is also stored.

In one embodiment, the input data associated with at least one of the inputs of the support vector machine may have missing data in an associated time sequence. The time merge device may be operable to reconcile the input data to fill in the missing data.

In one embodiment, the input data associated with a first one or more of the inputs may have an associated time sequence based on a first time interval, and a second one or more of the inputs may have an associated time sequence based on a second time interval. The time merge device may be operable to reconcile the input data associated with the first one or more of the inputs to the input data associated with the second one or more of the inputs, thereby generating reconciled input data associated with the at least one of the inputs having an associated time sequence based on the second time interval.

In one embodiment, the input data associated with a first one or more of the inputs may have an associated time sequence based on a first time interval, and the input data associated with a second one or more of the inputs may have an associated time sequence based on a second time interval. The time merge device may be operable to reconcile the input data associated with the first one or more of the inputs and the input data associated with the second one or more of the inputs to a time scale based on a third time interval, thereby generating reconciled input data associated with the first one or more of the inputs and the second one or more of the inputs having an associated time sequence based on the third time interval.

In one embodiment, the input data associated with a first one or more of the inputs may be asynchronous, and the input data associated with a second one or more of the inputs may be synchronous with an associated time sequence based on a time interval. The time merge device may be operable to reconcile the asynchronous input data associated with the first one or more of the inputs to the synchronous input data associated with the second one or more of the inputs, thereby generating reconciled input data associated with the first one or more of the inputs, where the reconciled input data comprise synchronous input data having an associated time sequence based on the time interval.

In one embodiment, the input data may include a plurality of system input variables, each of the system input variables including an associated set of data. A delay device may be provided that may be operable to select one or more input variables after preprocessing by the preprocessor and to introduce a predetermined amount of delay therein to output a delayed input variable, thereby reconciling the delayed variable to the time scale of the data set. This delayed input variable may be input to the system model. Further, this predetermined delay may be determined external to the delay device.

In one embodiment, the input data may include one or more outlier values which may be disruptive or counter-productive to the training and/or operation of the support vector machine. The received data may be analyzed to determine any outliers in the data set. In other words, the data may be analyzed to determine which, if any, data values fall above or below an acceptable range.

After the determination of any outliers in the data, the outliers, if any, may be removed from the data, thereby generating corrected input data. The removal of outliers may result in a data set with missing data, i.e., with gaps in the data.

In one embodiment, a graphical user interface (GUI) may be included whereby a user or operator may view the received data set, i.e., to visually inspect the data for bad data points, i.e., outliers. The GUI may further provide various tools for modifying the data, including tools for "cutting" the bad data from the set.

In one embodiment, the detection and removal of the outliers may be performed by the user via the GUI. In another embodiment, the user may use the GUI to specify one or more algorithms which may then be applied to the data programmatically, i.e., automatically. In other words, a GUI may be provided which is operable to receive user input specifying one or more data filtering operations to be performed on the input data, where the one or more data filtering operations operate to remove and/or replace the one or more outlier values. Additionally, the GUI may be further operable to display the input data prior to and after performing the filtering operations on the input data. Finally, the GUI may be operable to receive user input specifying a portion of said input data for the data filtering operations.

After the outliers have been removed from the data, the removed data may optionally be replaced, thereby "filling in" the gaps resulting from the removal of outlying data. Various techniques may be brought to bear to generate the replacement data, including, but not limited to, clipping, interpolation, extrapolation, spline fits, sample/hold of a last prior value, etc., as are well known in the art.

In another embodiment, the removed outliers may be replaced in a later stage of preprocessing, such as the time merge process described above. In this embodiment, the time merge process will detect that data are missing, and operate to fill the gap.

Thus, in one embodiment, the preprocess may operate as a data filter, analyzing input data, detecting outliers, and removing the outliers from the data set. The filter parameters may simply be a predetermined value limit or range against which a data value may be tested. If the value falls outside the range, the value may be removed, or clipped to the limit value, as desired. In one embodiment, the limit(s) or range may be determined dynamically, for example, based on the standard deviation of a moving window of data in the data set, e.g., any value outside a two sigma band for a moving window of 100 data points may be clipped or removed.

In one embodiment, the received input data may comprise training data including target input data and target output data, and the corrected data may comprise corrected training data which includes corrected target input data and corrected target output data.

In one embodiment, the support vector machine may be operable to be trained according to a predetermined training algorithm applied to the corrected target input data and the corrected target output data to develop model parameter values such that the support vector machine has stored therein a representation of the system that generated the target output data in response to the target input data. In other words, the model parameters of the support vector machine may be trained based on the corrected target input data and the corrected target output data, after which the support vector machine may represent the system.

In one embodiment, the input data may comprise run-time data, such as from the system being modeled, and the corrected data may comprise reconciled run-time data. In this embodiment, the support vector machine may be operable to receive the corrected run-time data and generate run-time output data. In one embodiment, the run-time output data may comprise control parameters for the system which may be usable to determine control inputs to the system for run-time operation of the system. For example, in an e-commerce system, control inputs may include such parameters as advertisement or product placement on a website, pricing, and credit limits, among others.

In another embodiment, the run-time output data may comprise predictive output information for the system which may be usable in making decisions about operation of the system. In an embodiment where the system may be a financial system, the predictive output information may indicate a recommended shift in investment strategies, for example. In an embodiment where the system may be a manufacturing plant, the predictive output information may indicate production costs related to increased energy expenses, for example. Thus, in one embodiment, the preprocessor may be operable to detect and remove and/or replace outlying data in an input data set for the support vector machine.

Various embodiments of the systems and methods described above may thus operate to preprocess input data for a support vector machine to reconcile data on different time scales to a common time scale. Various embodiments of the systems and methods may also operate to remove and/or replace bad or missing data in the input data. The resulting preprocessed input data may then be used to train and/or operate a support vector machine.

BRIEF DESCRIPTION OF THE DRAWINGS

A better understanding of the present invention may be obtained when the following detailed description of various embodiments is considered in conjunction with the following drawings, in which:

FIG. 6 is a simplified block diagram of the time merging operation, which is part of the preprocessing operation, according to one embodiment;

FIG. 7B illustrates a data block after the time merging operation, according to one embodiment;

FIG. 12 presents a series of tables and properties, according to one embodiment;

FIG. 17 illustrates the display for selection of the delays associated with various inputs and outputs in the support vector machine, according to one embodiment;

Figure 1:
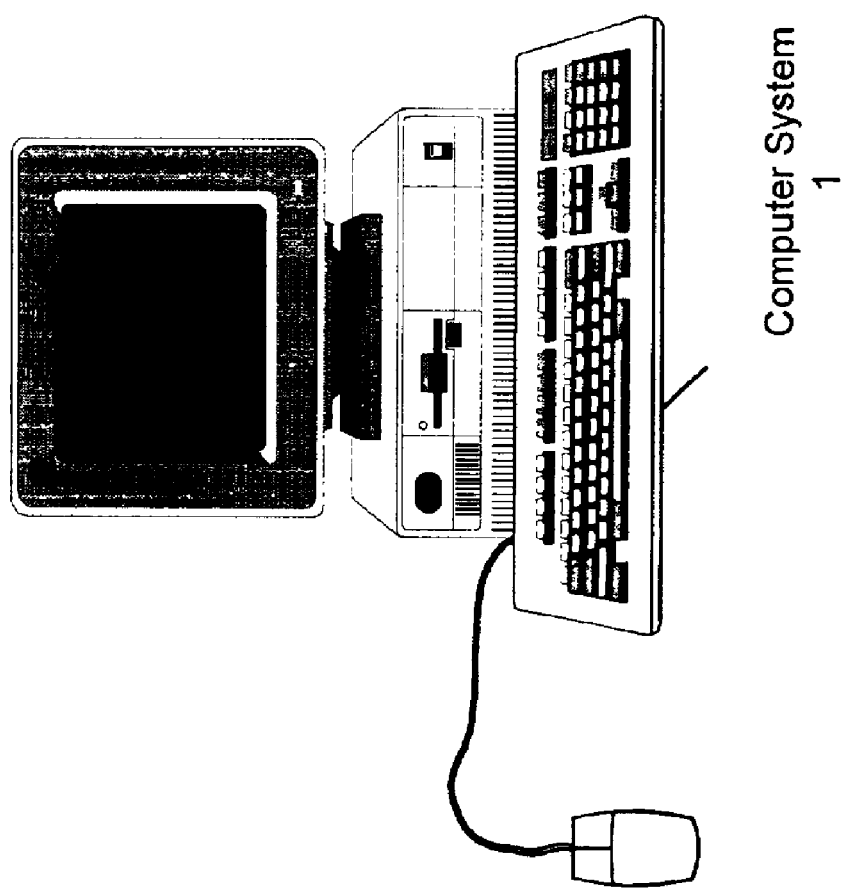
FIG. 1 illustrates an exemplary computer system according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Incorporation by Reference

U.S. Pat. No. 5,842,189, titled "Method for Operating a Neural Network With Missing and/or Incomplete Data", whose inventors are James D. Keeler, Eric J. Hartman, and Ralph Bruce Ferguson, and which issued on Nov. 24, 1998, is hereby incorporated by reference in its entirety as though fully and completely set forth herein.

U.S. Pat. No. 5,729,661, titled "Method and Apparatus for Preprocessing Input Data to a Neural Network", whose inventors are James D. Keeler, Eric J. Hartman, Steven A. O'Hara, Jill L. Kempf, and Devandra B. Godbole, and which issued on Mar. 17, 1998, is hereby incorporated by reference in its entirety as though fully and completely set forth herein.

FIG. 1—Computer System

FIG. 1 illustrates a computer system 1 operable to execute a support vector machine for performing modeling and/or control operations. One embodiment of a method for training and/or using a support vector machine is described below. The computer system 1 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

As shown in FIG. 1, the computer system 1 may include a display device operable to display operations associated with the support vector machine. The display device may also be operable to display a graphical user interface for process or control operations. The graphical user interface may comprise any type of graphical user interface, e.g., depending on the computing platform.

The computer system 1 may include a memory medium(s) on which one or more computer programs or software components according to one embodiment of the present invention may be stored. For example, the memory medium may store one or more support vector machine software programs (support vector machines) which are executable to perform the methods described herein. Also, the memory medium may store a programming development environment application used to create, train, and/or execute support vector machine software programs. The memory medium may also store operating system software, as well as other software for operation of the computer system.

The term "memory medium" is intended to include an installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

As used herein, the term "support vector machine" refers to at least one software program, or other executable implementation (e.g., an FPGA), that implements a support vector machine as described herein. The support vector machine software program may be executed by a processor, such as in a computer system. Thus, the various support vector machine embodiments described below are preferably implemented as a software program executing on a computer system.

Figure 2:
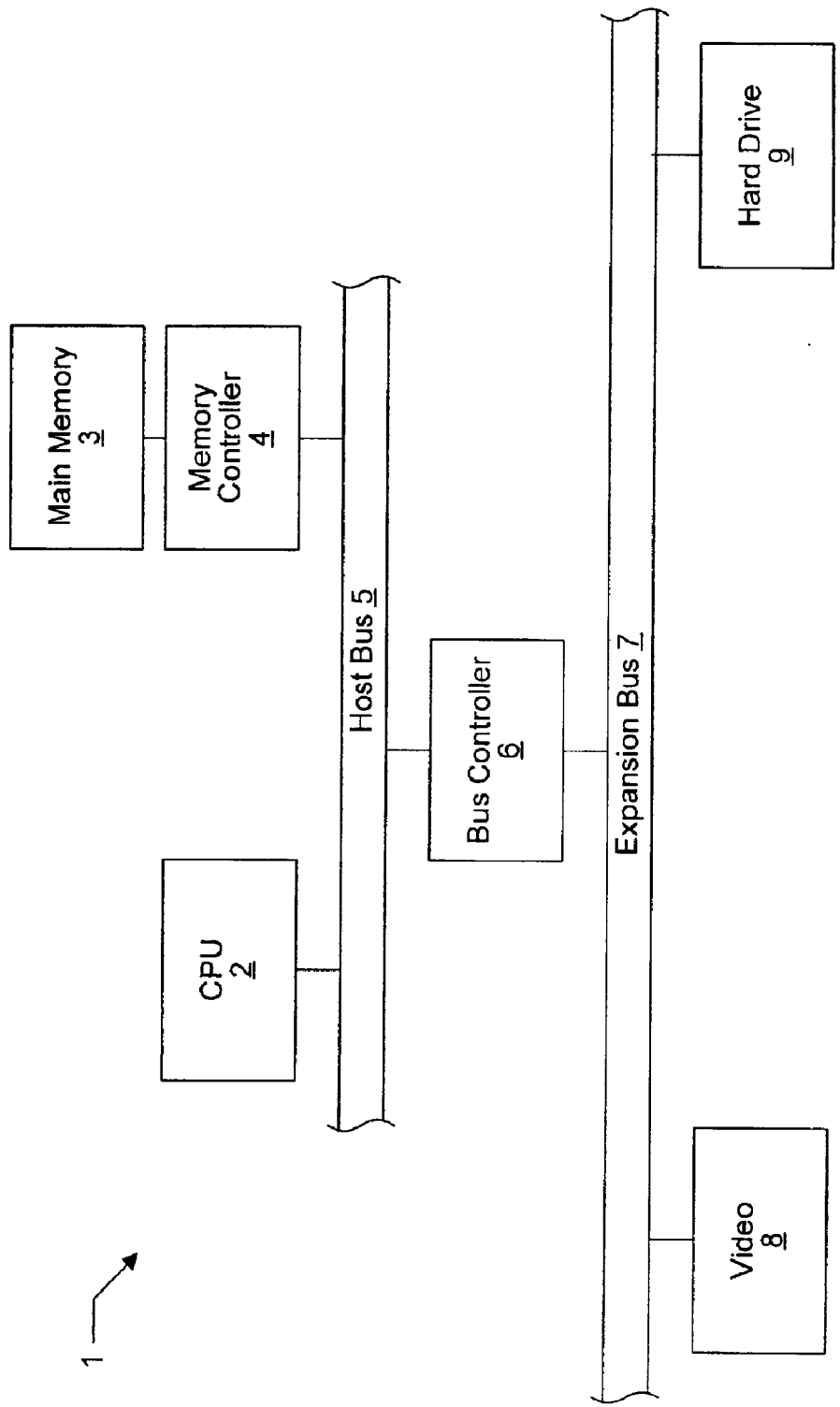
FIG. 2 is an exemplary block diagram of the computer system illustrated in FIG. 1, according to one embodiment of the present invention.

FIG. 2—Computer System Block Diagram

FIG. 2 is an exemplary block diagram of the computer system illustrated in FIG. 1, according to one embodiment. It is noted that any type of computer system configuration or architecture may be used in conjunction with the system and method described herein, as desired, and FIG. 2 illustrates a representative PC embodiment. It is also noted that the computer system may be a general purpose computer system such as illustrated in FIG. 1, or other types of embodiments. The elements of a computer not necessary to understand the present invention have been omitted for simplicity.

The computer system 1 may include at least one central processing unit or CPU 2 which is coupled to a processor or host bus 5. The CPU 2 may be any of various types, including an x86 processor, e.g., a Pentium class, a PowerPC processor, a CPU from the SPARC family of RISC processors, as well as others. Main memory 3 is coupled to the host bus 5 by means of memory controller 4. The main memory 3 may store one or more computer programs or libraries according to the present invention. The main memory 3 also stores operating system software as well as the software for operation of the computer system, as well known to those skilled in the art.

The host bus 5 is coupled to an expansion or input/output bus 7 by means of a bus controller 6 or bus bridge logic. The expansion bus 7 is preferably the PCI (Peripheral Component Interconnect) expansion bus, although other bus types may be used. The expansion bus 7 may include slots for various devices such as a video display subsystem 8 and hard drive 9 coupled to the expansion bus 7, among others (not shown).

Overview of Support Vector Machines

In order to fully appreciate the various aspects and benefits produced by the various embodiments of the present invention, an understanding of support vector machine technology is useful. For this reason, the following section discusses support vector machine technology as applicable to the support vector machine of various embodiments of the system and method of the present invention.

A. Introduction

Classifiers generally refer to systems which process a data set and categorize the data set based upon prior examples of similar data sets, i.e., training data. In other words, the classifier system may be trained on a number of training data sets with known categorizations, then used to categorize new data sets. Historically, classifiers have been determined by choosing a structure, and then selecting a parameter estimation algorithm used to optimize some cost function. The structure chosen may fix the best achievable generalization error, while the parameter estimation algorithm may optimize the cost function with respect to the empirical risk.

There are a number of problems with this approach, however. These problems may include:

1. The model structure needs to be selected in some manner. If this is not done correctly, then even with zero empirical risk, it is still possible to have a large generalization error.

2. If it is desired to avoid the problem of over-fitting, as indicated by the above problem, by choosing a smaller model size or order, then it may be difficult to fit the training data (and hence minimize the empirical risk).

3. Determining a suitable learning algorithm for minimizing the empirical risk may still be quite difficult. It may be very hard or impossible to guarantee that the correct set of parameters is chosen.

The support vector method is a recently developed technique which is designed for efficient multidimensional function approximation. The basic idea of support vector machines (SVMs) is to determine a classifier or regression machine which minimizes the empirical risk (i.e., the training set error) and the confidence interval (which corresponds to the generalization or test set error), that is, to fix the empirical risk associated with an architecture and then to use a method to minimize the generalization error. One advantage of SVMs as adaptive models for binary classification and regression is that they provide a classifier with minimal VC (Vapnik-Chervonenkis) dimension which implies low expected probability of generalization errors. SVMs may be used to classify linearly separable data and nonlinearly separable data. SVMs may also be used as nonlinear classifiers and regression machines by mapping the input space to a high dimensional feature space. In this high dimensional feature space, linear classification may be performed.

In the last few years, a significant amount of research has been performed in SVMs, including the areas of learning algorithms and training methods, methods for determining the data to use in support vector methods, and decision rules, as well as applications of support vector machines to speaker identification, and time series prediction applications of support vector machines.

Support vector machines have been shown to have a relationship with other recent nonlinear classification and modeling techniques such as: radial basis function networks, sparse approximation, PCA (principle components analysis), and regularization. Support vector machines have also been used to choose radial basis function centers.

A key to understanding SVMs is to see how they introduce optimal hyperplanes to separate classes of data in the classifiers. The main concepts of SVMs are reviewed in the next section.

B. How Support Vector Machines Work

The following describes support vector machines in the context of classification, but the general ideas presented may also apply to regression, or curve and surface fitting.

1. Optimal Hyperplanes

Consider an m-dimensional input vector $x=[x_1, \ldots, x_m]^T \in X \subset R^m$ and a one-dimensional output $y \in \{-1,1\}$. Let there exist n training vectors $(x_i,y_i) i=1, \ldots, n$. Hence we may write $X=[x_1 x_2 \ldots x_n]$ or $$X = \begin{bmatrix} x_{11} & \cdots & x_{1n} \\ \vdots & \ddots & \vdots \\ x_{m1} & \cdots & x_{mn} \end{bmatrix} \quad (1)$$

A hyperplane capable of performing a linear separation of the training data is described by $$w^T x + b = 0 \quad (2)$$

where $w=[w_1 w_2 \ldots w_m]^T$, $w \in W \subset R^m$.

The concept of an optimal hyperplane was proposed by Vladimir Vapnik. For the case where the training data are linearly separable, an optimal hyperplane separates the data without error and the distance between the hyperplane and the closest training points is maximal.

2. Canonical Hyperplanes

A canonical hyperplane is a hyperplane (in this case we consider the optimal hyperplane) in which the parameters are normalized in a particular manner.

Consider (2) which defines the general hyperplane. It is evident that there is some redundancy in this equation as far as separating sets of points. Suppose we have the following classes $$y_i[w^T x_i + b] \geq 1 \quad i = 1, \ldots, n \quad (3)$$

where $y \in [-1,1]$.

One way in which we may constrain the hyperplane is to observe that on either side of the hyperplane, we may have $w^T x + b > 0$ or $w^T x + b < 0$. Thus, if we place the hyperplane midway between the two closest points to the hyperplane, then we may scale w,b such that $$\min_{i=1 \ldots n} |w^T x_i + b| = 0 \quad (4)$$

Now, the distance d from a point $x_i$ to the hyperplane denoted by (w,b) is given by $$d(w, b; x_i) = \frac{|w^T x_i + b|}{\|w\|} \quad (5)$$

where $\|w\|=w^T w$. By considering two points on opposite sides of the hyperplane, the canonical hyperplane is found by maximizing the margin $$p(w, b) = \min_{i: y_i=1} d(w, b; x_i) + \min_{j: y_j=1} d(w, b; x_j) \quad (6)$$

$$= \frac{2}{\|w\|}$$

This implies that the minimum distance between two classes i and j is at least $[2/(\|w\|)]$.

Hence an optimization function which we seek to minimize to obtain canonical hyperplanes, is $$J(w) = \frac{1}{2} \|w\|^2 \quad (7)$$

Normally, to find the parameters, we would minimize the training error and there are no constraints on w,b. However, in this case, we seek to satisfy the inequality in (3). Thus, we need to solve the constrained optimization problem in which we seek a set of weights which separates the classes in the usually desired manner and also minimizing J(w), so that the margin between the classes is also maximized. Thus, we obtain a classifier with optimally separating hyperplanes.

C. An SVM Learning Rule

For any given data set, one possible method to determine $w_0, b_0$ such that (8) is minimized would be to use a constrained form of gradient descent. In this case, a gradient descent algorithm is used to minimize the cost function J(w), while constraining the changes in the parameters according to (3). A better approach to this problem however, is to use Lagrange multipliers which is well suited to the nonlinear constraints of (3). Thus, we introduce the Lagrangian equation:

$$L(w, b, \alpha) = \frac{1}{2} \|w\|^2 - \sum_{i=1}^{n} \alpha_1 (y_1 [w^T x_i + b] - 1) \quad (8)$$

where $\alpha_i$ are the Lagrange multipliers and $\alpha_i > 0$.

The solution is found by maximizing L with respect to $\alpha_i$ and minimizing it with respect to the primal variables w and b. This problem may be transformed from the primal case into its dual and hence we need to solve $$\max_{\alpha} \min_{w,b} L(w, b, \alpha) \quad (9)$$

At the solution point, we have the following conditions $$\frac{\partial L(w_0, b_0, \alpha_0)}{\partial w} = 0 \quad (10)$$

$$\frac{\partial L(w_0, b_0, \alpha_0)}{\partial b} = 0$$

where solution variables $w_0, b_0, \alpha_0$ are found. Performing the differentiations, we obtain respectively, $$\sum_{i=1}^{n} \alpha_{0i} y_i = 0 \quad (11)$$

$$w_0 = \sum_{i=1}^{n} \alpha_{01} x_1 y_i$$

and in each case $\alpha_{0i} > 0$, $i=1, \ldots, n$.

These are properties of the optimal hyperplane specified by $(w_0, b_0)$. From (14) we note that given the Lagrange multipliers, the desired weight vector solution may be found directly in terms of the training vectors.

To determine the specific coefficients of the optimal hyperplane specified by ($w_0,b_0$) we proceed as follows. Substitute (13) and (14) into (9) to obtain $$L_D(w, b, \alpha) = \sum_{i=1}^{n} \alpha_i - \frac{1}{2}\sum_{i=1}^{n}\sum_{j=1}^{n} \alpha_i \alpha_j y_i y_j (x_i^T x_j) \quad (12)$$

It is necessary to maximize the dual form of the Lagrangian equation in (15) to obtain the required Lagrange multipliers. Before doing so however, consider (3) once again. We observe that for this inequality, there will only be some training vectors for which the equality holds true. That is, only for some ($x_i, y_i$) will the following equation hold:

$$y_i[w^T x_i + b] = 1 \quad i = 1, \ldots, n \quad (13)$$

The training vectors for which this is the case, are called support vectors.

Since we have the Karush-Kühn-Tucker (KKT) conditions that $\alpha_{0i} > 0$, $i = 1, \ldots, n$ and that given by (3), from the resulting Lagrangian equation in (9), we may write a further KKT condition $$\alpha_{0i}(y_i[w_0^T x_i + b_0] - 1) = 0 \quad i = 1, \ldots, n \quad (14)$$

This means, that since the Lagrange multipliers $\alpha_{0i}$ are nonzero with only the support vectors as defined in (16), the expansion of $w_0$ in (14) is with regard to the support vectors only.

Hence we have $$w_0 = \sum_{i \subset S} \alpha_{0i} x_i y_i \quad (15)$$

where S is the set of all support vectors in the training set. To obtain the Lagrange multipliers $\alpha_{0i}$, we need to maximize (15) only over the support vectors, subject to the constraints $\alpha_{0i} > 0$, $i=1, \ldots, n$ and that given in (13). This is a quadratic programming problem and may be readily solved. Having obtained the Lagrange multipliers, the weights $w_0$ may be found from (18).

D. Classification of Linearly Separable Data

A support vector machine which performs the task of classifying linearly separable data is defined as $$f(x) = \text{sgn}\{w^T x + b\} \quad (16)$$

where w,b are found from the training set. Hence may be written as $$f(x) = \text{sgn}\left\{\sum_{i \subset S} \alpha_{0i} y_i (x_i^T x) + b_0\right\} \quad (17)$$

where $\alpha_{0i}$ are determined from the solution of the quadratic programming problem in (15) and $b_0$ is found as $$b_0 = \frac{1}{2}(w_0^T x_i^+ + w_0^T x_i^-) \quad (18)$$

where $x_i^+$ and $x_i^-$ are any input training vector examples from the positive and negative classes respectively. For greater numerical accuracy, we may also use $$b_0 = \frac{1}{2n}\sum_{i=1}^{n}(w_0^T x_i^+ + w_0^T x_i^-) \quad (19)$$

E. Classification of Nonlinearly Separable Data

For the case where the data are nonlinearly separable, the above approach can be extended to find a hyperplane which minimizes the number of errors on the training set. This approach is also referred to as soft margin hyperplanes. In this case, the aim is to $$y_i[w^T x_i + b] \geq 1 - \xi_i \quad i = 1, \ldots, n \quad (20)$$

where $\xi_i > 0$, $i=1, \ldots, n$. In this case, we seek to minimize to optimize $$J(w, \xi) = \frac{1}{2}\|w\|^2 + C\sum_{i=1}^{n} \xi_i \quad (21)$$

F. Nonlinear Support Vector Machines

For some problems, improved classification results may be obtained using a nonlinear classifier. Consider (20) which is a linear classifier. A nonlinear classifier may be obtained using support vector machines as follows.

The classifier is obtained by the inner product xhd $i^T x$ where $i \subset S$, the set of support vectors. However, it is not necessary to use the explicit input data to form the classifier. Instead, all that is needed is to use the inner products between the support vectors and the vectors of the feature space.

That is, by defining a kernel $$K(x_i, x) = x_i^T x \quad (22)$$

a nonlinear classifier can be obtained as $$f(x) = \text{sgn}\left\{\sum_{i \subset S} \alpha_{0i} y_i K(x_i, x) + b_0\right\} \quad (23)$$

G. Kernel Functions

A kernel function may operate as a basis function for the support vector machine. In other words, the kernel function may be used to define a space within which the desired classification or prediction may be greatly simplified. Based on Mercer's theorem, as is well known in the art, it is possible to introduce a variety of kernel functions, including:

1. Polynomial

The $p^{th}$ order polynomial kernel function is given by $$K(x_i, x) = \quad (24)$$

2. Radial Basis Function $$K(x_i, x) = e \quad (25)$$

where $\gamma > 0$.

3. Multilayer Networks

A multilayer network may be employed as a kernel function as follows. We have $$K(x_i, x) = \sigma(\theta(x_i^T x) + \phi) \quad (26)$$

where $\sigma$ is a sigmoid function.

Note that the use of a nonlinear kernel permits a linear decision function to be used in a high dimensional feature space. We find the parameters following the same procedure as before. The Lagrange multipliers may be found by maximizing the functional $$L_D(w, b, \alpha) = \sum_{i=1}^{n} \alpha_i - \frac{1}{2} \sum_{i=1}^{n} \sum_{j=1}^{n} \alpha_i \alpha_j y_i y_j K(x_i, x) \quad (27)$$

When support vector methods are applied to regression or curve-fitting, a high-dimensional "tube" with a radius of acceptable error is constructed which minimizes the error of the data set while also maximizing the flatness of the associated curve or function. In other words, the tube is an envelope around the fit curve, defined by a collection of data points nearest the curve or surface, i.e., the support vectors.

Thus, support vector machines offer an extremely powerful method of obtaining models for classification and regression. They provide a mechanism for choosing the model structure in a natural manner which gives low generalization error and empirical risk.

H. Construction of Support Vector Machines

A support vector machine may be built by specifying a kernel function, a number of inputs, and a number of outputs. Of course, as is well known in the art, regardless of the particular configuration of the support vector machine, some type of training process may be used to capture the behaviors and/or attributes of the system or process to be modeled.

The modular aspect of one embodiment of the present invention may take advantage of this way of simplifying the specification of a support vector machine. Note that more complex support vector machines may require more configuration information, and therefore more storage.

Various embodiments of the present invention contemplate other types of support vector machine configurations. In one embodiment, all that is required for the support vector machine is that the support vector machine be able to be trained and retrained so as to provide needed predicted values.

I. Support Vector Machine Training

The coefficients used in a support vector machine may be adjustable constants which determine the values of the predicted output data for given input data for any given support vector machine configuration. Support vector machines may be superior to conventional statistical models because support vector machines may adjust these coefficients automatically. Thus, support vector machines may be capable of building the structure of the relationship (or model) between the input data and the output data by adjusting the coefficients. While a conventional statistical model typically requires the developer to define the equation(s) in which adjustable constant(s) are used, the support vector machine may build the equivalent of the equation(s) automatically.

The support vector machine may be trained by presenting it with one or more training set(s). The one or more training set(s) are the actual history of known input data values and the associated correct output data values.

To train the support vector machine, the newly configured support vector machine is usually initialized by assigning random values to all of its coefficients. During training, the support vector machine may use its input data to produce predicted output data.

These predicted output data values may be used in combination with training input data to produce error data. These error data values may then be used to adjust the coefficients of the support vector machine.

It may thus be seen that the error between the output data and the training input data may be used to adjust the coefficients so that the error is reduced.

J. Advantages of Support Vector Machines

Support vector machines may be superior to computer statistical models because support vector machines do not require the developer of the support vector machine model to create the equations which relate the known input data and training values to the desired predicted values (i.e., output data). In other words, a support vector machine may learn relationships automatically during training.

However, it is noted that the support vector machine may require the collection of training input data with its associated input data, also called a training set. The training set may need to be collected and properly formatted. The conventional approach for doing this is to create a file on a computer on which the support vector machine is executed.

In one embodiment of the present invention, in contrast, creation of the training set may be done automatically, using historical data. This automatic step may eliminate errors and may save time, as compared to the conventional approach. Another benefit may be significant improvement in the effectiveness of the training function, since automatic creation of the training set(s) may be performed much more frequently.

Preprocessing Data for the Support Vector Machine

As mentioned above, in many applications, the time-dependence, i.e., the time resolution and/or synchronization, of training and/or real-time data may not be consistent, due to missing data, variable measurement chronologies or timelines, etc. In one embodiment of the invention, the data may be preprocessed to homogenize the timing aspects of the data, as described below. It is noted that in other embodiments, the data may be dependent on a different independent variable than time. It is contemplated that the techniques described herein regarding homogenization of time scales are applicable to other scales (i.e., other independent variables), as well.

Figure 3A:
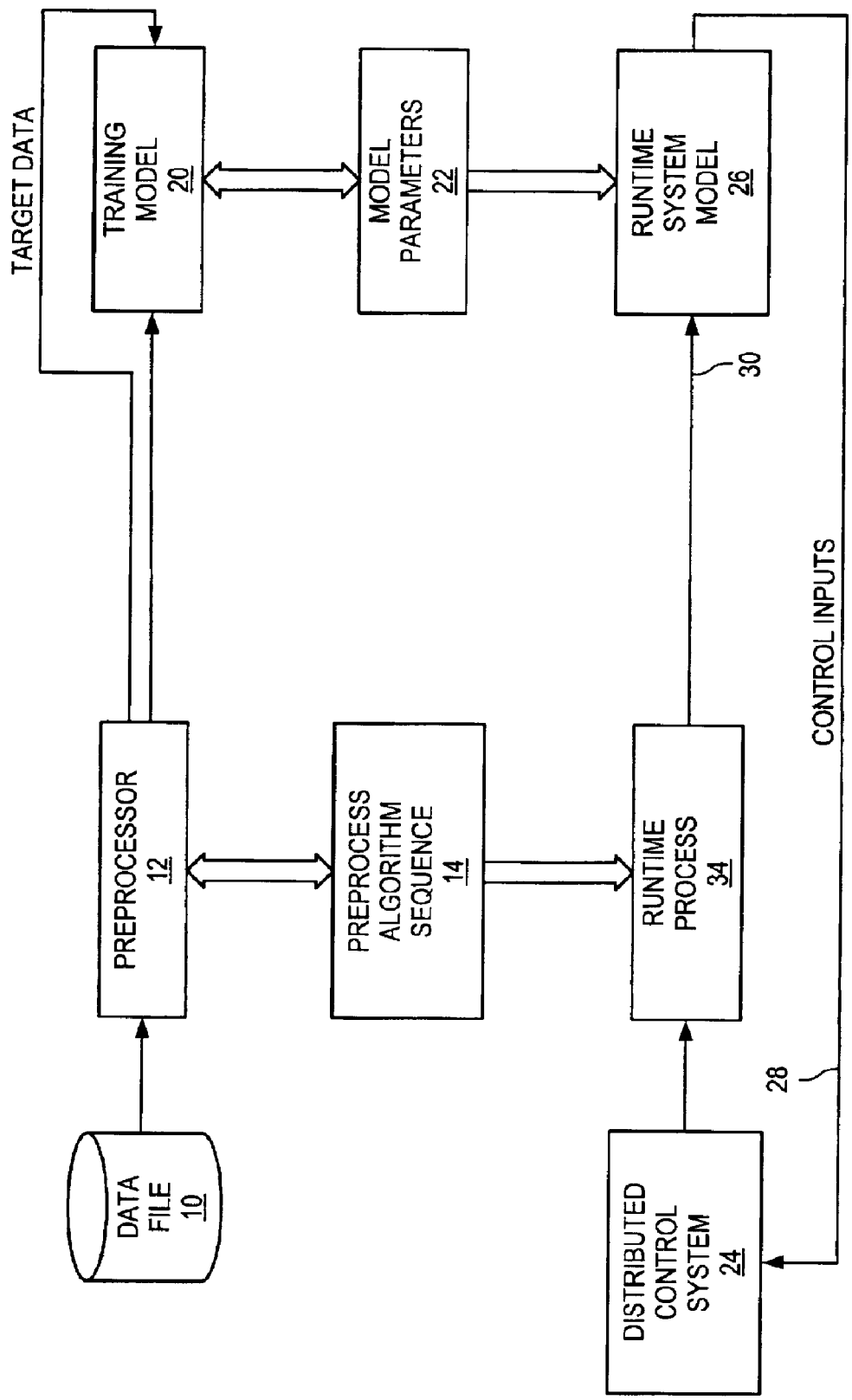
FIGS. 3A and 3B illustrate two embodiments of an overall block diagram of the system for both preprocessing data during the training mode and for preprocessing data during the run mode.
Figure 3B:
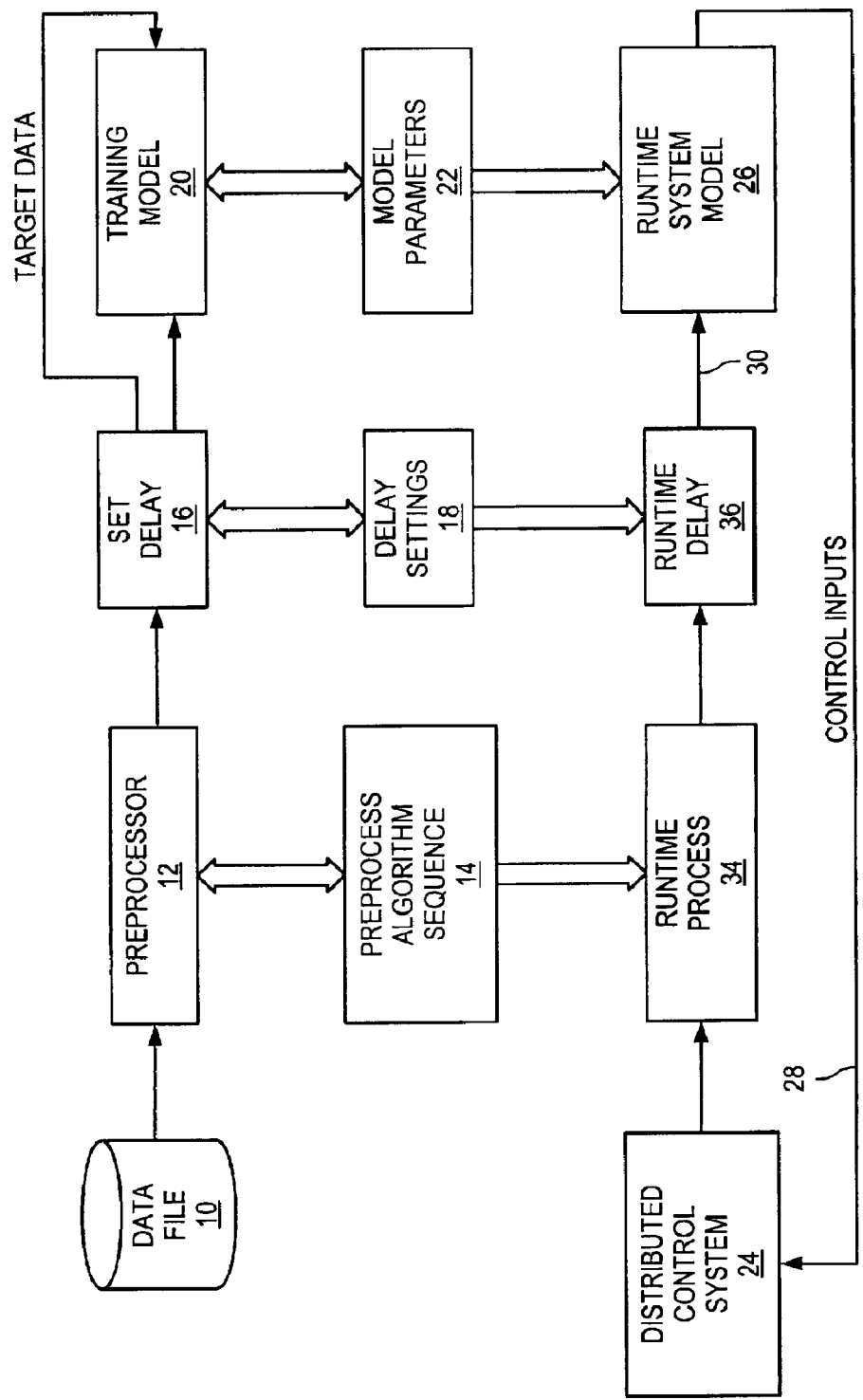

FIG. 3A is an overall block diagram of the data preprocessing operation in both the training mode and the run-time mode, according to one embodiment. FIG. 3B is a diagram of the data preprocessing operation of FIG. 3A, but with an optional delay process included for reconciling time-delayed values in a data set. As FIG. 3A shows, in the training mode, one or more data files 10 may be provided (however, only one data file 10 is shown). The one or more data files 10 may include both input training data and output training data. The training data may be arranged in "sets", e.g., corresponding to different variables, and the variables may be sampled at different time intervals. These data may be referred to as "raw" data. When the data are initially presented to an operator, the data are typically unformatted, i.e., each set of data is in the form that it was originally received. Although not shown, the operator may first format the data files so that all of the data files may be merged into a data-table or spreadsheet, keeping track of the original "raw" time information. This may be done in such a manner as to keep track of the timestamp for each variable. Thus, the "raw" data may be organized as time-value pairs of columns; that is, for each variable $x_i$, there is an associated time of sample $t_i$. The data may then be grouped into sets $\{x_i, t_i\}$.

If any of the time-vectors happen to be identical, it may be convenient to arrange the data such that the data will be grouped in common time scale groups, and data that is on, for example, a fifteen minute sample time scale may be grouped together and data sampled on a one hour sample time scale may be grouped together. However, any type of format that provides viewing of multiple sets of data is acceptable.

The one or more data files 10 may be input to a preprocessor 12 that may function to perform various preprocessing functions, such as determining bad or missing data, reconciling data to replace bad data or fill in missing data, and performing various algorithmic or logic functions on the data, among others. Additionally, the preprocessor 12 may be operable to perform a time merging operation, as described below. During operation, the preprocessor 12 may be operable to store various preprocessing algorithms in a given sequence in a storage area 14 (noted as preprocess algorithm sequence 14 in FIG. 3). As described below, the sequence may define the way in which the data are manipulated in order to provide the overall preprocessing operation.

After preprocessing by the preprocessor 12, the preprocessed data may be input into a training model 20, as FIG. 3A shows. The training model 20 may be a non-linear model (e.g., a support vector machine) that receives input data and compares it with target output data. Any of various training algorithms may be used to train the support vector machine to generate a model for predicting the target output data from the input data. Thus, in one embodiment, the training model may utilize a support vector machine that is trained on one or more of multiple training methods. Various weights within the support vector machine may be set during the training operation, and these may be stored as model parameters in a storage area 22. The training operation and the support vector machine may be conventional systems. It is noted that in one embodiment, the training model 20 and the runtime system model 26 may be the same system model operated in training mode and runtime mode, respectively. In other words, when the support vector machine is being trained, i.e., is in training mode, the model may be considered to be a training model, and when the support vector machine is in runtime mode, the model may be considered to be a runtime system model. In another embodiment, the runtime system model 26 may be distinct from the training model 20. For example, after the training model 20 (the SVM in training mode) has been trained, the resulting parameters which define the state of the SVM may be used to configure the runtime system model 26, which may be substantially a copy of the training model. Thus, one copy of the system model (the training model 20) may be trained while another copy of the system model (the runtime system model 26) is engaged with the real-time system or process being controlled. In one embodiment, the model parameter values in storage area 22 resulting from the training model may be used to periodically or continuously update the runtime system model 26, as shown.

A Distributed Control System (DCS) 24 may be provided that may be operable to generate various system measurements and control settings representing system variables (e.g., temperature, flow rates, etc.), that comprise the input data to the system model. The system model may either generate control inputs for control of the DCS 24 or it may provide a predicted output, these being conventional operations which are well known in the art. In one embodiment, the control inputs may be provided by the run-time system model 26, which has an output 28 and an input 30, as shown. The input 30 may include the preprocessed and, in the embodiment of FIG. 3B, delayed, data and the output may either be a predictive output, or a control input to the DCS 24. In the embodiments of FIGS. 3A and 3B, this is illustrated as control inputs 28 to the DCS 24. The run-time system model 26 is shown as utilizing the model parameters stored in the storage area 22. It is noted that the run-time system model 26 may include a representation learned during the training operation, which representation was learned on the preprocessed data, i.e., the trained SVM. Therefore, data generated by the DCS 24 may be preprocessed in order to correlate with the representation stored in the run-time system model 26.

The output data of the DCS 24 may be input to a run-time process block 34, which may be operable to process the data in accordance with the sequence of preprocessing algorithms stored in the storage area 14, which are generated during the training operation in one embodiment, the output of the run-time processor 34 may be input to a run-time delay process 36 to set delays on the data in accordance with the delay settings stored in the storage area 18. This may provide the overall preprocessed data output on the line 30 input to the run-time system model 26.

In one embodiment, after preprocessing by the preprocessor 12, the preprocessed data may optionally be input to a delay block 16, as shown in FIG. 3B. As mentioned above, inherent delays in a system may affect the use of time-dependent data. For example, in a chemical processing system, a flow meter output may provide data at time $t_0$ at a given value. However, a given change in flow resulting in a different reading on the flow meter may not affect the output for a predetermined delay $\tau$. In order to predict the output, this flow meter output must be input to the support vector machine at a delay equal to $\tau$. This may be accounted for in the training of the support vector machine through the use of the delay block 16. Thus, the time scale of the data may be reconciled with the time scale of the system or process as follows.

The delay block 16 may be operable to set the various delays for different sets of data. This operation may be performed on both the target output data and the input training data. The delay settings may be stored in a storage area 18 (noted as delay settings 18 in FIG. 3). In this embodiment, the output of the delay block 16 may be input to the training model 20. Note that if the delay process is not used, then the blocks 'set delay' 16, 'delay settings' 18, and 'runtime delay' 36 may be omitted, and therefore, the outputs from the preprocessor 12 and the runtime process 34 may be fed into the training model 20 and the runtime system model 26, respectively, as shown in FIG. 3A. In one embodiment, the delay process, as implemented by the blocks 'set delay' 16, 'delay settings' 18, and 'runtime delay' 36 may be considered as part of the data preprocessor 12. Similarly, the introduction of delays into portions of the data may be considered to be reconciling the input data to the time scale of the system or process being modeled, operated, or controlled.

Figure 4A:
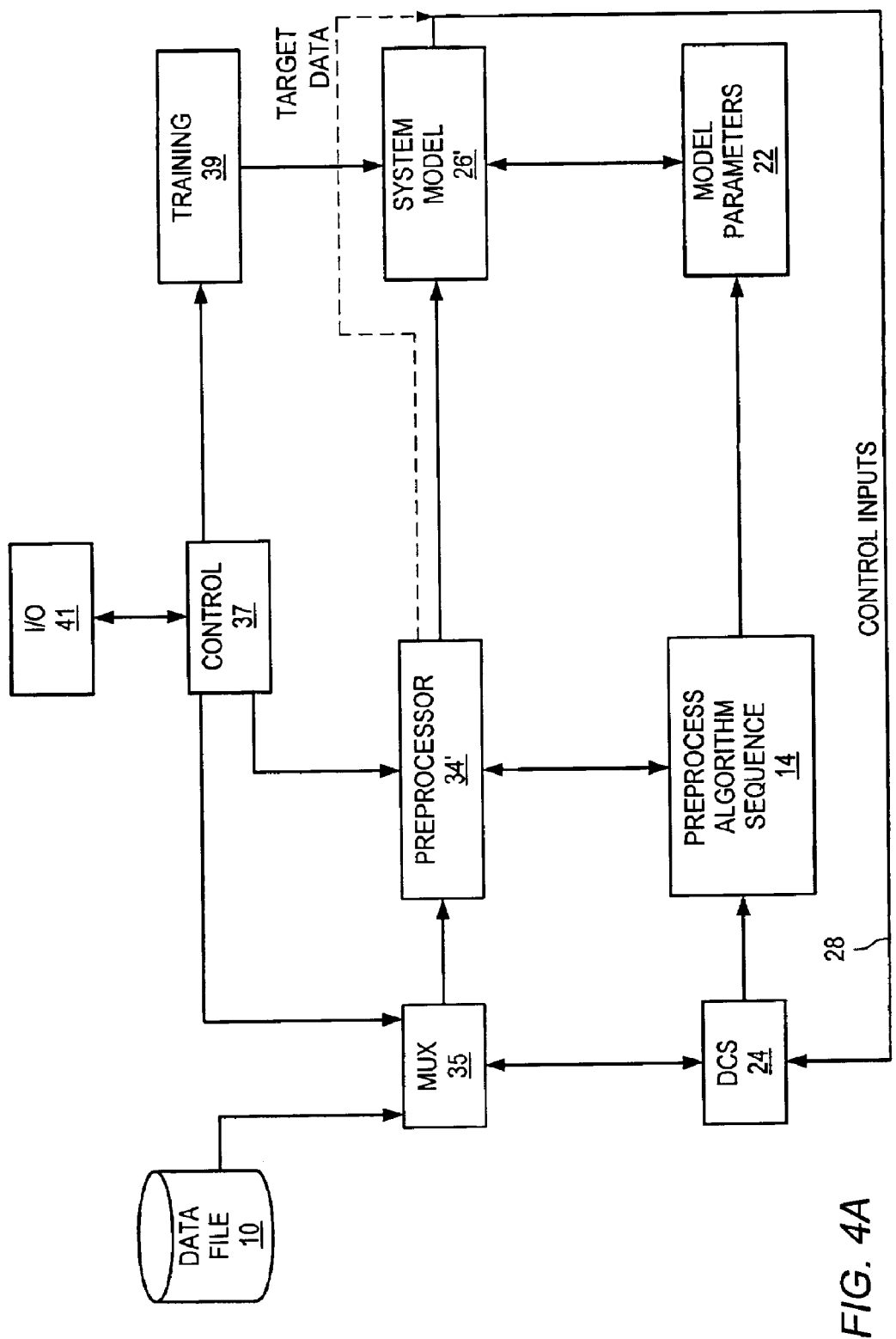
FIGS. 4A and 4B are simplified block diagrams of two embodiments of the system of FIGS. 3A and 3B.
Figure 4B:
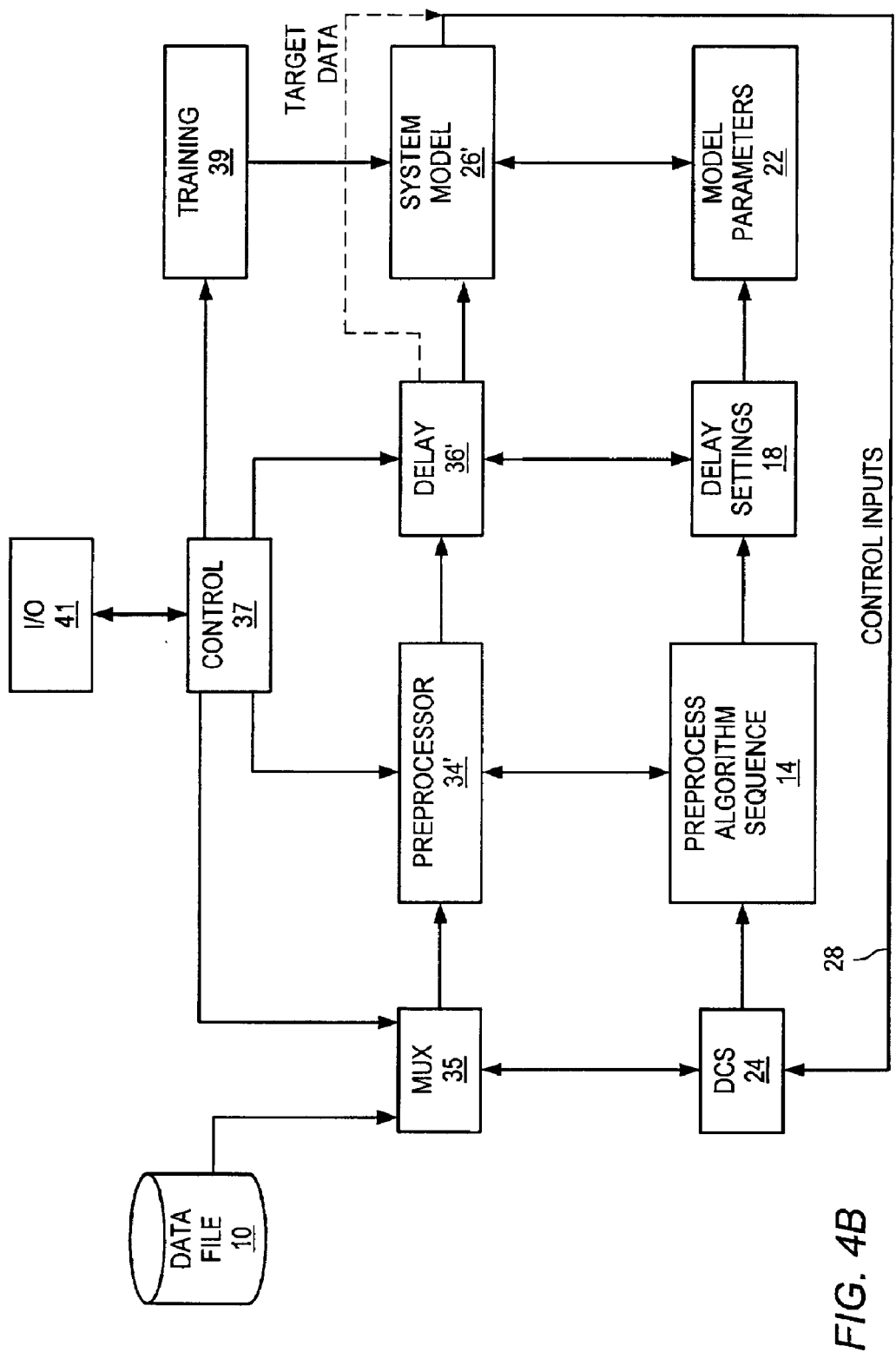

FIG. 4A is a simplified block diagram of the system of FIG. 3A, wherein a single preprocessor 34' is utilized, according to one embodiment. FIG. 4B is a simplified block diagram of the system of FIG. 3B, wherein the delay process, i.e., a single delay 36', is also included, according to one embodiment.

As FIG. 4A shows, the output of the preprocessor 34' may be input to a single system model 26'. In operation, the preprocessor 34' and the system model 26' may operate in both a training mode and a run-time mode. A multiplexer 35 may be provided that receives the output from the data file(s) 10 and the output of the DCS 24, and generates an output including operational variables, e.g., plant or process variables, of the DCS 24. The output of the multiplexer may then be input to the preprocessor 34'. In one embodiment, a control device 37 may be provided to control the multiplexer 35 to select either a training mode or a run-time mode. In the training mode, the data file(s) 10 may have the output thereof selected by the multiplexer 35 and the preprocessor 34' may be operable to preprocess the data in accordance with a training mode, i.e., the preprocessor 34' may be utilized to determine the preprocessed algorithm sequence stored in the storage area 14. An input/output (I/O) device 41 may be provided for allowing an operator to interface with the control device 37. The system model 26' may be operated in a training mode such that the target data and the input data to the system model 26' are generated, the training controlled by training block 39. The training block 39 may be operable to select one of multiple training algorithms for training the system model 26'. The model parameters may be stored in the storage area 22. Note that as used herein, the term "device" may refer to a software program, a hardware device, and/or a combination of the two.

In one embodiment, after training, the control device 37 may place the system in a run-time mode such that the preprocessor 34' is operable to apply the algorithm sequence in the storage area 14 to the data selected by the multiplexer 35 from the DCS 24. After the algorithm sequence is applied, the data may be output to the system model 26' which may then operate in a predictive mode to either predict an output or to predict/determine control inputs for the DCS 24.

It is noted that in one embodiment, the optional delay process 36' and settings 18' may be included, i.e., the data may be delayed, as shown in FIG. 4B. In this embodiment, after the algorithm sequence is applied, the data may be output to the delay block 36', which may introduce the various delays in the storage area 18, and then these may be input to the system model 26' which may then operate in a predictive mode to either predict an output or to predict/determine control inputs for the DCS 24. As FIG. 4B shows, the output of the delay 36' may be input to the single system model 26'. In one embodiment, the delay 36' may be controlled by the control device 37 to determine the delay settings for storage in the storage area 18, as shown.

Figure 5:
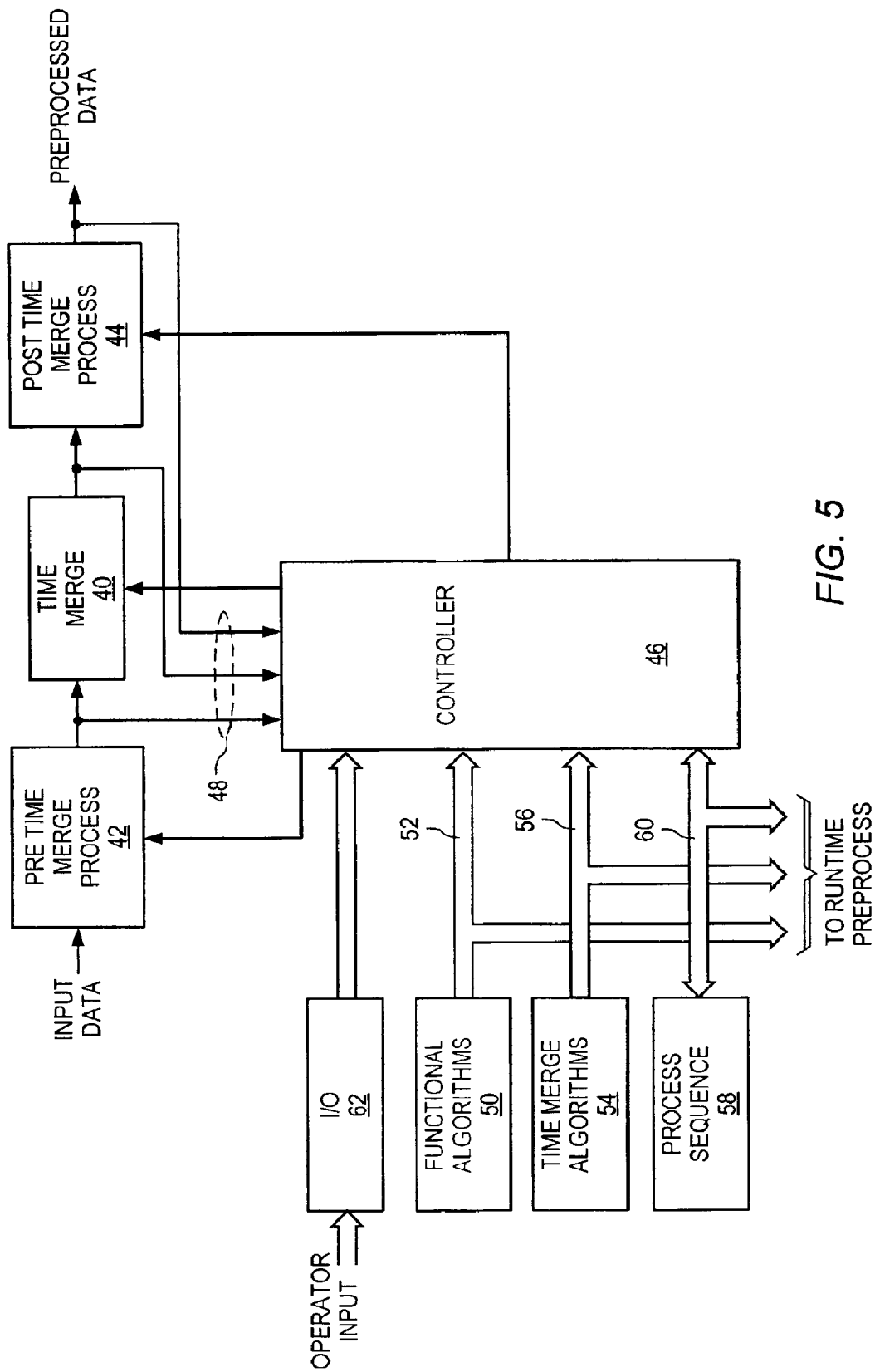
FIG. 5 is a detailed block diagram of the preprocessor in the training mode according to one embodiment.

FIG. 5 is a more detailed block diagram of the preprocessor 12 utilized during the training mode, according to one embodiment. In one embodiment, there may be three stages to the preprocessing operation. The central operation may be a time merge operation (or a merge operation based on some other independent variable), represented by block 40. However, in one embodiment, prior to performing a time merge operation on the data, a pre-time merge process may be performed, as indicated by block 42. In one embodiment, after the time merge operation, the data may be subjected to a post-time merge process, as indicated by block 44.

In an embodiment in which the delay process is included, the output of the post-time merge process block 44 may provide the preprocessed data for input to the delay block 16, shown in FIGS. 3B and 4B, and described above.

In one embodiment, a controller 46 may be included for controlling the process operation of the blocks 40–44, the outputs of which may be input to the controller 46 on lines 48. The controller 46 may be interfaced with a functional algorithm storage area 50 through a bus 52 and a time merge algorithm 54 through a bus 56. The functional algorithm storage area 50 may be operable to store various functional algorithms that may be mathematical, logical, etc., as described below. The time merge algorithm storage area 54 may be operable to contain various time merge formats that may be utilized, such as extrapolation, interpolation or a boxcar method, among others.

In one embodiment, a process sequence storage area 58 may be included that may be operable to store the sequence of the various processes that are determined during the training mode. As shown, an interface to these stored sequences may be provided by a bi-directional bus 60. During the training mode, the controller 46 may determine which of the functional algorithms are to be applied to the data and which of the time merge algorithms are to be applied to the data in accordance with instructions received from an operator input through an input/output device 62. During the run-time mode, the process sequence in the storage area 58 may be utilized to apply the various functional algorithms and time merge algorithms to input data, for use in operation or control of the real-time system or process.

FIG. 6 is a simplified block diagram of a time merge operation, according to one embodiment. All of the input data x(t) may be input to the time merge block 40 to provide time merge data $x_D(t)$ on the output thereof. Although not shown, the output target data y(t) may also be processed through the time merge block 40 to generate time merged output data y'(t). Thus, in one embodiment, input data x(t) and/or target data y(t), may be processed through the time merge block 40 to homogenize the time-dependence of the data. As mentioned above, in other embodiments, input data x(v) and/or target data y(v), may be processed through the merge block 40 to homogenize the dependence of the data with respect to some other independent variable v (i.e., instead of time t). In the descriptions that follow, dependence of the data on time t is assumed, however, the techniques are similarly applicable to data which depend on other variables.

Figure 7A:
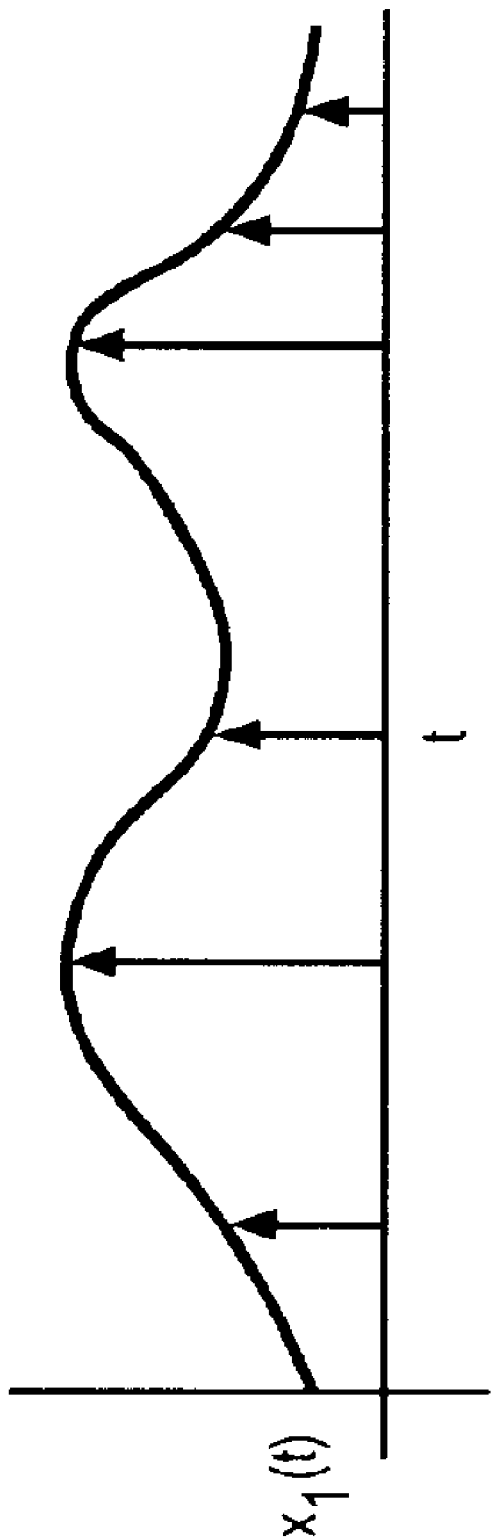
FIG. 7A illustrates a data block before the time merging operation, according to one embodiment.

Referring now to FIGS. 7A and 7B, there are illustrated embodiments of data blocks of one input data set $x_1(t)$, shown in FIG. 7A, and the resulting time merged output $x'_{1D}(t)$, shown in FIG. 7B. It may be seen that the waveform associated with $x_1(t)$ has only a certain number, n, of sample points associated therewith. In one embodiment, the time-merge operation may comprise a transform that takes one or more columns of data, $x_i(t_i)$, such as that shown in FIG. 7A, with $n_i$ time samples at times $t_i'$. That is, the time-merge operation may comprise a function, $\Omega$, that produces a new set of data $\{x'\}$ on a new time scale t' from the given set of data x(t) sampled at t.

$$\{\vec{x}', \vec{t}'\} = \Omega\{\vec{x}, \vec{t}\} \quad (28)$$

This function may be performed via any of a variety of conventional extrapolation, interpolation, or box-car algorithms (among others). An example representation as a C-language callable function is shown below:

$$\text{return} = \text{time\_merge}(\vec{x}_1, \vec{x}_2 \ldots \vec{x}_k, \vec{t}_{1'} \ldots \vec{x}_{k'}, \vec{t}_{1'}) \quad (29)$$

where $x_i$, $t_i$ are vectors of the old values and old times; $x_i'$ ... $x_k'$ are vectors of the new values; and t' is the new time-scale vector.

Figure 8A:
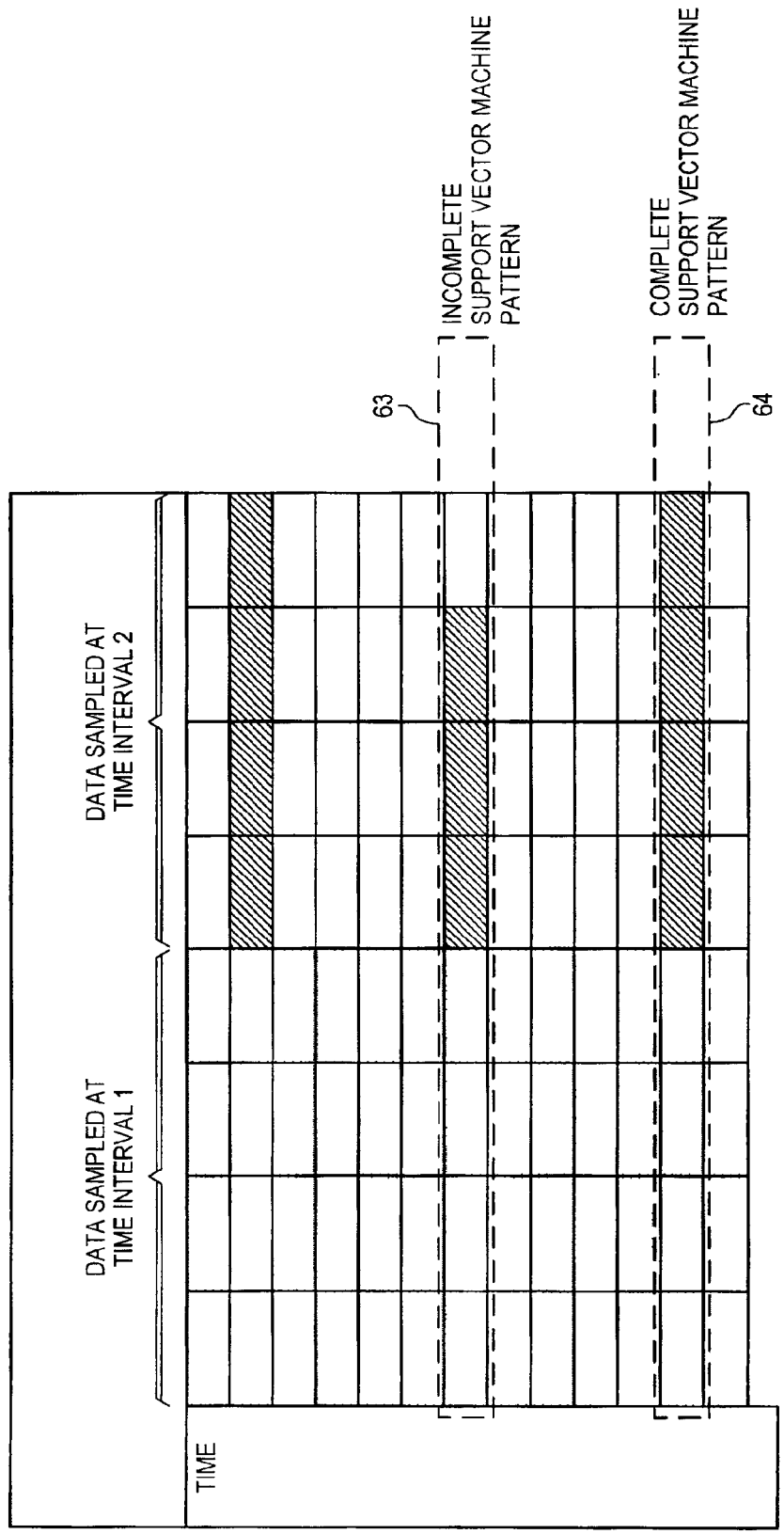
FIGS. 8A–8C illustrate diagrammatic views of the time merging operation, according to various embodiments.

FIG. 8A shows a data table with bad, missing, or incomplete data. The data table may consist of data with time disposed along a vertical scale and the samples disposed along a horizontal scale. Each sample may include many different pieces of data, with two data intervals illustrated. It is noted that when the data are examined for both the data sampled at the time interval "1" and the data sampled at the time interval "2", that some portions of the data result in incomplete patterns. This is illustrated by a dotted line 63, where it may be seen that some data are missing in the data sampled at time interval "1" and some data are missing in time interval "2". A complete support vector machine pattern is illustrated in box 64, where all the data are complete. Of interest is the time difference between the data sampled at time interval "1" and the data sampled at time interval "2". In time interval "1", the data are essentially present for all steps in time, whereas data sampled at time interval "2" are only sampled periodically relative to data sampled at time interval "1". As such, a data reconciliation procedure may be implemented that may fill in the missing data, for example, by interpolation, and may also reconcile between the time samples in time interval "2" such that the data are complete for all time samples for both time interval "1" and time interval "2".

The support vector machine based models that are utilized for time-series prediction and control may require that the time-interval between successive training patterns be constant. Since the data generated from real-world systems may not always be on the same time scale, it may be desirable to time-merge the data before it is used for training or running the support vector machine based model. To achieve this time-merge operation, it may be necessary to extrapolate, interpolate, average, or compress the data in each column over each time-region so as to give input values x'(t) that are on the appropriate time-scale. All of these operations are referred to herein as "data reconciliation". The reconciliation algorithm utilized may include linear estimates, spline-fit, boxcar algorithms, etc. If the data are sampled too frequently in the time-interval, it may be necessary to smooth or average the data to generate samples on the desired time scale. This may be done by window averaging techniques, sparse-sample techniques or spline techniques, among others.

In general, x'(t) is a function of all or a portion of the raw values x(t) given at $$\vec{x}'(t) = f(x_1(t_N), x_2(t_N), \ldots x_n(t_N); x_1(t_{N1}), \quad (30)$$
$$x_1(t_{N2}) \ldots x_1(t_{NI}); x_1(t_1), x_2(t_1) \ldots x_n(t_1))$$

present and past times up to some maximum past time, $X_{max}$. That is,
where some of the values of $x_i(t_i)$ may be missing or bad.

In one embodiment, this method of finding x'(t) using past values may be based strictly on extrapolation. Since the system typically only has past values available during runtime mode, these past values may preferably be reconciled. A simple method of reconciling is to take the next extrapolated value $x'_i(t) = x_i(t_N)$; that is, take the last value that was reported. More elaborate extrapolation algorithms may use past values $x_i(t - \tau_{ij})$, $j \in (0, \ldots i_{max})$. For example, linear extrapolation may use:

$$x_i(t) = x_i(t_{NI}) + \left[\frac{x_i(t_N) x_i(t_{NI})}{t_N t_{NI}}\right] t; t > t_N \quad (31)$$

Polynomial, spline-fit or support vector machine extrapolation techniques may use Equation 30, according to one embodiment. In one embodiment, training of the support vector machine may actually use interpolated values, i.e., Equation 31, wherein the case of interpolation, $t_N > t$.

Figure 8B:
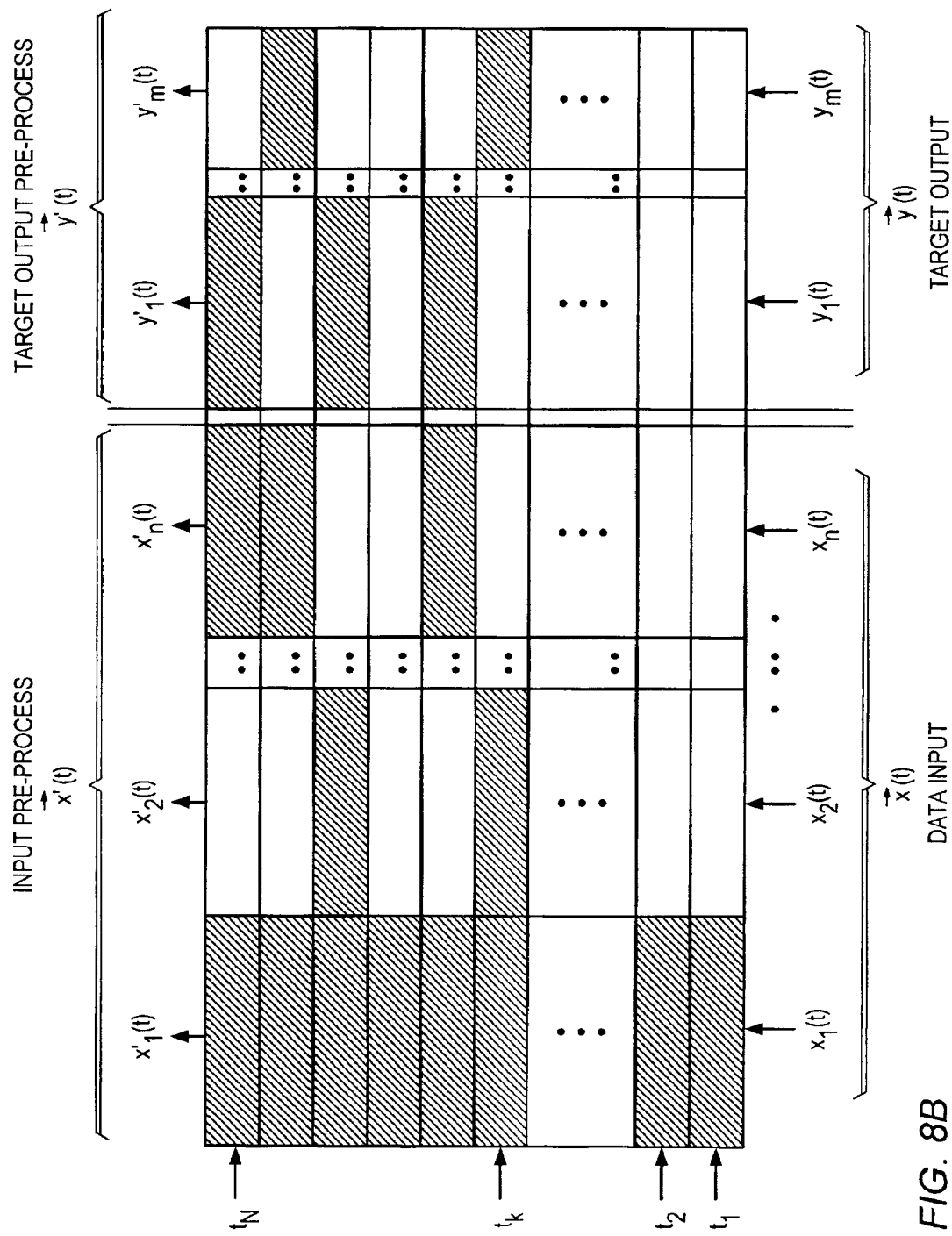

FIG. 8B illustrates one embodiment of an input data pattern and target output data pattern illustrating the preprocess operation for both preprocessing input data to provide time merged output data and also preprocessing the target output data to provide preprocessed target output data for training purposes. The data input x(t) may include a vector with many inputs, $x_1(t), x_2(t), \ldots x_n(t)$, each of which may be on a different time scale. It is desirable that the output x'(t) be extrapolated or interpolated to insure that all data are present on a single time scale. For example, if the data at $x_1(t)$ were on a time scale of one sample every second, represented by the time $t_k$, and the output time scale were desired to be the same, this would require time merging the rest of the data to that time scale. It may be seen that in this example, the data $x_2(t)$ occurs approximately once every three seconds, it also being noted that this may be asynchronous data, although it is illustrated as being synchronized. In other words, in some embodiments, the time intervals between data samples may not be constant. The data buffer in FIG. 8B is illustrated in actual time. The reconciliation may be as simple as holding the last value of the input $x_2(t)$ until a new value is input thereto, and then discarding the old value. In this manner, an output may always exist. This technique may also be used in the case of missing data. However, a reconciliation routine as described above may also be utilized to insure that data are always on the output for each time slice of the vector x'(t). This technique may also be used with respect to the target output which is preprocessed to provide the preprocessed target output y'(t).

In the example of input data (for training and/or operation) with differing time scales, one set of data may be taken on an hourly basis and another set of data taken on a quarter hour (i.e., every fifteen minutes) basis, thus, for three out of every four data records on the quarter hour basis there will be no corresponding data from the hourly set. These areas of missing data must be filled in to assure that all data are presented at commonly synchronized times to the support vector machine. In other words, the time scales of the two data sets must be the same, and so must be reconciled.

As another example of reconciling different time scales for input data sets, in one data set the data sample periods may be non-periodic, producing asynchronous data, while another data set may be periodic or synchronous, e.g., hourly, thus, their time scales differ. In this case, the asynchronous data may be reconciled to the synchronous data.

In another example of data sets with differing time scales, one data set may have a "hole" in the data, as described above, compared to another set, i.e., some data may be missing in one of the data sets. The presence of the hole may be considered to be an asynchronous or anomalous time interval in the data set, which may then require reconciliation with a second data set to be useful with the second set.

In yet another example of different time scales for input data sets, two data sets may have two different respective time scales, e.g., an hourly basis and a 15 minute basis. The desired time scale for input data to the SVM may have a third basis, e.g., daily. Thus, the two data sets may need to be reconciled with the third timeline prior to being used as input to the SVM.

Figure 8C:
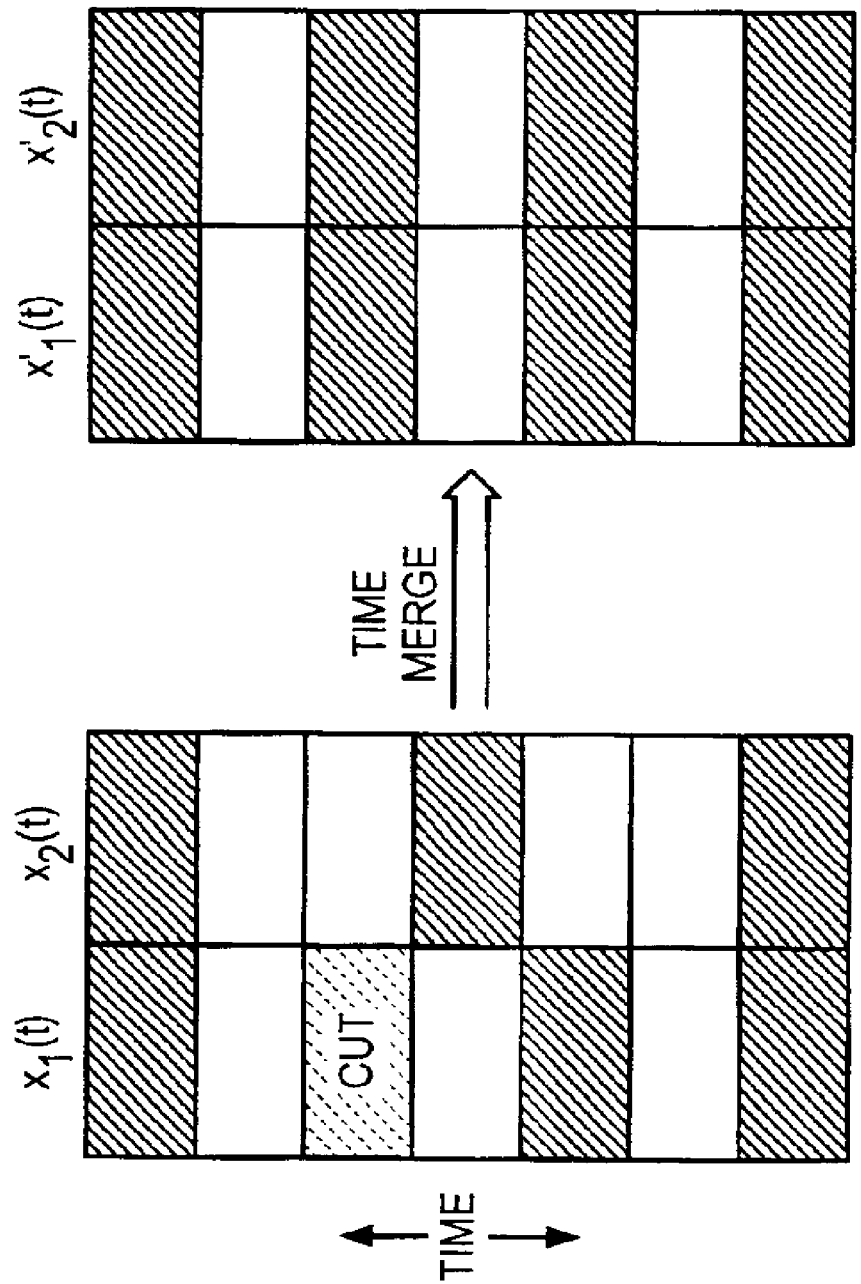

FIG. 8C illustrates one embodiment of the time merge operation. Illustrated are two formatted tables, one for the set of data $x_1(t)$ and $x_2(t)$, the second for the set of data $x'_1(t)$ and $x'_2(t)$. The data set for $x_1(t)$ is illustrated as being on one time scale and the data set for $x_2(t)$ is on a second, different time scale. Additionally, one value of the data set $x_1(t)$ is illustrated as being bad, and is therefore "cut" from the data set, as described below. In this example, the preprocessing operation fills in, i.e., replaces, this bad data and then time merges the data, as shown. In this example, the time scale for $x_1(t)$ is utilized as a time scale for the time merge data such that the time merge data $x'_1(t)$ is on the same time scale with the "cut" value filled in as a result of the preprocessing operation and the data set $x_2(t)$ is processed in accordance with one of the time merged algorithms to provide data for $x'_2(t)$ and on the same time scale as the data $x'_1(t)$. These algorithms will be described in more detail below.

Figure 9A:
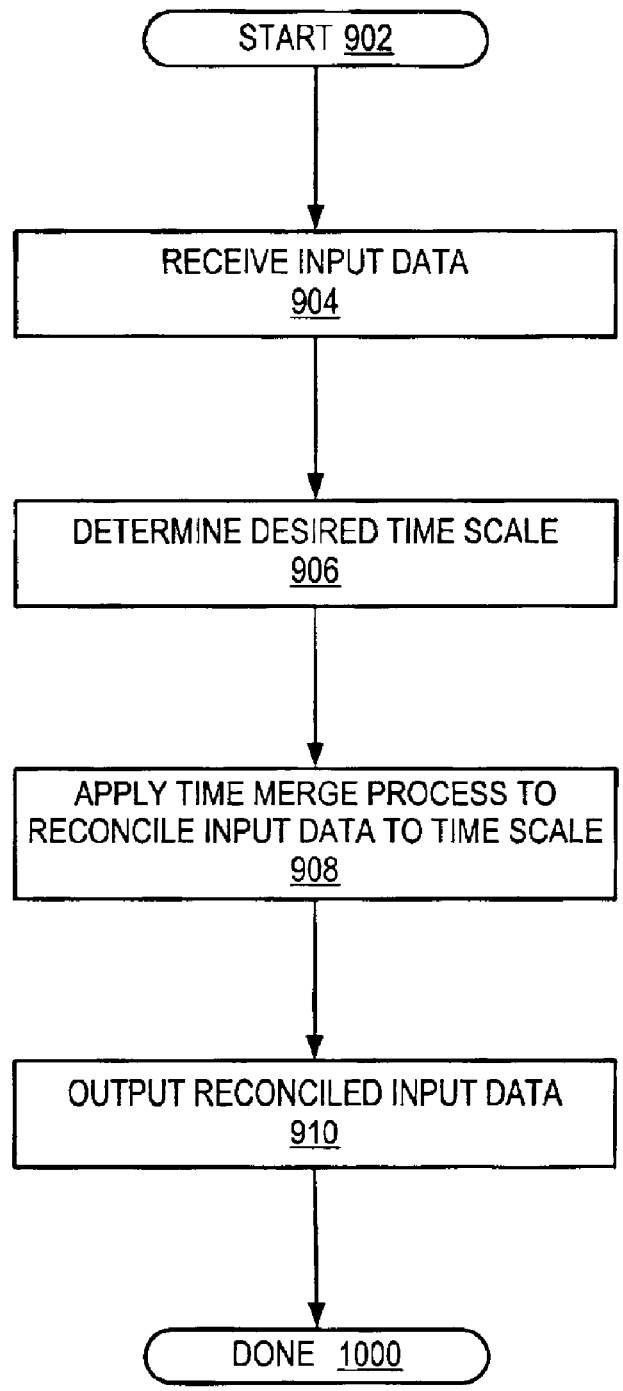
FIGS. 9A–9C are flowcharts depicting various embodiments of a preprocessing operation.

FIG. 9A is a high level flowchart depicting one embodiment of a preprocessing operation for preprocessing input data to a support vector machine. It should be noted that in other embodiments, various of the steps may be performed in a different order than shown, or may be omitted. Additional steps may also be performed.

The preprocess may be initiated at a start block 902. Then, in 904, input data for the support vector machine may be received, such as from a run-time system, or data storage. The received data may be stored in an input buffer.

As mentioned above, the support vector machine may comprise a non-linear model having a set of model parameters defining a representation of a system. The model parameters may be capable of being trained, i.e., the SVM may be trained via the model parameters or coefficients. The input data may be associated with at least two inputs of a support vector machine, and may be on different time scales relative to each other. In the case of missing data associated with a single input, the data may be considered to be on different timescales relative to itself, in that the data gap caused by the missing data may be considered an asynchronous portion of the data.

It should be noted that in other embodiments, the scales of the input data may be based on a different independent variable than time. In one embodiment, one time scale may be asynchronous, and a second time scale may be synchronous with an associated time sequence based on a time interval. In one embodiment, both time scales may be asynchronous. In yet another embodiment, both time scales may be synchronous, but based on different time intervals. As also mentioned above, this un-preprocessed input data may be considered "raw" input data.

In 906, a desired time scale (or other scale, depending on the independent variable) may be determined. For example, a synchronous time scales represented in the data (if one exists) may be selected as the desired time scale. In another embodiment, a predetermined time scale may be selected.

In 908, the input data may be reconciled to the desired time scale. In one embodiment, the input data stored in the input buffer of 904 may be reconciled by a time merge device, such as a software program, thereby generating reconciled data. Thus, after being reconciled by a time merge process, all of the input data for all of the inputs may be on the same time scale. In embodiments where the independent variable of the data is not time, the merge device may reconcile the input data such that all of the input data are on the same independent variable scale.

In one embodiment, where the input data associated with at least one of the inputs has missing data in an associated time sequence, the time merge device may be operable to reconcile the input data to fill in the missing data, thereby reconciling the gap in the data to the time scale of the data set.

In one embodiment, the input data associated with first one or more of the inputs may have an associated time sequence based on a first time interval, and a second one or more of the inputs may have an associated time sequence based on a second time interval. In this case, the time merge device may be operable to reconcile the input data associated with the first one or more of the inputs to the input data associated with the second one or more other of the inputs, thereby generating reconciled input data associated with the first one or more of the inputs having an associated time sequence based on the second time interval.

In another embodiment, the input data associated with a first one or more of the inputs may have an associated time sequence based on a first time interval, and the input data associated with a second different one or more of the inputs may have an associated time sequence based on a second time interval. The time merge device may be operable to reconcile the input data associated with the first one or more of the inputs and the input data associated with the second one or more of the inputs to a time scale based on a third time interval, thereby generating reconciled input data associated with the first one or more of the inputs and the second one or more of the inputs having an associated time sequence based on the third time interval.

In one embodiment, the input data associated with a first one or more of the inputs may be asynchronous, and wherein the input data associated with a second one or more of the inputs may be synchronous with an associated time sequence based on a time interval. The time merge device may be operable to reconcile the asynchronous input data to the synchronous input data, thereby generating reconciled input data associated with the first one or more, wherein the reconciled input data comprise synchronous input data having an associated time sequence based on the time interval.

In 910, in response to the reconciliation of 908, the reconciled input data may be output. In one embodiment, an output device may output the data reconciled by the time merge device as reconciled data, where the reconciled data comprise the input data to the support vector machine.

In one embodiment, the received input data of 904 may comprise training data which includes target input data and target output data. The reconciled data may comprise reconciled training data which includes reconciled target input data and reconciled target output data which are both based on a common time scale (or other common scale).

In one embodiment, the support vector machine may be operable to be trained according to a predetermined training algorithm applied to the reconciled target input data and the reconciled target output data to develop model parameter values such that the support vector machine has stored therein a representation of the system that generated the target output data in response to the target input data. In other words, the model parameters of the support vector machine may be trained based on the reconciled target input data and the reconciled target output data, after which the support vector machine may represent the system.

In one embodiment, the input data of 904 may comprise run-time data, such as from the system being modeled, and the reconciled data of 908 may comprise reconciled run-time data. In this embodiment, the support vector machine may be operable to receive the run-time data and generate run-time output data. In one embodiment, the run-time output data may comprise control parameters for the system. The control parameters may be usable to determine control inputs to the system for run-time operation of the system. For example, in an e-commerce system, control inputs may include such parameters as advertisement or product placement on a website, pricing, and credit limits, among others.

In another embodiment, the run-time output data may comprise predictive output information for the system. For example, the predictive output information may be usable in making decisions about operation of the system. In an embodiment where the system may be a financial system, the predictive output information may indicate a recommended shift in investment strategies, for example. In an embodiment where the system may be a manufacturing plant, the predictive output information may indicate production costs related to increased energy expenses, for example.

Figure 9B:
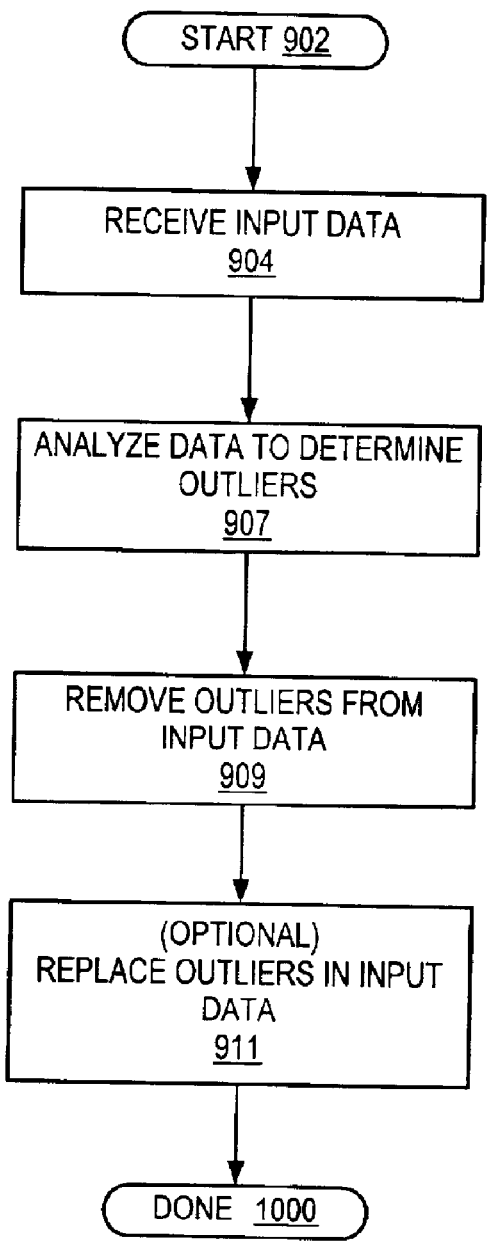

FIG. 9B is a high level flowchart depicting another embodiment of a preprocessing operation for preprocessing input data to a support vector machine. As noted above, in other embodiments, various of the steps may be performed in a different order than shown, or may be omitted. Additional steps may also be performed. In this embodiment, the input data may include one or more outlier values which may be disruptive or counter-productive to the training and/or operation of the support vector machine.

The preprocess may be initiated at a start block 902. Then, in 904, input data for the support vector machine may be received, as described above with reference to FIG. 9A, and may be stored in an input buffer.

In 907, the received data may be analyzed to determine any outliers in the data set. In other words, the data may be analyzed to determine which, if any, data values fall above or below an acceptable range.

After the determination of any outliers in the data, in 909, the outliers, if any, may be removed from the data, thereby generating corrected input data. The removal of outliers may result in a data set with missing data, i.e., with gaps in the data.

In one embodiment, a graphical user interface (GUI) may be included whereby a user or operator may view the received data set. The GUI may thus provide a means for the operator to visually inspect the data for bad data points, i.e., outliers. The GUI may further provide various tools for modifying the data, including tools for "cutting" the bad data from the set.

In one embodiment, the detection and removal of the outliers may be performed by the user via the GUI. In another embodiment, the user may use the GUI to specify one or more algorithms which may then be applied to the data programmatically, i.e., automatically. In other words, a GUI may be provided which is operable to receive user input specifying one or more data filtering operations to be performed on the input data, where the one or more data filtering operations operate to remove and/or replace the one or more outlier values. Additionally, the GUI may be further operable to display the input data prior to and after performing the filtering operations on the input data. Finally, the GUI may be operable to receive user input specifying a portion of said input data for the data filtering operations. Further details of the GUI are provided below with reference to FIGS. 10A–10F.

After the outliers have been removed from the data in 909, the removed data may optionally be replaced, as indicated in 911. In other words, the preprocessing operation may "fill in" the gap resulting from the removal of outlying data. Various techniques may be brought to bear to generate the replacement data, including, but not limited to, clipping, interpolation, extrapolation, spline fits, sample/hold of a last prior value, etc., as are well known in the art.

In another embodiment, the removed outliers may be replaced in a later stage of preprocessing, such as the time merge process described above. In this embodiment, the time merge process will detect that data are missing, and operate to fill the gap.

Thus, in one embodiment, the preprocess may operate as a data filter, analyzing input data, detecting outliers, and removing the outliers from the data set. The filter parameters may simply be a predetermined value limit or range against which a data value may be tested. If the value falls outside the range, the value may be removed, or clipped to the limit value, as desired. In one embodiment, the limit(s) or range may be determined dynamically. For example, in one embodiment, the range may be determined based on the standard deviation of a moving window of data in the data set, e.g., any value outside a two sigma band for a moving window of 100 data points may be clipped or removed. As mentioned above, the data filter may also operate to replace the outlier values with more appropriate replacement values.

In one embodiment, the received input data of 904 may comprise training data including target input data and target output data, and the corrected data may comprise corrected training data which includes corrected target input data and corrected target output data.

In one embodiment, the support vector machine may be operable to be trained according to a predetermined training algorithm applied to the corrected target input data and the corrected target output data to develop model parameter values such that the support vector machine has stored therein a representation of the system that generated the target output data in response to the target input data. In other words, the model parameters of the support vector machine may be trained based on the corrected target input data and the corrected target output data, after which the support vector machine may represent the system.

In one embodiment, the input data of 904 may comprise run-time data, such as from the system being modeled, and the corrected data of 908 may comprise reconciled run-time data. In this embodiment, the support vector machine may be operable to receive the corrected run-time data and generate run-time output data. In one embodiment, the run-time output data may comprise control parameters for the system. The control parameters may be usable to determine control inputs to the system for run-time operation of the system. For example, in an e-commerce system, control inputs may include such parameters as advertisement or product placement on a website, pricing, and credit limits, among others.

In another embodiment, the run-time output data may comprise predictive output information for the system. For example, the predictive output information may be usable in making decisions about operation of the system. In an embodiment where the system may be a financial system, the predictive output information may indicate a recommended shift in investment strategies, for example. In an embodiment where the system may be a manufacturing plant, the predictive output information may indicate production costs related to increased energy expenses, for example.

Thus, in one embodiment, the preprocessor may be operable to detect and remove and/or replace outlying data in an input data set for the support vector machine.

Figure 9C:
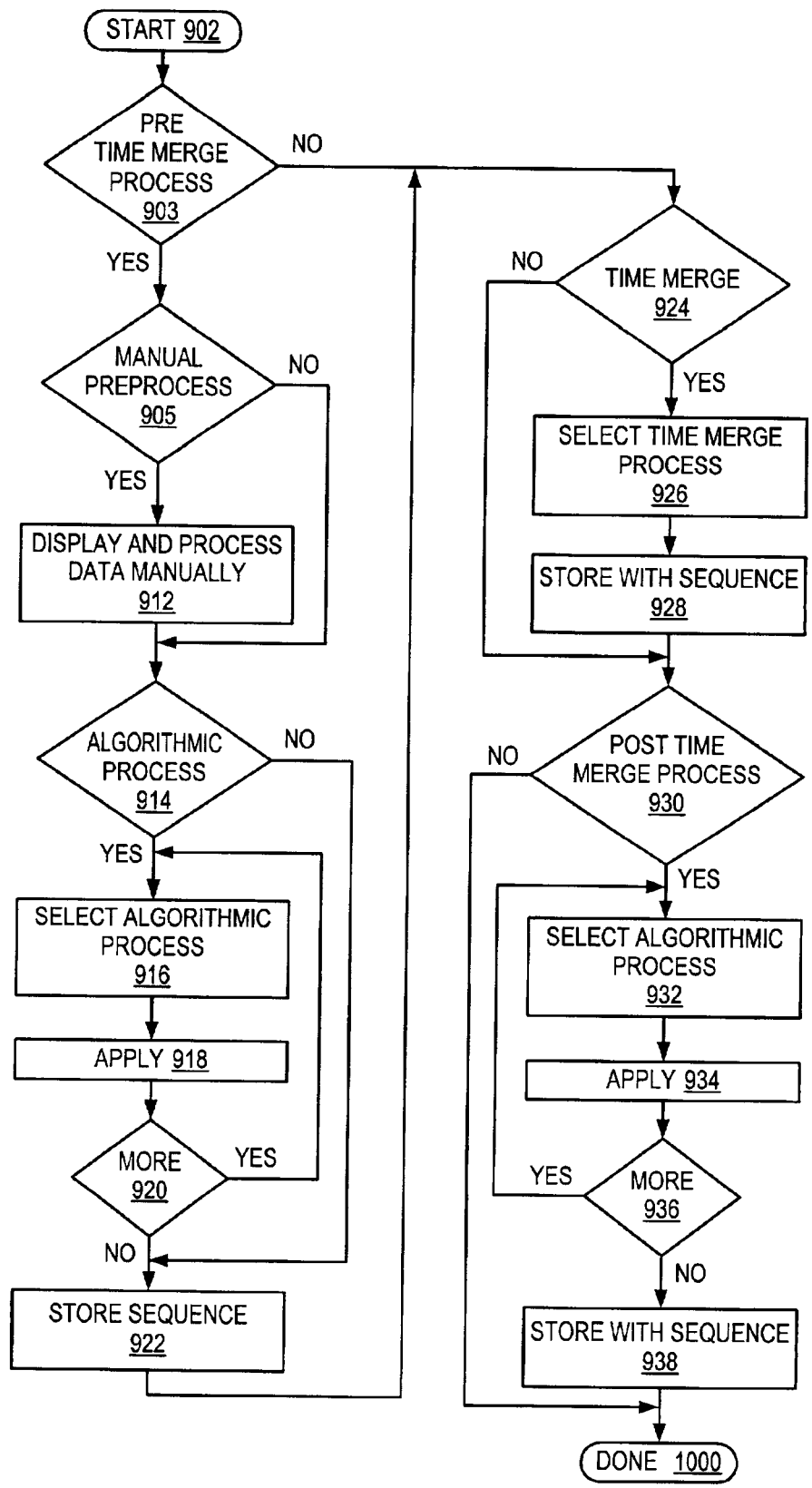

FIG. 9C is a detailed flowchart depicting one embodiment of the preprocessing operation. In this embodiment, the preprocessing operations described above with reference to FIGS. 9A and 9B are both included. It should be noted that in other embodiments, various of the steps may be performed in a different order than shown, or may be omitted. Additional steps may also be performed.

The flow chart may be initiated at start block 902 and then may proceed to a decision block 903 to determine if there are any pre-time merge process operations to be performed. If so, the program may proceed to a decision block 905 to determine whether there are any manual preprocess operations to be performed. If so, the program may continue along the "Yes" path to a function block 912 to manually preprocess the data. In the manual preprocessing of data 912, the data may be viewed in a desired format by the operator and the operator may look at the data and eliminate, "cut", or otherwise modify obviously bad data values.

For example, if the operator notices that one data value is significantly out of range with the normal behavior of the remaining data, this data value may be "cut" such that it is no longer present in the data set and thereafter appears as missing data. This manual operation is in contrast to an automatic operation where all values may be subjected to a predetermined algorithm to process the data.

In one embodiment, an algorithm may be generated or selected that either cuts out all data above/below a certain value or clips the values to a predetermined maximum/minimum. In other words, the algorithm may constrain values to a predetermined range, either removing the offending data altogether, or replacing the values, using the various techniques described above, including clipping, interpolation, extrapolation, splines, etc. The clipping to a predetermined maximum/minimum is an algorithmic operation that is described below.

After displaying and processing the data manually, the program may proceed to a decision block 914. It is noted that if the manual preprocess operation is not utilized, the program may continue from the decision block 905 along the "No" path to the input of decision block 914. The decision block 914 may be operable to determine whether an algorithmic process is to be applied to the data. If so, the program may continue along a "Yes" path to a function block 916 to select a particular algorithmic process for a given set of data. After selecting the algorithmic process, the program may proceed to a function block 918 to apply the algorithmic process to the data and then to a decision block 920 to determine if more data are to be processed with the algorithmic process. If so, the program may flow back around to the input of the function block 916 along a "Yes" path, as shown. Once all data have been subjected to the desired algorithmic processes, the program may flow along a "No" path from decision block 920 to a function block 922 to store the sequence of algorithmic processes such that each data set has the desired algorithmic processes applied thereto in the sequence. Additionally, if the algorithmic process is not selected by the decision block 914, the program may flow along a "No" path to the input of the function block 922.

After the sequence is stored in the function block 922, the program may flow to a decision block 924 to determine if a time merge operation is to be performed. The program also may proceed along a "No" path from the decision block 903 to the input of decision block 924 if the pre-time-merge process is not required. The program may continue from the decision block 924 along the "Yes" path to a function block 926 if the time merge process has been selected, and then the time merge operation may be performed. The time merge process may then be stored with the sequence as part thereof in block 928. The program then may proceed to a decision block 930 to determine whether the post time merge process is to be performed. If the time merge process is not performed, as determined by the decision block 924, the program may flow along the "No" path therefrom to the decision block 930.

If the post time merge process is to be performed, the program may continue along the "Yes" path from the decision block 930 to a function block 932 to select the algorithmic process and then to a function block 934 to apply the algorithmic process to the desired set of data and then to a decision block 936 to determine whether additional sets of data are to be processed in accordance with the algorithmic process. If so, the program may flow along the "Yes" path back to the input of function block 932, and if not, the program may flow along the "No" path to a function block 938 to store the new sequence of algorithmic processes with the sequence and then the program may proceed to a DONE block 1000. If the post time merge process is not to be performed, the program may flow from the decision block 930 along the "No" path to the DONE block 1000.

Referring now to FIGS. 10A–10E, there are illustrated embodiments of three plots of data. FIGS. 10A–10E also illustrate one embodiment of a graphical user interface (GUI) for various data manipulation/reconciliation operations which may be included in one embodiment of the present invention. It is noted that these embodiments are meant to be exemplary illustrations only, and are not meant to limit the application of the invention to any particular application domain or operation. In this example, each figure includes one plot for an input "temp1", one plot for an input "press2" and one plot for an output "ppm", as may relate to a chemical plant. In this example, the first input may relate to a temperature measurement, the second input may relate to a pressure measurement, and the output data may correspond to a parts per million variation.

Figure 10A:
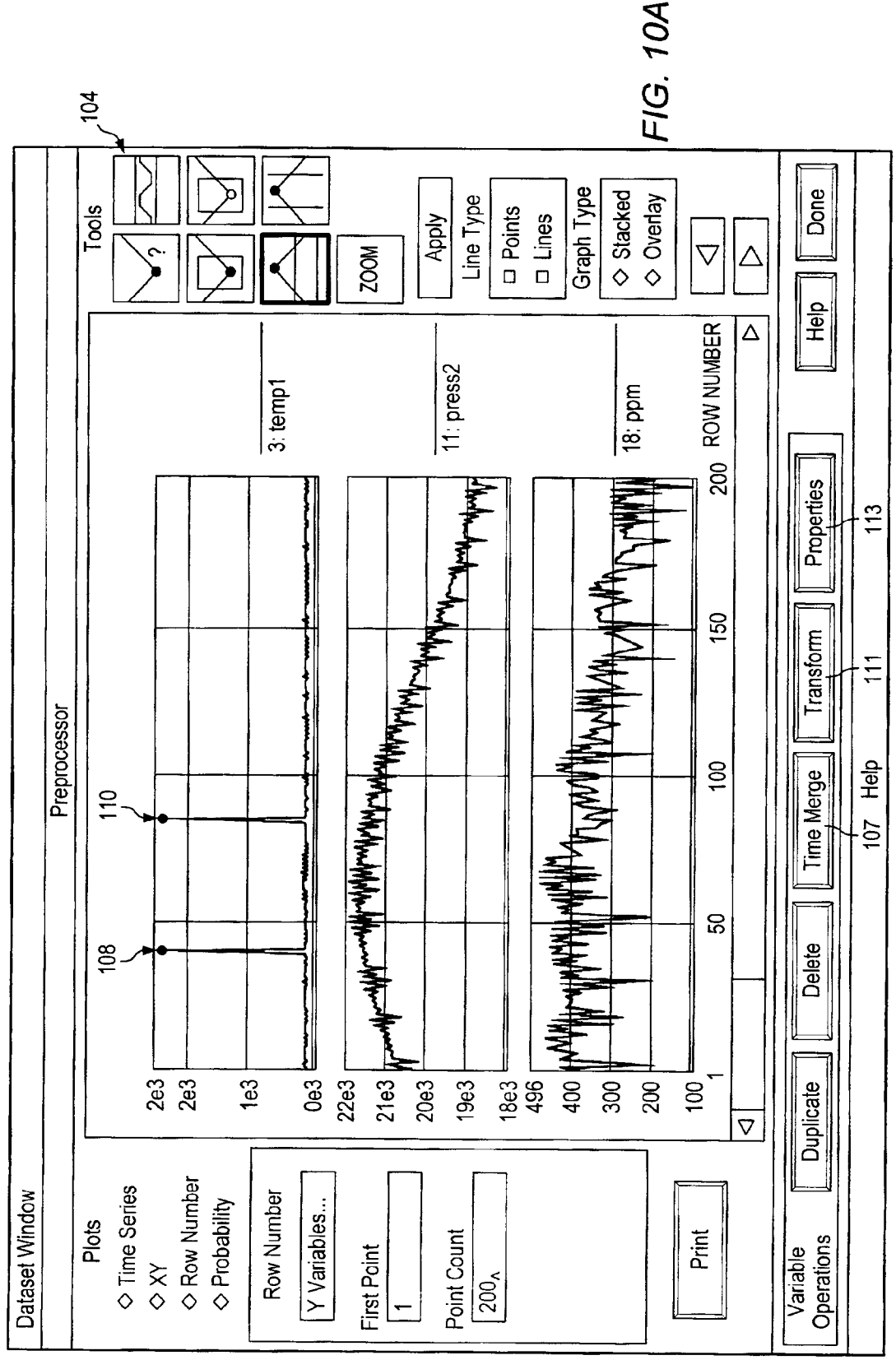
FIGS. 10A–10F illustrate the use of graphical tools for preprocessing the "raw" data, according to various embodiments.
Figure 10B:
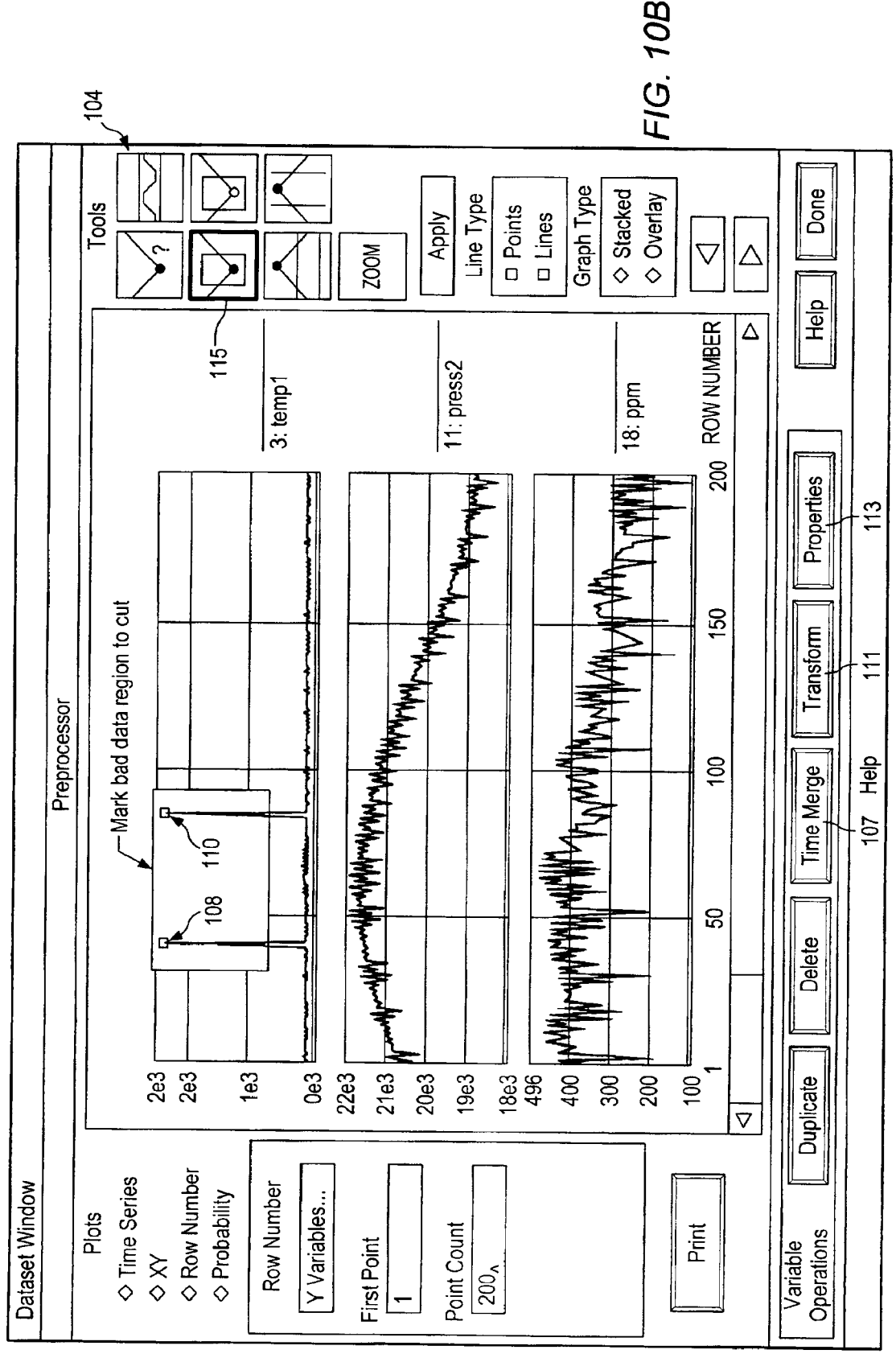
Figure 10C:
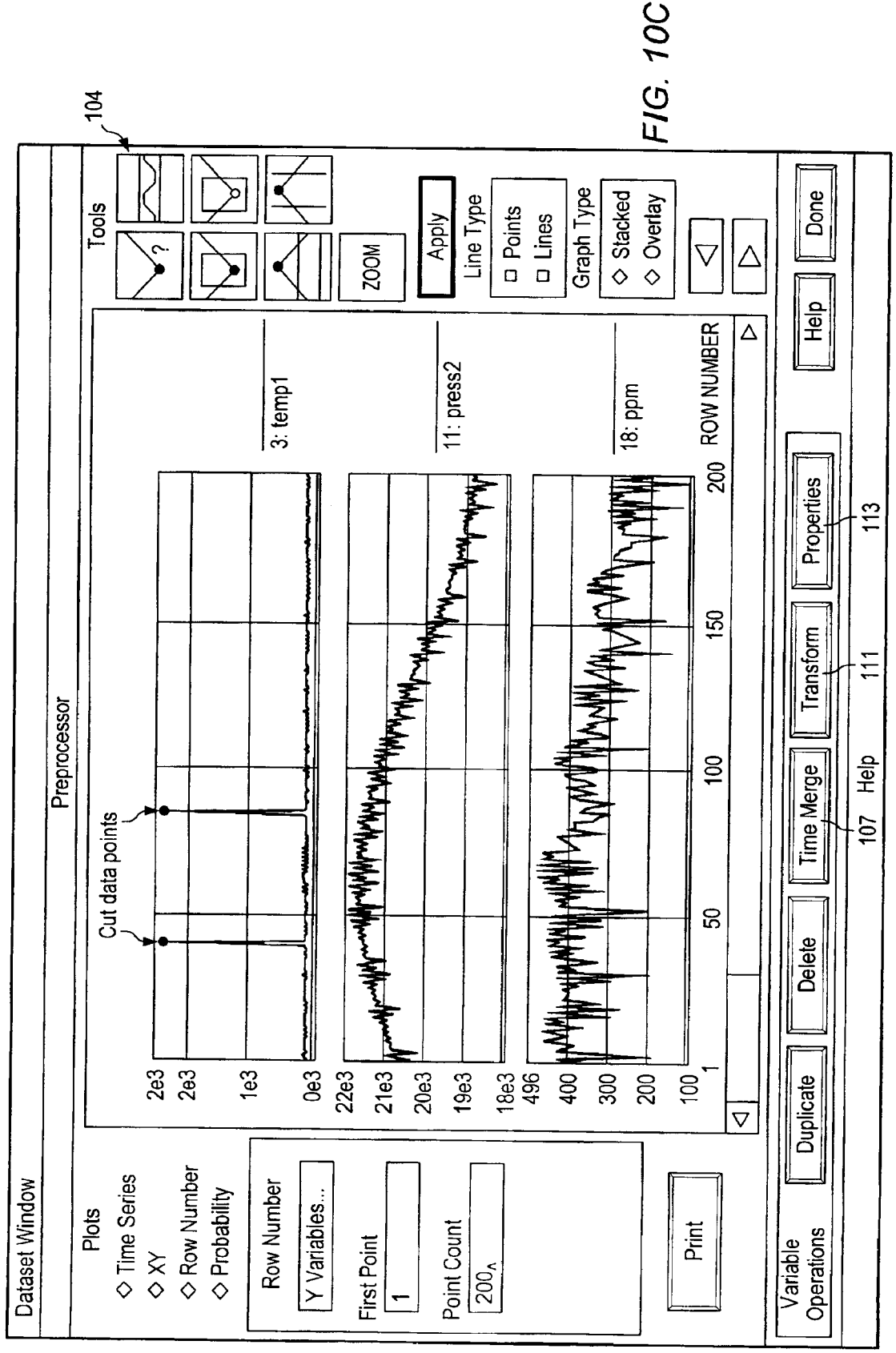

As shown in FIGS. 10A–10C, in the first data set, the temp1 data, there are two points of data 108 and 110, which need to be "cut" from the data, as they are obviously bad data points. Such data points that lie outside the acceptable range of a data set are generally referred to as "outliers". These two data points appear as cut data in the data-set, as shown in FIG. 10C, which then may be filled in or replaced by the appropriate time merge operation utilizing extrapolation, interpolation, or other techniques, as desired.

Thus, in one embodiment, the data preprocessor may include a data filter which may be operable to analyze input data, detect outliers, and remove the outliers from the data set. As mentioned above, in one embodiment, the applied filter may simply be a predetermined value limit or range against which a data value may be tested. If the value falls outside the range, the value may be removed, or clipped to the limit value, as desired. In one embodiment, the limit(s) or range may be determined dynamically. For example, in one embodiment, the range may be determined based on the standard deviation of a moving window of data in the data set, e.g., any value outside a two sigma band for a moving window of 100 data points may be clipped or removed. In one embodiment, the filter may replace any removed outliers using any of such techniques as extrapolation and interpolation, among others. In another embodiment, as mentioned above, the removed outliers may be replaced in a later stage of processing, such as the time merge process described herein. In this embodiment, the time merge process will detect that data are missing, and operate to fill the gaps.

Figure 10D:
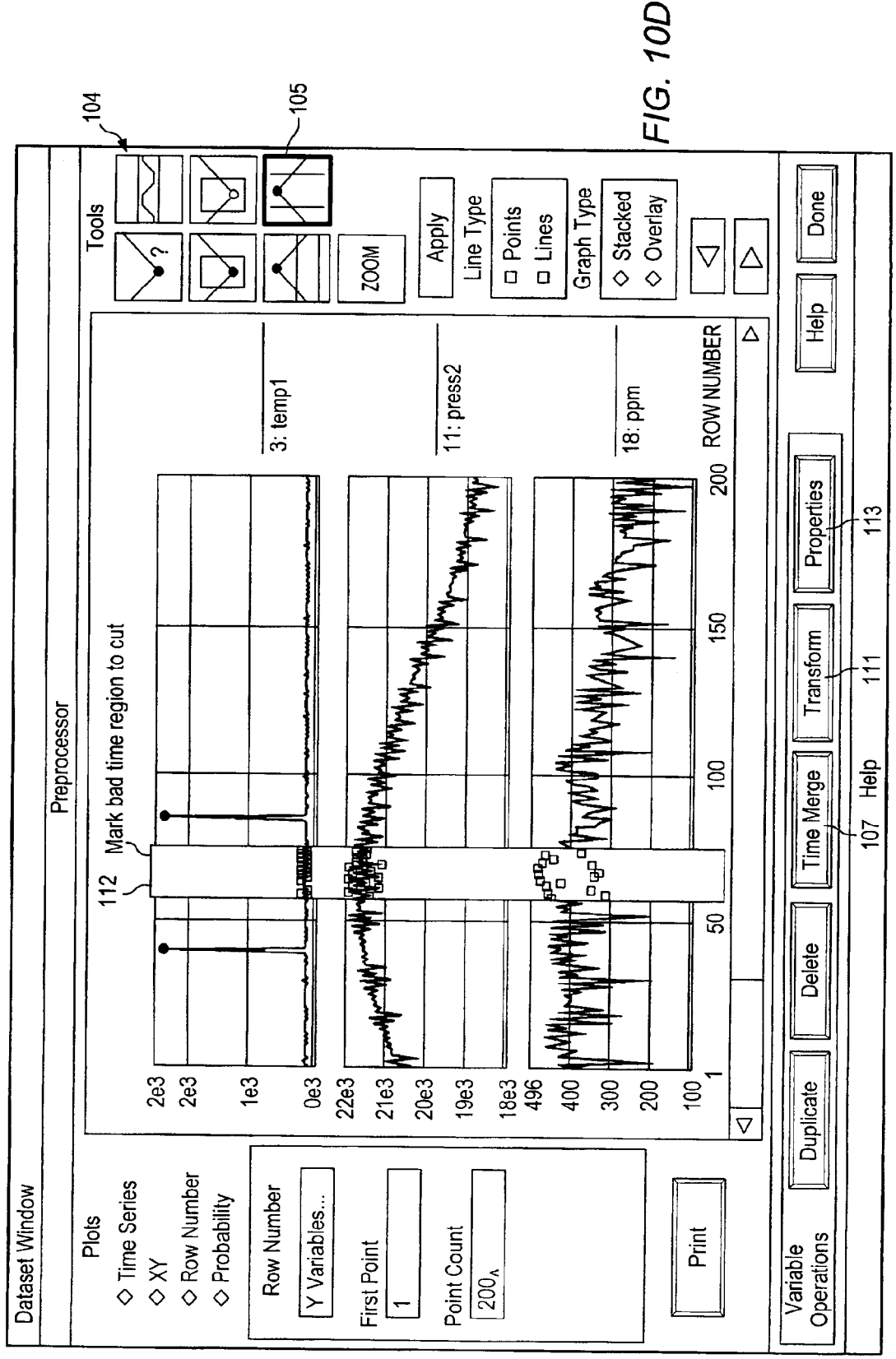
Figure 10E:
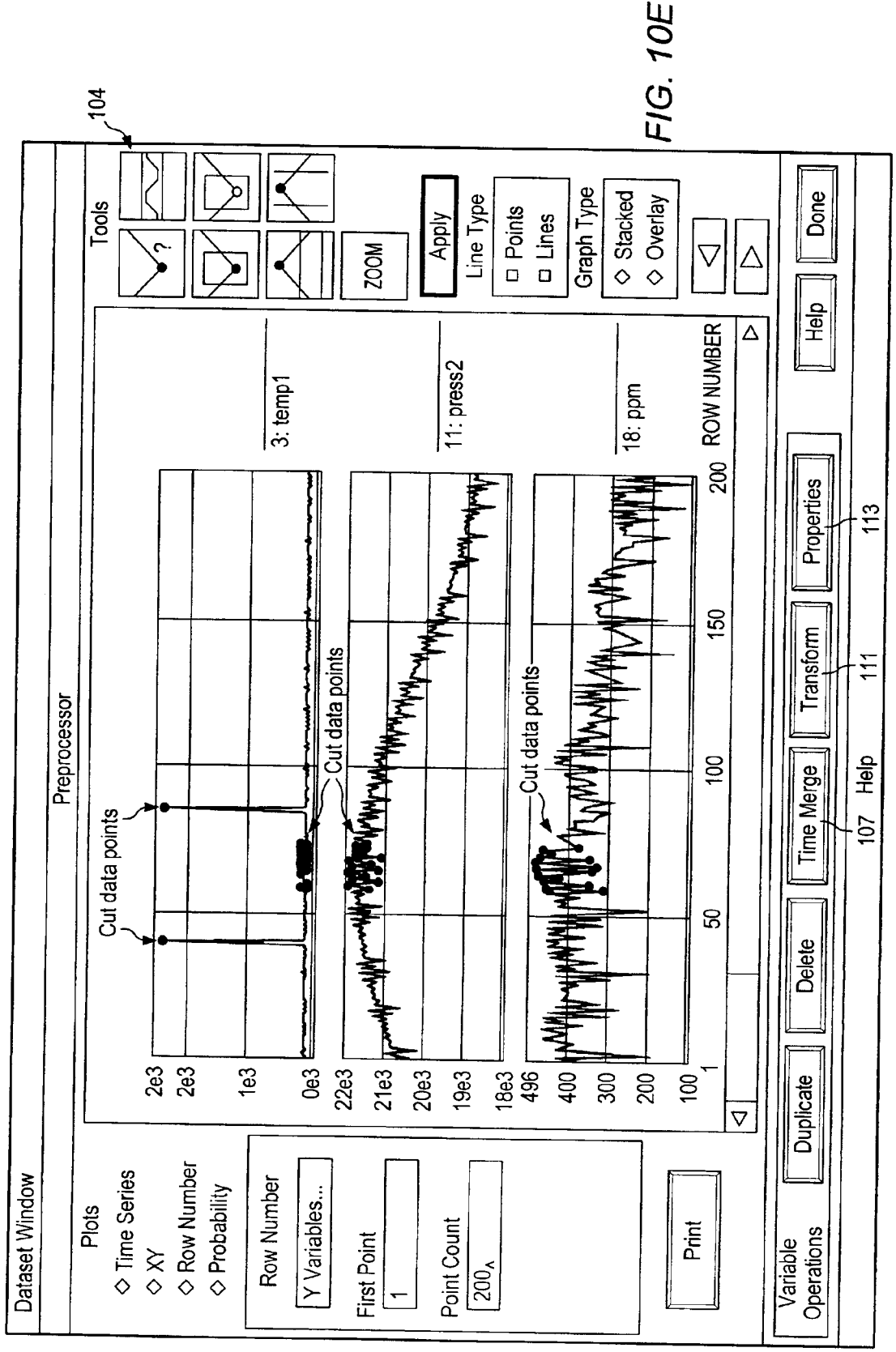
Figure 10F:
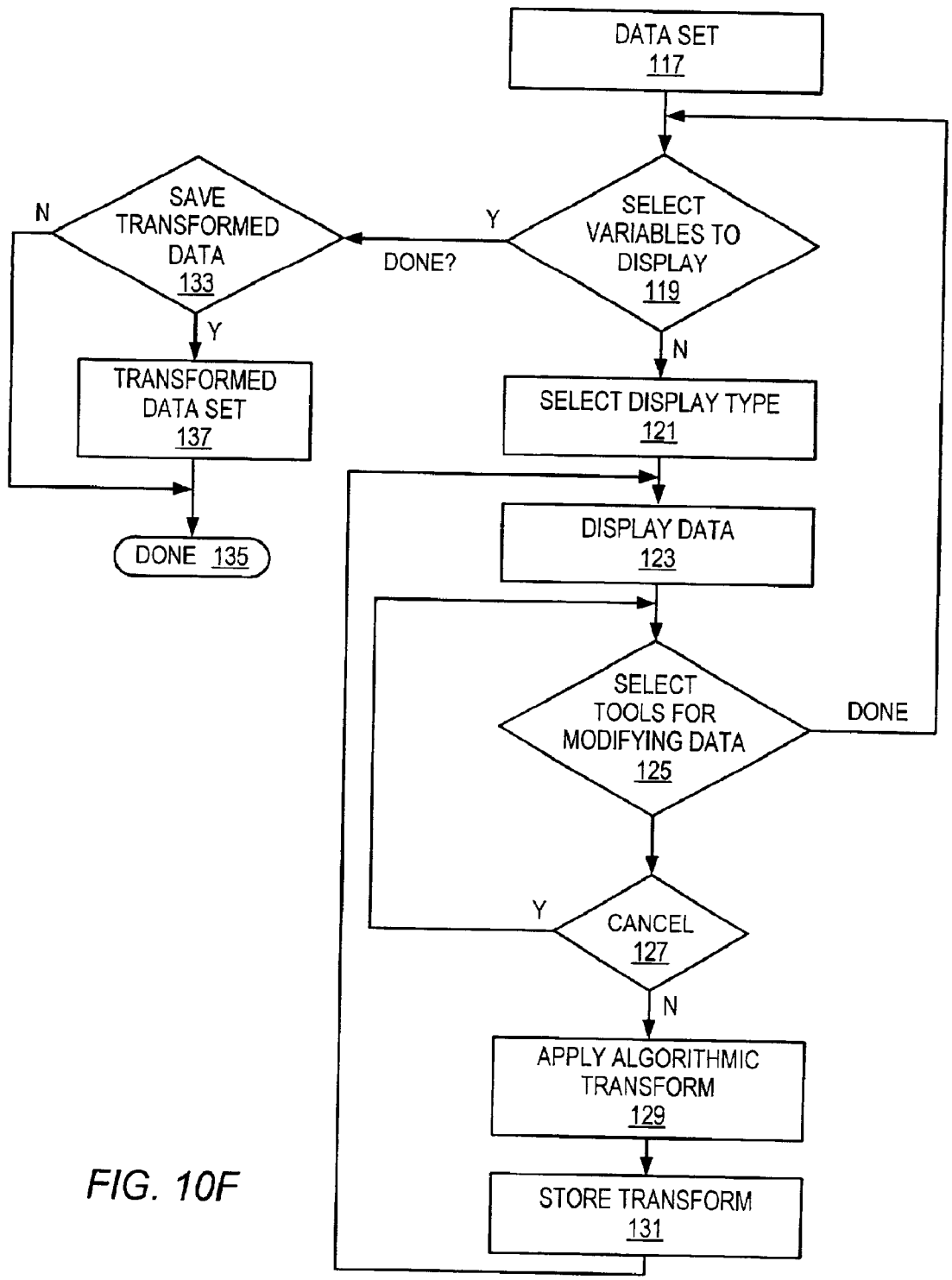

FIG. 10A shows the raw data. FIG. 10B shows the use of a cut data region tool 115. FIG. 10B shows the points 108 and 110 highlighted by dots showing them as cut data points. In one embodiment of the GUI presented on a color screen, these dots may appear in red. FIG. 10D shows a vertical cut of the data, cutting across several variables simultaneously. Applying this cut may cause all of the data points to be marked as cut, as shown in FIG. 10E. FIG. 10F flowcharts one embodiment of the steps involved in cutting or otherwise modifying the data. In one embodiment, a region of data may be selected by a set of boundaries 112 (in FIG. 10D), which results may be utilized to block out data. For example, if it were determined that data during a certain time period were invalid due to various reasons, these data may be removed from the data sets, with the subsequent preprocessing operable to fill in the "blocked" or "cut" data.

In one embodiment, the data may be displayed as illustrated in FIGS. 10A–10E, and the operator may select various processing techniques to manipulate the data via various tools, such as cutting, clipping and viewing tools 107, 111, 113, that may allow the user to select data items to cut, clip, transform or otherwise modify. In one mode, the mode for removing data, this may be referred to as a manual manipulation of the data. However, algorithms may be applied to the data to change the value of that data. Each time the data are changed, the data may be rearranged in the spreadsheet format of the data. In one embodiment, the operator may view the new data as the operation is being performed.

With the provisions of the various clipping and viewing tools 107, 111, and 113, the user may be provided the ability to utilize a graphic image of data in a database, manipulate the data on a display in accordance with the selection of the various cutting tools, and modify the stored data in accordance with these manipulations. For example, a tool may be utilized to manipulate multiple variables over a given time range to delete all of that data from the input database and reflect it as "cut" data. The data set may then be considered to have missing data, which may require a data reconciliation scheme in order to replace this data in the input data stream. Additionally, the data may be "clipped"; that is, a graphical tool may be utilized to determine the level at which all data above (or below) that level is modified. All data in the data set, even data not displayed, may be modified to this level. This in effect may constitute applying an algorithm to that data set.

In FIG. 10F, the flowchart depicts one embodiment of an operation of utilizing the graphical tools for cutting data. An initiation block, data set 117, may indicate the acquisition of the data set. The program then may proceed to a decision block 119 to determine if the variables have been selected and manipulated for display. If not, the program may proceed along a "No" path to a function block 121 to select the display type and then to a function block 123 to display the data in the desired format. The program then may continue to a decision block 125 wherein tools for modifying the data are selected. When this is done, the program may continue along a "DONE" line back to decision block 119 to determine if all of the variables have been selected. However, if the data are still in the modification stage, the program may proceed to a decision block 127 to determine if an operation is cancelled and, if so, may proceed back around to the decision block 125. If the operation is not cancelled, the program may continue along a "No" path to function block 129 to apply the algorithmic transformation to the data and then to function block 131 to store the transform as part of a sequence. The program then may continue back to function block 123. This may continue until the program continues along the "DONE" path from decision block 125 back to decision block 119.

Once all the variables have been selected and displayed, the program may proceed from decision block 119 along a "Yes" path to decision block 133 to determine if the transformed data are to be saved. If not, the program may proceed along an "No" path to "DONE" block 135. If the transformed data are to be saved, the program may continue from the decision block 133 along the "Yes" path to a function block 137 to transform the data set and then to the "DONE" block 135.

Figure 11:
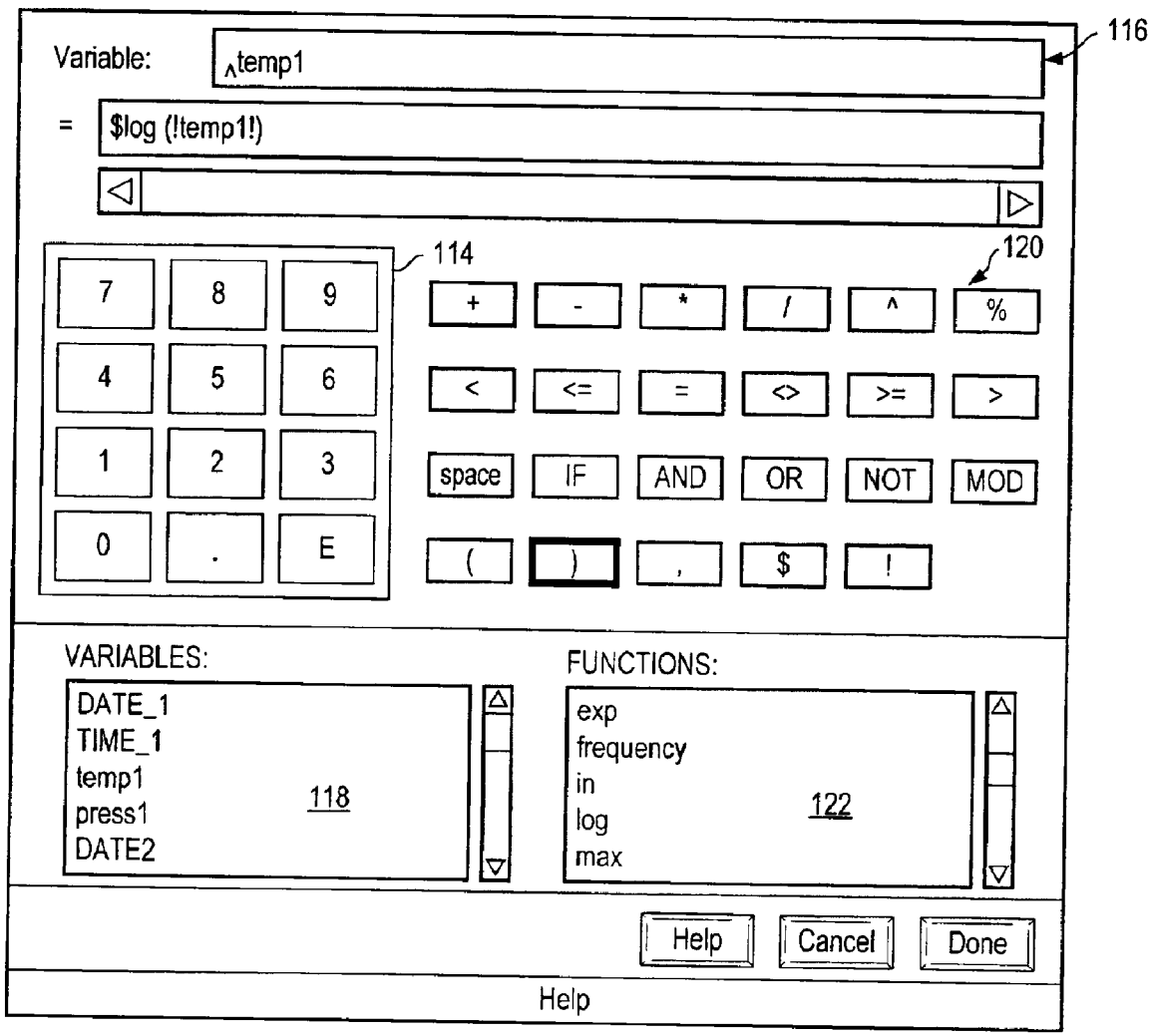
FIG. 11 illustrates the display for the algorithm selection operation, according to one embodiment.

FIG. 11 is a diagrammatic view of a display (i.e., a GUI) for performing algorithmic functions on the data, according to one embodiment. In one embodiment, the display may include a first numerical template 114 which may provide a numerical keypad function. A window 116 may be provided that may display the variable(s) that is/are being operated on. The variables that are available for manipulation may be displayed in a window 118. In this embodiment, the various variables are arranged in groups, one group associated with a first date and time, e.g., variables temp1 and press1, and a second group associated with a second date and time, e.g., variables temp2 and press2, for example, prior to time merging. A mathematical operator window 120 may be included that may provide various mathematical operators (e.g., "+", "−", etc.) which may be applied to the variables. Various logical operators may also be available in the window 120 (e.g., "AND", "OR", etc.). Additionally, in one embodiment, a functions window 122 may be included that may allow selection of various mathematical functions, logical functions, etc. (e.g., exp, frequency, in, log, max, etc.) for application to any of the variables, as desired.

In the example illustrated in FIG. 11, the variable temp1 may be selected to be processed and the logarithmic function selected for application thereto. For example, the variable temp1 may first be selected from window 118 and then the logarithmic function "log" selected from the window 122. In one embodiment, the left parenthesis may then be selected from window 120, followed by the selection of the variable temp1 from window 118, then followed by the selection of the right parenthesis from window 120. This may result in the selection of an algorithmic process which includes a logarithm of the variable temp1. This may then be stored as a sequence, such that upon running the data through the run-time sequence, data associated with the variable temp1 has the logarithmic function applied thereto prior to inputting to the run-time system model 26. This process may be continued or repeated for each desired operation.

After the data have been manually preprocessed as described above with reference to FIGS. 10A–10F, the resultant data may be as depicted in Table 1, as shown in FIG. 12. It may be seen in Table 1 that there is a time scale difference, one group associated with the time TIME__1 and one group associated with the time TIME__2. It may be seen that the first time scale is based on an hourly interval and that the second time scale is based on a two hour interval. Any "cut" data (not shown) would appear as missing data.

After the data have been manually preprocessed, the algorithmic processes may be applied thereto. In the example described above with reference to FIG. 11, the variable temp1 is processed by taking a logarithm thereof. This may result in a variation of the set of data associated with the variable temp1. This is illustrated in Table 2, as shown in FIG. 12.

The sequence of operations associated therewith may determine the data that were cut out of the original data set for data temp1 and also the algorithmic processes associated therewith, these being in a sequence which is stored in the sequence block 14 and which may be examined via a data-column properties module 113, shown in FIGS. 10A–10E, as illustrated in Properties 2, of FIG. 12.

To perform the time merge, the operator may select the time merge function 115, illustrated in FIG. 10B, and may specify the time scale and type of time merge algorithm. For example, in FIG. 10B, a one-hour time-scale is selected and the box-car algorithm of merging is used.

After the time merge, the time scale may be disposed on an hourly interval with the time merge process. This is illustrated in Table 3 of FIG. 12, wherein all of the data are on a common time scale and the cut data has been extrapolated to insert new data.

The sequence after time merge may include the data that are cut from the original data sets, the algorithmic processes utilized during the pre-time merge processing, and the time merge data. This is illustrated in Properties 3, as shown in FIG. 12.

After the time merge operation, additional processing may be utilized. For example, the display of FIG. 11 may again be pulled up, and another algorithmic process selected. One example may be to take the variable temp1 after time merge and add a value of 5000 to this variable. This may result in each value in the column associated with the variable temp1 being increased by that value, as illustrated by the data in Table 4 of FIG. 12. The sequence may then be updated using the sequence presented in Properties 4, as shown in FIG. 12.

Figure 13:
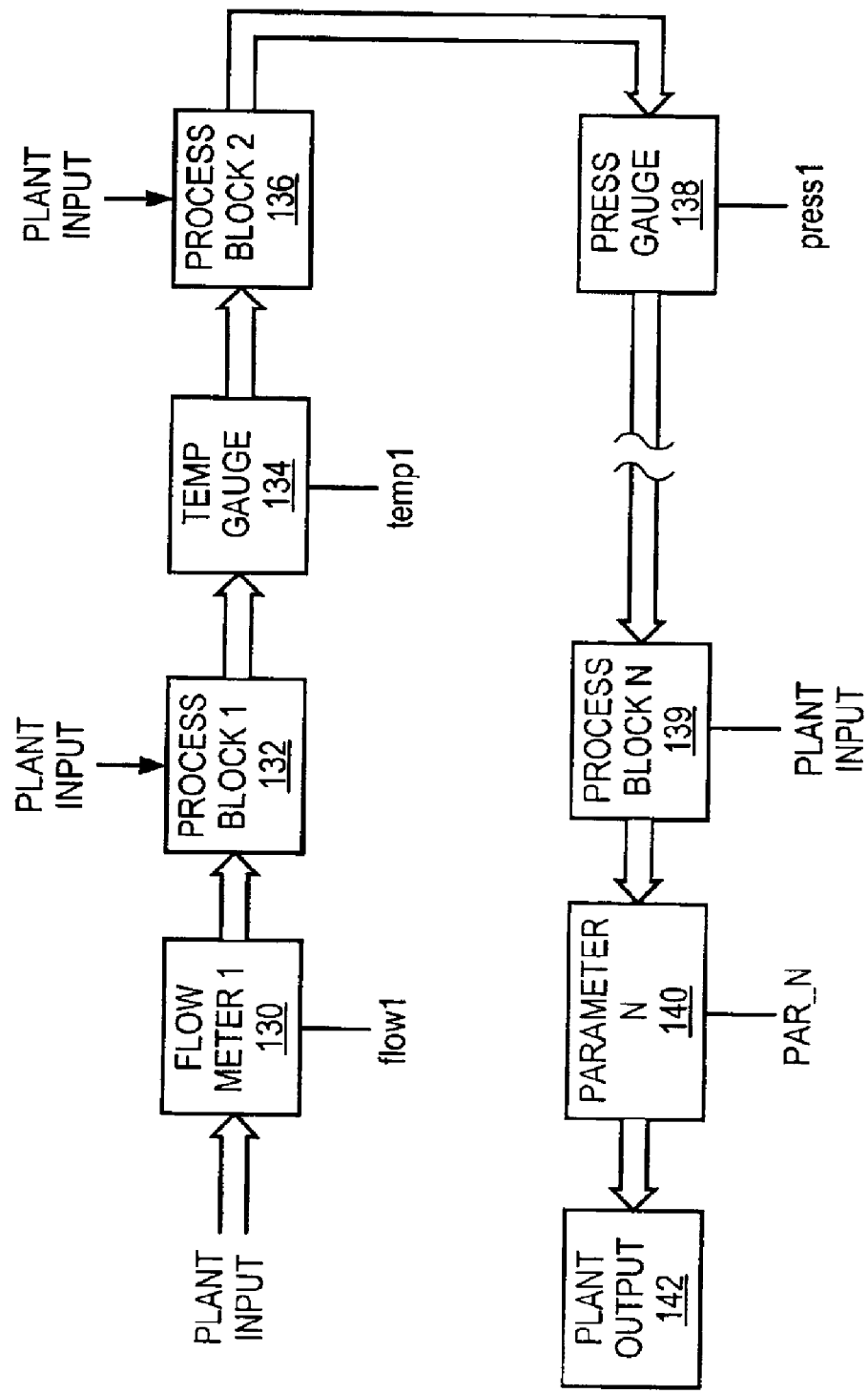
FIG. 13 is a block diagram depicting parameters associated with various stages in process flow relative to a plant output, according to one embodiment.

FIG. 13 is a block diagram of one embodiment of a process flow, such as, for example, a process flow through a plant. Again, it is noted that although operation and control of a plant is an exemplary application of one embodiment of the present invention, any other process may also be suitable for application of the systems and methods described herein, including scientific, medical, financial, stock and/or bond management, and manufacturing, among others.

There is a general flow input to the plant which may be monitored at some point by flow meter 130. The flow meter 130 may provide a variable output flow1. The flow may continue to a process block 132, wherein various plant processes may be carried out. Various plant inputs may be provided to this process block 132. The flow may then continue to a temperature gauge 134, which may output a variable temp1. The flow may proceed to a process block 136 to perform other plant processes, these also receiving plant inputs. The flow may then continue to a pressure gauge 138, which may output a variable press1. The flow may continue through various other process blocks 139 and other parameter measurement blocks 140, resulting in an overall plant output 142 which may be the desired plant output. It may be seen that numerous processes may occur between the output of parameter flow1 and the plant output 142. Additionally, other plant outputs such as press1 and temp1 may occur at different stages in the process. This may result in delays between a measured parameter and an effect on the plant output. The delays associated with one or more parameters in a data set may be considered a variance in the time scale for the data set. In one embodiment, adjustments for these delays may be made by reconciling the data to homogenize the time scale of the data set, as described below.

Figure 14:
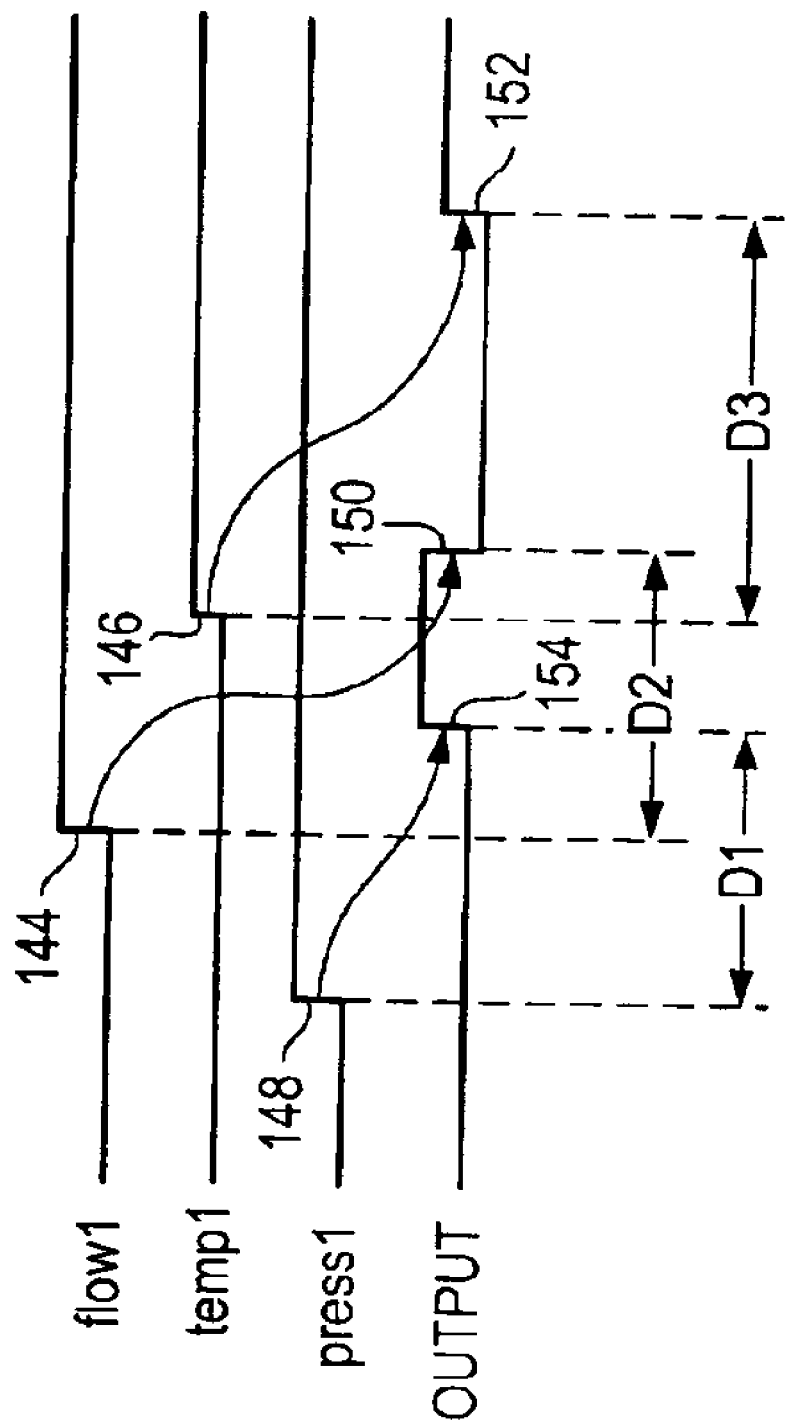
FIG. 14 illustrates a diagrammatic view of the relationship between the various plant parameters and the plant output, according to one embodiment.

FIG. 14 is a timing diagram illustrating the various effects of the output variables from the plant and the plant output, according to one embodiment. The output variable flow1 may experience a change at a point 144. Similarly, the output variable temp1 may experience a change at a point 146, and the variable press1 may experience a change at a point 148. However, the corresponding change in the output may not be time synchronous with the changes in the variables. Referring to the line labeled OUTPUT, changes in the plant output may occur at points 150, 152 and 154, for the respective changes in the variables at points 144–148, respectively. The change between points 144 and 150 and the variable flow1 and the output, respectively, may experience a delay D2. The change in the output of point 152 associated with the change in the variable temp1 may occur after delay D3. Similarly, the change in the output of point 154 associated with the change in the variable press1 may occur after a delay of D1. In accordance with one embodiment of the present invention, these delays may be accounted for during training, and/or during the run-time operation.

Figure 15:
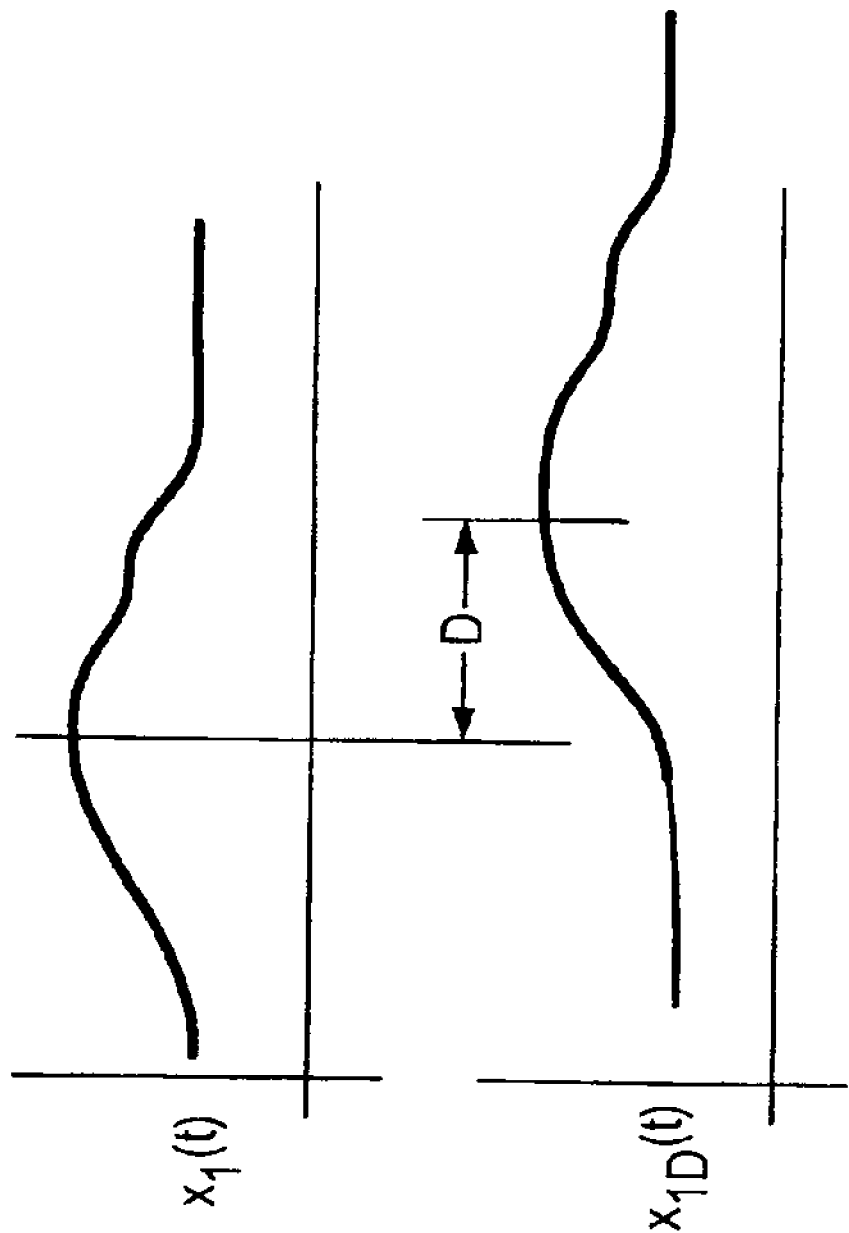
FIG. 15 illustrates a diagrammatic view of the delay provided for input data patterns, according to one embodiment.

FIG. 15 is a diagrammatic view of the delay for a given input variable $x_1(t)$, according to one embodiment. It may be seen that a delay D is introduced to the system to provide an output $x_{1D}(t)$ such that $x_{1D}(t)=x_1(t-D)$, this output may then be input to the support vector machine. As such, the measured plant variables may now coincide in time with the actual effect that is realized in the measured output such that, during training, a system model may be trained with a more accurate representation of the system.

Figure 16:
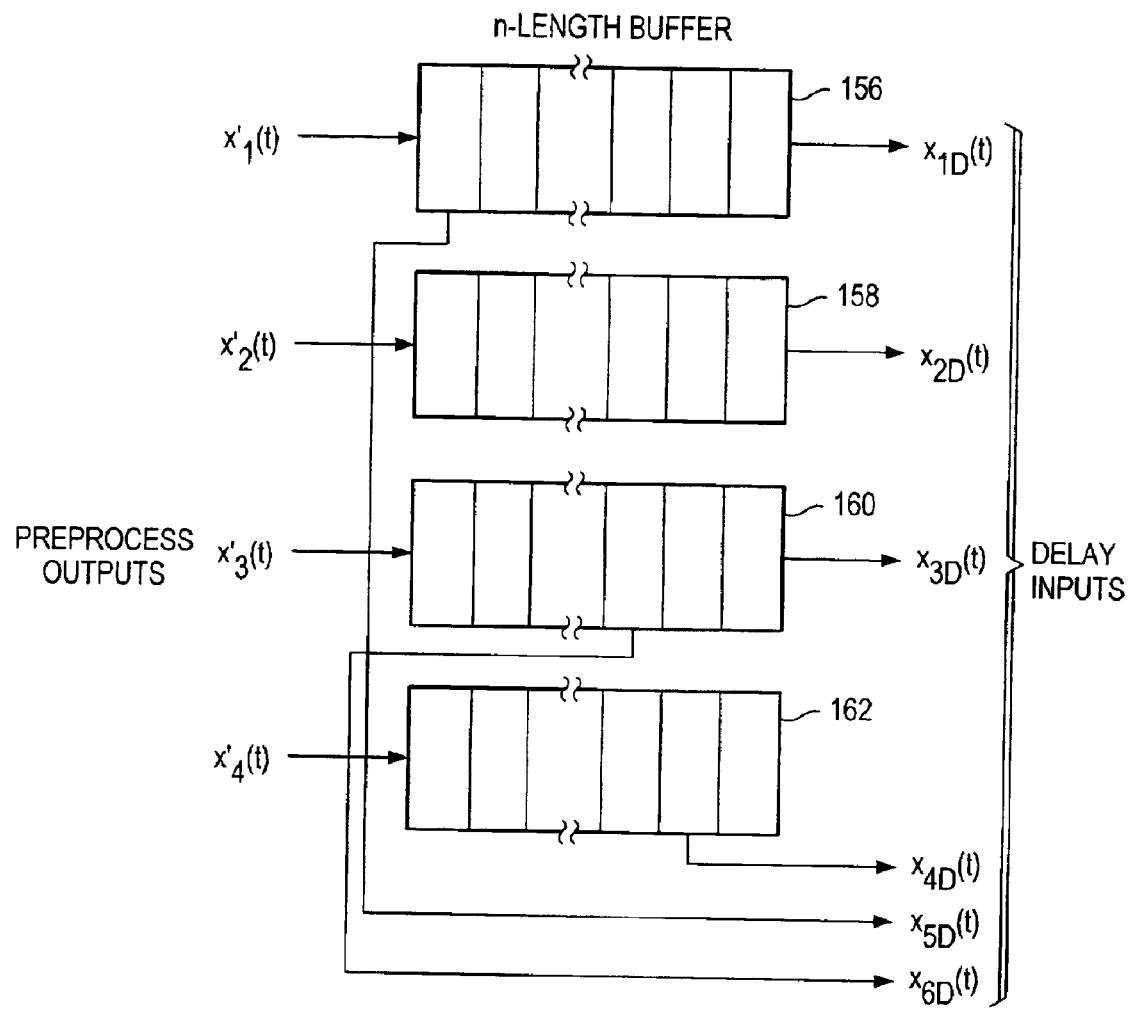
FIG. 16 illustrates a diagrammatic view of the buffer formation for each of the inputs and the method for generating the delayed input, according to one embodiment.

FIG. 16 is a diagrammatic view of the method for implementing the delay, according to one embodiment. Rather than providing an additional set of data for each delay that is desired, $x(t+\tau)$, variable length buffers may be provided in each data set after preprocessing, the length of which may correspond to the longest delay. Multiple taps may be provided in each of the buffers to allow various delays to be selected. In FIG. 16, there are illustrated four buffers 156, 158, 160 and 162, associated with the preprocessed inputs $x'_1(t)$, $x'_2(t)$, $x'_3(t)$, and $x'_4(t)$. Each of the buffers has a length of N, such that the first buffer outputs the delay input $x_{1D}(t)$, the second buffer 158 outputs the delay input $x_{2D}(t)$, and the third buffer 160 outputs the delay input $x_{3D}(t)$. The buffer 162, on the other hand, has a delay tap that may provide for a delay of "n−1" to provide an output $x_{4D}(t)$. An output $x_{5D}(t)$ may be provided by selecting the first tap in the buffer 156 such that the relationship $x_{5D}(t)=x'_1(t+1)$. Additionally, the delayed input $x_{6D}(t)$ may be selected as a tap output of the buffer 160 with a value of $\tau=2$. This may result in the overall delay inputs to the training model 20. Additionally, these delays may be stored as delay settings for use during the run-time.

FIG. 17 illustrates one embodiment of a display that may be provided to the operator for selecting the various delays to be applied to the input variables and the output variables utilized in training. In this example, it may be seen that by selecting a delay for the variable temp1 of −4.0, −3.5, and −3.0, three separate input variables have been selected for input to the training model 20. Additionally, three separate outputs are shown as selected, one for delay 0.0, one for a delay 0.5, and one for a delay of 1.0 to predict present and future values of the variable. Each of these may be processed to vary the absolute value of the delays associated with the input variables. It may therefore be seen that a maximum buffer of −4.0 for an output of 0.0 may be needed in order to provide for the multiple taps. Further, it may be seen that it is not necessary to completely replicate the data in any of the delayed variable columns as a separate column, thus increasing the amount of memory utilized.

Figure 18:
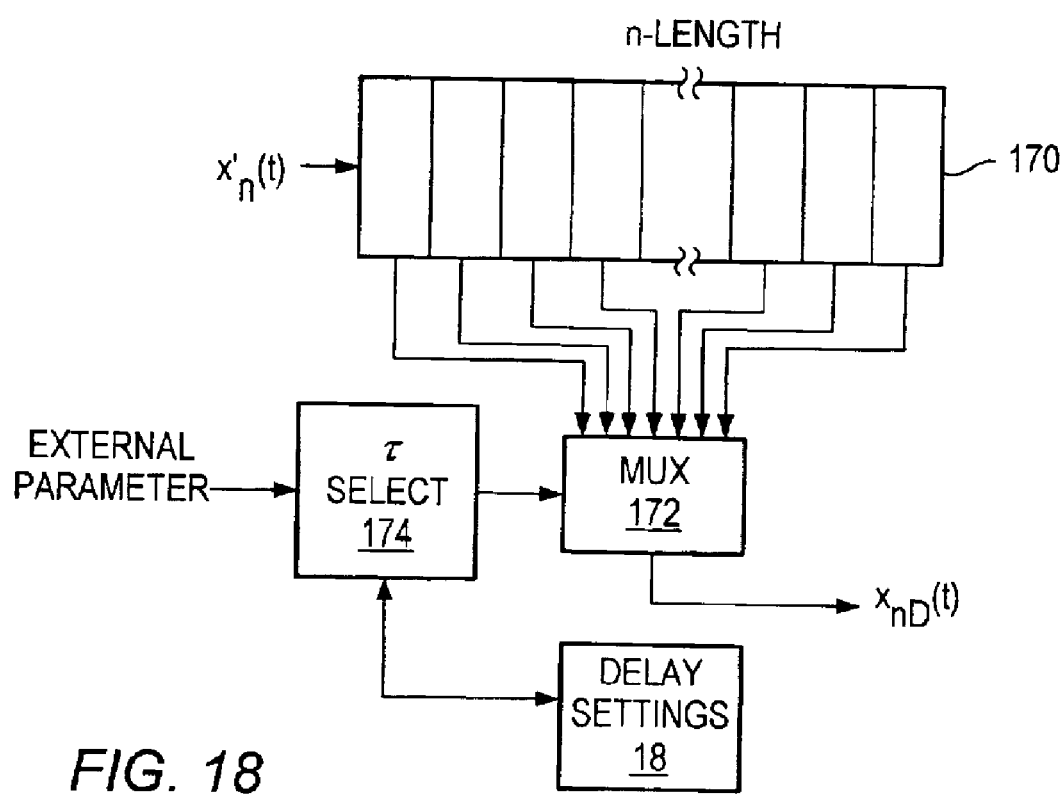
FIG. 18 is a block diagram for a variable delay selection, according to one embodiment.

FIG. 18 is a block diagram of one embodiment of a system for generating process dependent delays. A buffer 170 is illustrated having a length of N, which may receive an input variable $x'_n(t)$ from the preprocessor 12 to provide on the output thereof an output $x_{nD}(t)$ as a delayed input to the training model 20. A multiplexer 172 may be provided which has multiple inputs, one from each of the n buffer registers with a τ-select circuit 174 provided for selecting which of the taps to output. The value of τ may be a function of other variables parameters such as temperature, pressure, flow rates, etc. For example, it may be noted empirically that the delays are a function of temperature. As such, the temperature relationship may be placed in the block 174 and then the external parameters input and the value of τ utilized to select the various taps input to the multiplexer 172 for output therefrom as a delay input. The system of FIG. 18 may also be utilized in the run-time operation wherein the various delay settings and functional relationships of the delay with respect to the external parameters are stored in the storage area 18. The external parameters may then be measured and the value of τ selected as a function of this temperature and the functional relationship provided by the information stored in the storage area 18. This is to be compared with the training operation wherein this information is externally input to the system. For example, with reference to FIG. 17, it may be noticed that all of the delays for the variable temp1 may be shifted up by a value of 0.5 when the temperature reached a certain point. With the use of the multiple taps, as described with respect to FIGS. 16 and 18, it may only be necessary to vary the value of the control input to the multiplexers 172 associated with each of the variables, it being understood that in the example of FIG. 17, three multiplexers 172 would be required for the variable temp1, since there are three separate input variables.

Figure 19:
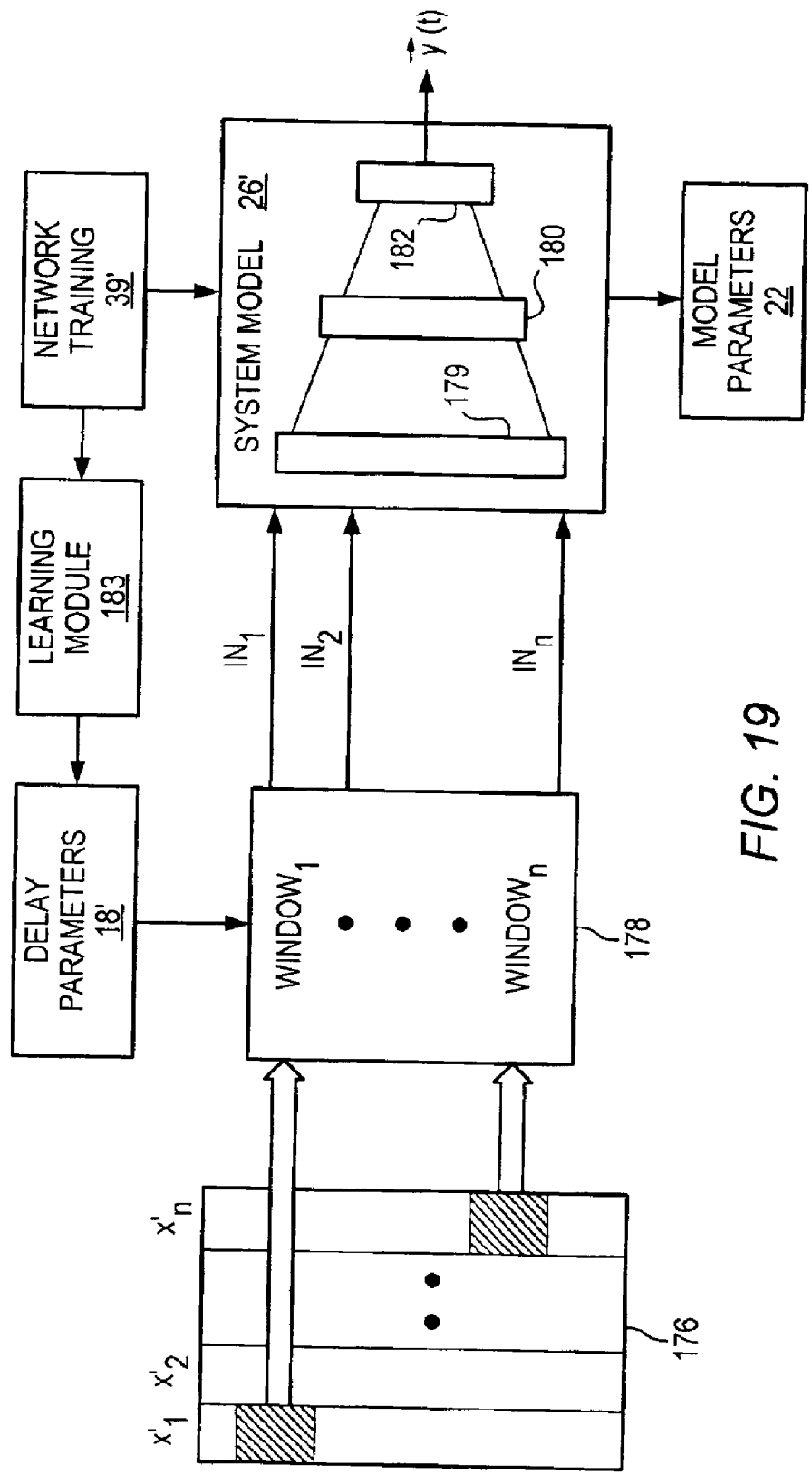
FIG. 19 is a block diagram of the adaptive determination of the delay, according to one embodiment.

FIG. 19 is a block diagram of one embodiment of a preprocessing system for setting delay parameters, where the delay parameters may be learned. For simplicity, the preprocessing system is not illustrated; rather, a table 176 of the preprocess data is shown. Further, the methods for achieving the delay may differ somewhat, as described below. The delay may be achieved by a time delay adjustor 178, which may utilize the stored parameters in a delayed parameter block 18'. The delay parameter block 18' is similar to the delay setting block 18, with the exception that absolute delays are not contained therein. Rather, information relating to a window of data may be stored in the delay parameter block 18'. The time delay adjustor 178 may be operable to select a window of data within each set of data in the table 176, the data labeled $x'_1$ through $x'_n$. The time delay adjustor 178 may be operable to receive data within a defined window associated with each of the sets of data $x'_1$–$x'_n$ and convert this information into a single value for output therefrom as an input value $IN_1$–$IN_n$. These may be directly input to a system model 26', which system model 26' is similar to the run-time system model 26 and the training model 20 in that it is realized with a non-linear model (e.g., a support vector machine). The non-linear model is illustrated as having an input layer 179, a middle layer 180 and an output layer 182. The middle layer 180 may be operable to map the input layer 179 to the output layer 182, as described below. However, note that this is a non-linear mapping function. By comparison, the time delay adjustor 178 may be operable to linearly map each of sets of data $x'_1$–$x'_n$ in the table 176 to the input layer 179. This mapping function may be dependent upon the delay parameters in the delay parameter block 18'. As described below, these parameters may be learned under the control of a learning module 183, which learning module 183 may be controlled during the support vector machine training in the training mode. It is similar to that described above with respect to FIG. 4.

During learning, the learning module 183 may be operable to control both the time delay adjustor block 178 and the delay parameter block 18' to change the values thereof in training of the system model 26'. During training, target outputs may be input to the output layer 182 and a set of training data input thereto in the form of the chart 176, it being noted that this is already preprocessed in accordance with the operation as described above. The model parameters of the system model 26' stored in the storage area 22 may then be adjusted in accordance with a predetermined training algorithm to minimize the error. However, the error may only be minimized to a certain extent for a given set of delays. Only by setting the delays to their optimum values may the error be minimized to the maximum extent. Therefore, the learning module 183 may be operable to vary the parameters in the delay parameter block 18' that are associated with the timing delay adjustor 178 in order to further minimize the error.

Figure 20:
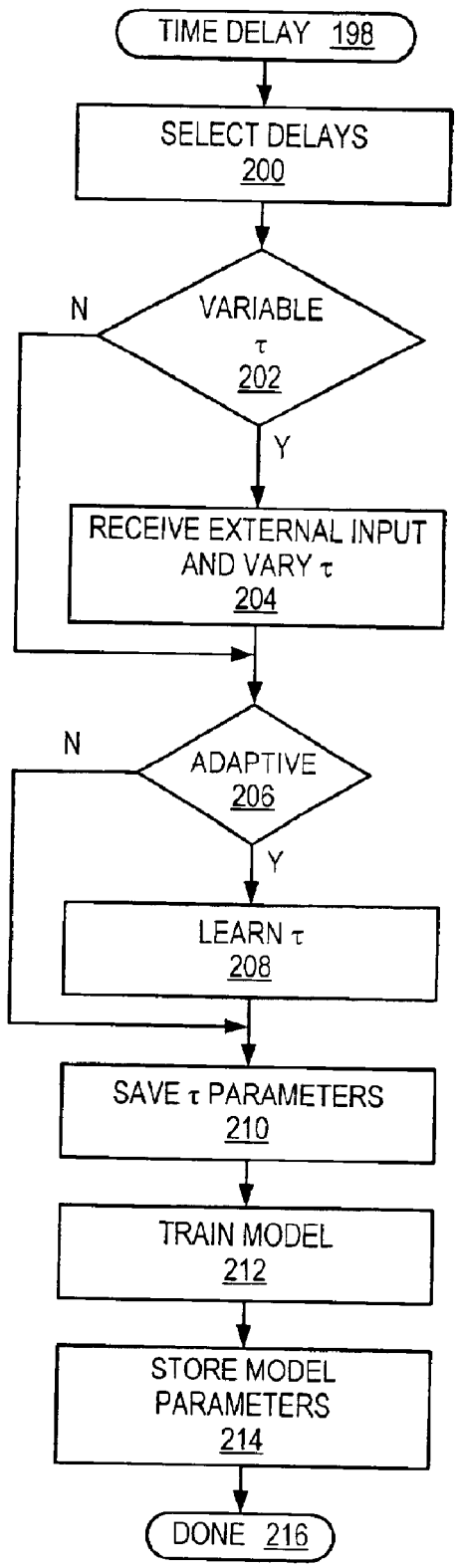
FIG. 20 is a flowchart depicting the time delay operation, according to one embodiment.

FIG. 20 is a flowchart illustrating the determination of time delays for the training operation, according to one embodiment. This flowchart may be initiated at a time delay block 198 and may then continue to a function block 200 to select the delays. In one embodiment, this may be performed by the operator as described above with respect to FIG. 17. The program may then continue to a decision block 202 to determine whether variable τ are selected. The program may continue along a "Yes" path to a function block 204 to receive an external input and vary the value of τ in accordance with the relationship selected by the operator, this being a manual operation in the training mode. The program may then continue to a decision block 206 to determine whether the value of τ is to be learned by an adaptive algorithm. If variable τ are not selected in the decision block 202, the program may then continue around the function block 204 along the "No" path.

If the value of τ is to be learned adaptively, the program may continue from the decision block 206 to a function block 208 to learn the value of τ adaptively. The program may then proceed to a function block 210 to save the value of τ. If no adaptive learning is required, the program may continue from the decision block 206 along the "No" path to function block 210. After the τ parameters have been determined, the model 20 may be trained, as indicated by a function block 212 and then the parameters may be stored, as indicated by a function block 214. Following storage of the parameters, the program may flow to a DONE block 216.

Figure 21:
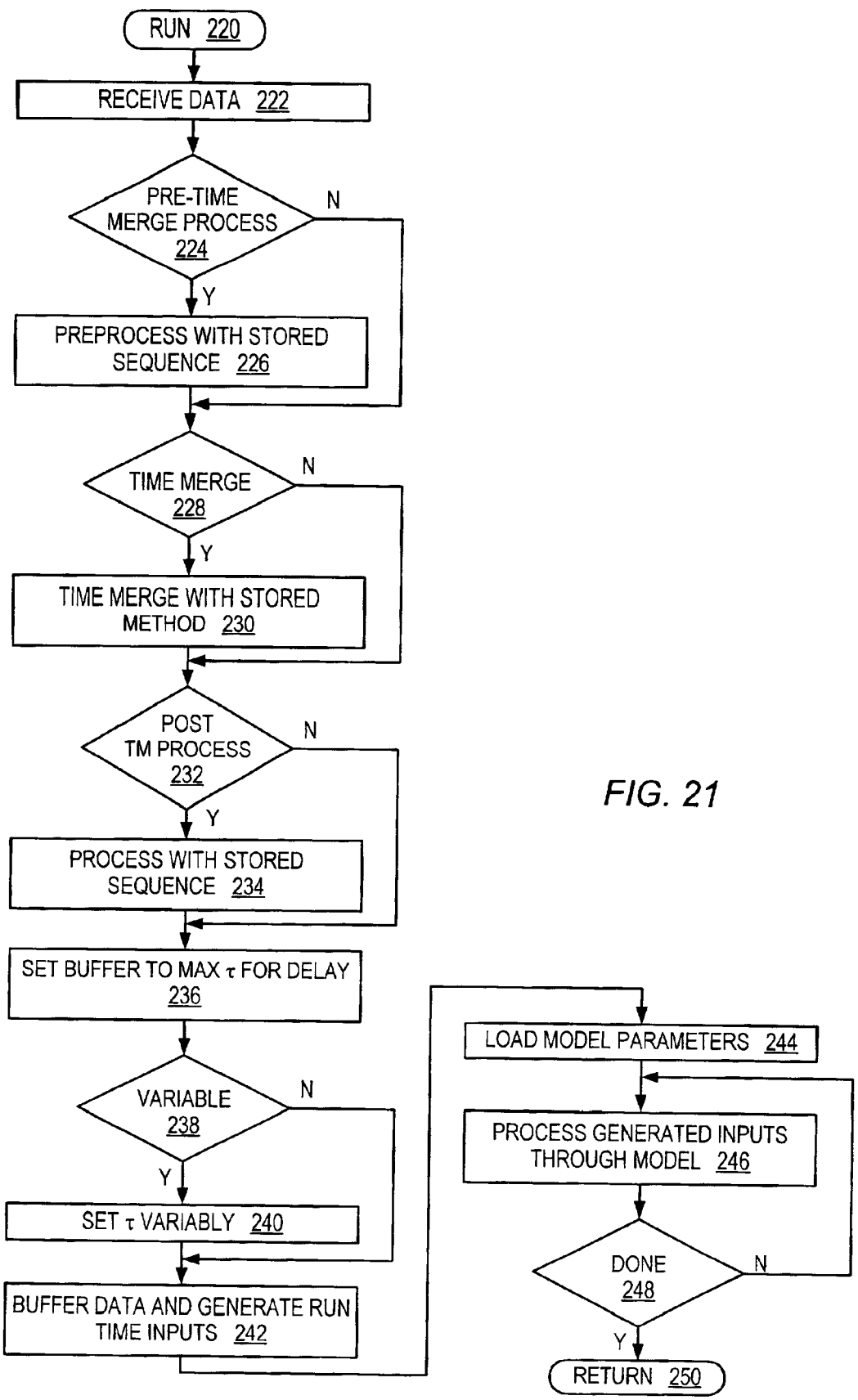
FIG. 21 is a flowchart depicting the run mode operation, according to one embodiment.

FIG. 21 is a flowchart depicting operation of the system in run-time mode, according to one embodiment. The operation may be initiated at a run block 220 and may then proceed to a function block 222 to receive the data and then to a decision block 224 to determine whether the pre-time merge process is to be entered. If so, the program may proceed along a "Yes" path to a function block 226 to preprocess the data with the stored sequence and then to a decision block 228. If not, the program may continue along the "No" path to the input of decision block 228. Decision block 228 may determine whether the time merge operation is to be performed. If so, the program may proceed along the "Yes" path to function block 230 to time merge with the stored method and then to the input of a decision block 232 and, if not, the program may continue along the "No" path to the decision block 232. The decision block 232 may determine whether the post-time merge process is to be performed. If so, the program may proceed along the "Yes" path to a function block 234 to process the data with the stored sequence and then to a function block 236 to set the buffer equal to the maximum τ for the delay. If not, (i.e., if the post-time merge process is not selected), the program may proceed from the decision block 232 along the "No" path to the input of function block 236.

After completion of function block 236, the program may continue to a decision block 238 to determine whether the value of τ is to be varied. If so, the program may proceed to a function block 240 to set the value of τ variably, then to the input of a function block 242 and, if not, the program may continue along the "No" path to function block 242. Function block 242 may be operable to buffer data and generate run-time inputs. The program may then continue to a function block 244 to load the model parameters. The program may then proceed to a function block 246 to process the generated inputs through the model and then to a decision block 248 to determine whether all of the data has been processed. If all of the data has not been processed, the program may continue along the "No" path back to the input of function block 246 until all data are processed and then along the "Yes" path to return block 250.

Figure 22:
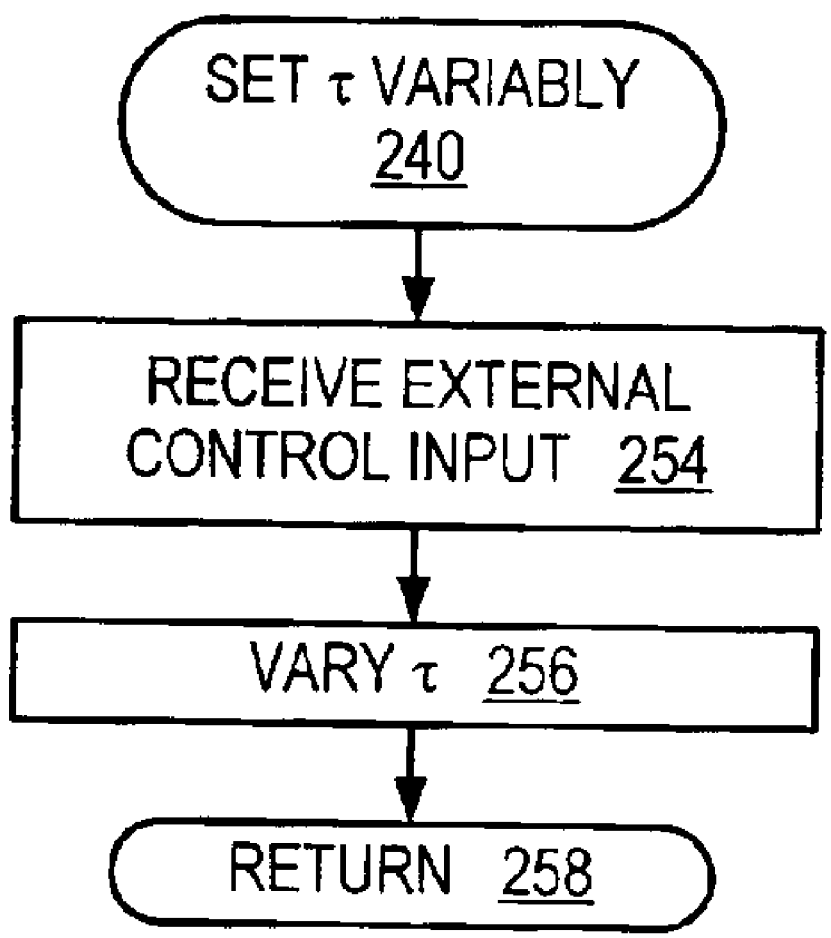
FIG. 22 is a flowchart for setting the value of the variable delay, according to one embodiment.

FIG. 22 is a flowchart for the operation of setting the value of τ variably (i.e., expansion of the function block 240, as illustrated in FIG. 21), according to one embodiment. The operation may be initiated at a block 240, set τ variably, and then may proceed to a function block 254 to receive the external control input. The value of τ may be varied in accordance with the relationship stored in the storage area 14, as indicated by a function block 256. Finally, the operation may proceed to a return function block 258.

Figure 23:
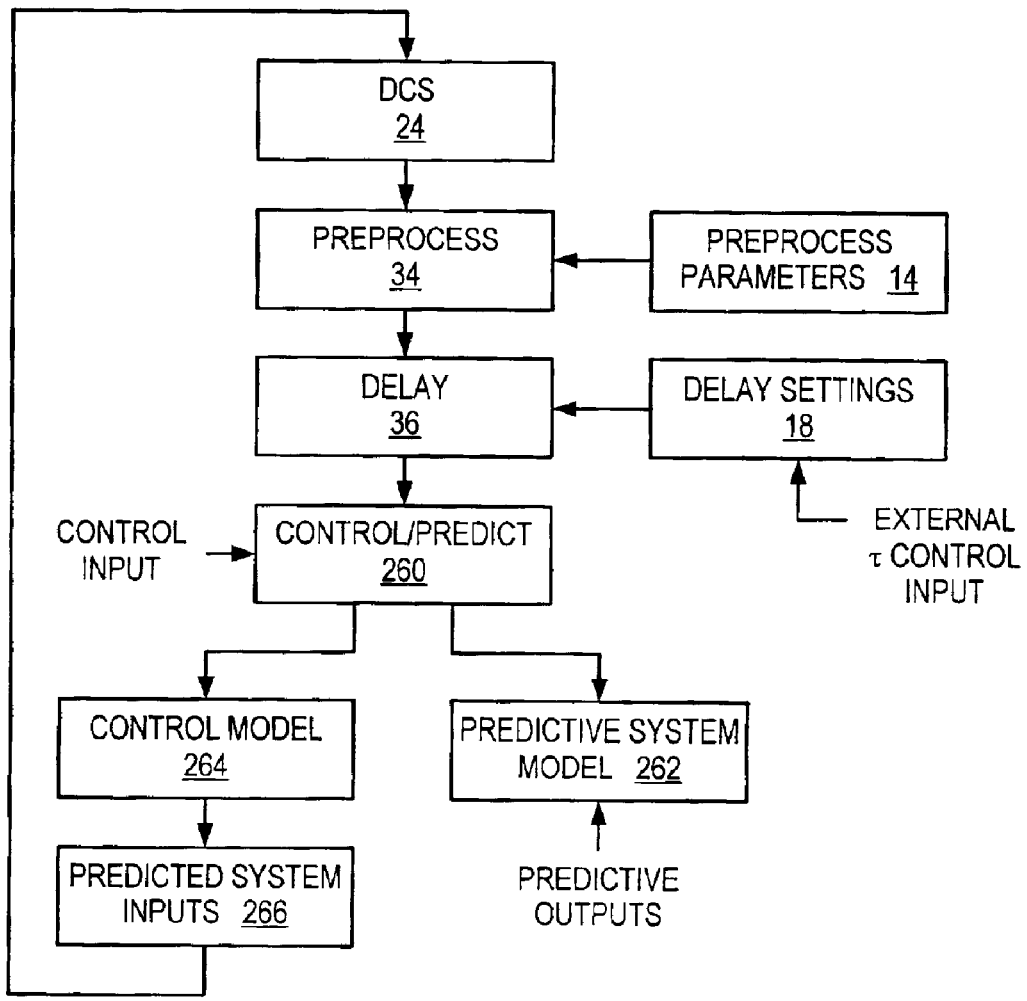
FIG. 23 is a block diagram of the interface of the run-time preprocessor with a distributed control system, according to one embodiment.

FIG. 23 is a simplified block diagram for the overall run-time operation, according to one embodiment. Data may be initially output by the DCS 24 during run-time. The data may then be preprocessed in the preprocess block 34 in accordance with the preprocess parameters stored in the storage area 14. The data may then be delayed in the delay block 36 in accordance with the delay settings set in the delay block 18, this delay block 18 may also receive the external block control input, which may include parameters on which the value of τ depends to provide the variable setting operation that was utilized during the training mode. The output of the delay block 36 may then be input to a selection block 260, which may receive a control input. This selection block 260 may select either a control support vector machine or a prediction support vector machine. A predictive system model 262 may be provided and a control model 264 may be provided, as shown. Both models 262 and 264 may be identical to the training model 20 and may utilize the same parameters; that is, models 262 and 264 may have stored therein a representation of the system that was trained in the training model 20. The predictive system model 262 may provide on the output thereof predictive outputs, and the control model 264 may provide on the output thereof predicted system inputs for the DCS 24. These predicted system inputs may be stored in a block 266 and then may be translated to control inputs to the DCS 24.

In one embodiment of the present invention, a predictive support vector machine may operate in a run-time mode or in a training mode with a data preprocessor for preprocessing the data prior to input to a system model. The predictive support vector machine may include an input layer, an output layer and a middle layer for mapping the input layer to the output layer through a representation of a run-time system. Training data derived from the training system may be stored in a data file, which training data may be preprocessed by a data preprocessor to generate preprocessed training data, which may then be input to the support vector machine and trained in accordance with a predetermined training algorithm. The model parameters of the support vector machine may then be stored in a storage device for use by the data preprocessor in the run-time mode. In the run-time mode, run-time data may be preprocessed by the data preprocessor in accordance with the stored data preprocessing parameters input during the training mode and then this preprocessed data may be input to the support vector machine, which support vector machine may operate in a prediction mode. In the prediction mode, the support vector machine may output a prediction value.

In another embodiment of the present invention, a system for preprocessing data prior to training the model is presented. The preprocessing operation may be operable to provide a time merging of the data such that each set of input data is input to a training system model on a uniform time base. Furthermore, the preprocessing operation may be operable to fill in missing or bad data. Additionally, after preprocessing, predetermined delays may be associated with each of the variables to generate delayed inputs. These delayed inputs may then be input to a training model and the training model may be trained in accordance with a predetermined training algorithm to provide a representation of the system. This representation may be stored as model parameters. Additionally, the preprocessing steps utilized to preprocess the data may be stored as a sequence of preprocessing algorithms and the delay values that may be determined during training may also be stored. A distributed control system may be controlled to process the output parameters therefrom in accordance with the process algorithms and set delays in accordance with the predetermined delay settings. A predictive system model, or a control model, may then be built on the stored model parameters and the delayed inputs input thereto to provide a predicted output. This predicted output may provide for either a predicted output or a predicted control input for the run-time system. It is noted that this technique may be applied to any of a variety of application domains, and is not limited to plant operations and control. It is further noted that the delay described above may be associated with other variables than time. In other words, the delay may refer to offsets in the ordered correlation between process variables according to an independent variable other than time t.

Thus, various embodiments of the systems and methods described above may perform preprocessing of input data for training and/or operation of a support vector machine.

Although the system and method of the present invention have been described in connection with several embodiments, the invention is not intended to be limited to the specific forms set forth herein, but on the contrary, it is intended to cover such alternatives, modifications, and equivalents as may be reasonably included within the spirit and scope of the invention as defined by the appended claims.

What is claimed is:

1. A data preprocessor for preprocessing input data for a support vector machine, wherein the input data include one or more outlier values, comprising:
   an input buffer which is operable to receive and store the input data wherein the input data comprise run-time data;
   a data filter which is operable to detect and remove said one or more outlier values, thereby generating corrected input data, wherein said corrected input data comprise corrected run-time data; and
   an output device for outputting the corrected input data, said corrected input data comprising the input data to the support vector machine;
   wherein the support vector machine comprises a non-linear model having a set of model parameters defining a representation of a system, wherein said model parameters of said support vector machine have been trained to represent said system; and
   wherein the support vector machine is operable to receive said corrected run-time data and generate run-time output data, wherein said run-time output data comprise one or both of control parameters for said system and predictive output information for said system.

2. The data preprocessor of claim 1, wherein the support vector machine comprises a non-linear model having a set of model parameters defining a representation of a system, said model parameters capable of being trained;
  wherein the input data comprise training data, wherein said corrected data comprise corrected training data including corrected target input data and corrected target output data; and
  wherein the support vector machine is operable to be trained according to a predetermined training algorithm applied to said corrected target input data and said corrected target output data to develop model parameter values such that said support vector machine has stored therein a representation of the system that generated the target output data in response to the corrected target input data.

3. The data preprocessor of claim 1, wherein said control parameters are usable to determine control inputs to said system for run-time operation of said system.

4. The data preprocessor of claim 1, wherein the data filter is further operable to replace said one or more outlier values with replacement values, wherein said corrected input includes said replacement values.

5. The data preprocessor of claim 4, wherein the data filter is operable to replace said one or more outlier values using one or more of clipping, interpolation, extrapolation, spline fit, and sample/hold of a last prior value.

6. The data preprocessor of claim 1, further comprising:
  a graphical user interface (GUI) which is operable to receive user input specifying one or more data filtering operations to be performed on said input data, wherein said one or more data filtering operations operate to remove and/or replace said one or more outlier values.

7. The data preprocessor of claim 6, wherein said GUI is further operable to display said input data prior to and after performing said filtering operations on said input data.

8. The data preprocessor of claim 6, wherein said GUI is further operable to receive user input specifying a portion of said input data for said data filtering operations.

9. The data preprocessor of claim 1, wherein the input data comprise a plurality of variables, each of the variables comprising an input variable with an associated set of data wherein each of said variables comprises an input to said input buffer; and
  wherein each of at least a subset of said variables comprises a corresponding one of the inputs to the support vector machine.

10. A system for preprocessing input data for a support vector machine having multiple inputs, each of the inputs associated with a portion of the input data, wherein the input data include one or more outlier values, comprising:
  means for receiving and storing the input data, wherein the input data comprise run-time data;
  means for analyzing said input data to determine said one or more outliers values;
  means for removing said one or more outlier values, thereby generating corrected input data, wherein said corrected input data comprise corrected run-time data; and
  means for outputting the corrected input data, said corrected input data comprising the input data to the support vector machine;
  wherein the support vector machine comprises a non-linear model having a set of model parameters defining a representation of a system, wherein said model parameters of said support vector machine have been trained to represent said system, the system further comprising:
    means for inputting said corrected run-time data into the support vector machine to generate run-time output data, wherein said run-time output data comprise one or both of control parameters for said system and predictive output information for said system.

11. The system of claim 10, wherein the support vector machine comprises a non-linear model having a set of model parameters defining a representation of a system, said model parameters capable of being trained; and
  wherein the input data comprise training data including target input data and target output data, wherein said corrected data comprise corrected training data including corrected target input data and corrected target output data;
  the system further comprising:
    means for training the support vector machine according to a predetermined training algorithm applied to said corrected target input data and said corrected target output data to develop model parameter values such that said support vector machine has stored therein a representation of the system that generated the target output data in response to the target input data.

12. The system of claim 10, wherein said control parameters are usable to determine control inputs to said system for run-time operation of said system.

13. The system of claim 10, further comprising:
  means for replacing said one or more outlier values with replacement values, wherein said corrected input includes said replacement values.

14. The system of claim 13, wherein said replacing said one or more outlier values is performed using one or more of clipping, interpolation, extrapolation, spline fit, and sample/hold of a last prior value.

15. The system of claim 10, further comprising:
  means for receiving user input specifying one or more data filtering operations to be performed on said input data, wherein said analyzing and said removing said one or more outlier values comprises performing said one or more data filtering operations on the input data.

16. The system of claim 10, further comprising:
  means for displaying said input data prior to and after performing said filtering operations on said input data.

17. The system of claim 10, further comprising:
  means for receiving user input specifying a portion of said input data for said data filtering operations.

18. The system of claim 10, wherein the input data comprise a plurality of variables, each of the variables comprising an input variable with an associated set of data wherein each of said variables comprises an input to said input buffer; and
  wherein each of at least a subset of said variables comprises a corresponding one of the inputs to the support vector machine.

19. A carrier medium which stores program instructions for preprocessing input data prior to input to a support vector machine having multiple inputs, each of the inputs associated with a portion of the input data, wherein the input data include one or more outlier values, wherein said program instructions are executable to:
  receive and store the input data, wherein the input data comprise run-time data;
  analyze said input data to determine said one or more outliers values;
  remove said one or more outlier values, thereby generating corrected input data2 wherein said corrected input data comprise corrected run-time data; and output the corrected input data, said corrected input data comprising the input data to the support vector machine, wherein the support vector machine comprises a non-linear model having a set of model parameters defining a representation of a system, wherein said model parameters of said support vector machine have been trained to represent said system, wherein said program instructions are further executable to:

input said corrected run-time data into the support vector machine to generate run-time output data, wherein said run-time output data comprise one or both of control parameters for said system and predictive output information for said system.

20. The carrier medium of claim 19, wherein the support vector machine comprises a non-linear model having a set of model parameters defining a representation of a system, said model parameters capable of being trained; and wherein the input data comprise training data including target input data and target output data, wherein said corrected data comprise corrected training data including corrected target input data and corrected target output data;

wherein said program instructions are further executable to:

train the support vector machine according to a predetermined training algorithm applied to said corrected target input data and said corrected target output data to develop model parameter values such that said support vector machine has stored therein a representation of the system that generated the target output data in response to the target input data.

21. The carrier medium of claim 19, wherein said control parameters are usable to determine control inputs to said system for run-time operation of said system.

22. The carrier medium of claim 19, wherein said program instructions are further executable to:

replace said one or more outlier values with replacement values, wherein said corrected input includes said replacement values.

23. The carrier medium of claim 19, wherein said replacing said one or more outlier values is performed using one or more of clipping, interpolation, extrapolation, spline fit, and sample/hold of a last prior value.

24. The carrier medium of claim 19, wherein said program instructions are further executable to:

receive user input specifying one or more data filtering operations to be performed on said input data, wherein said analyzing and said removing said one or more outlier values comprises performing said one or more data filtering operations on the input data.

25. The carrier medium of claim 19, wherein said program instructions are further executable to:

display said input data prior to and after performing said filtering operations on said input data.

26. The carrier medium of claim 19, wherein said program instructions are further executable to:

receive user input specifying a portion of said input data for said data filtering operations.

27. The carrier medium of claim 26, wherein the input data comprise a plurality of variables, each of the variables comprising an input variable with an associated set of data wherein each of said variables comprises an input to said input buffer; and wherein each of at least a subset of said variables comprises a corresponding one of the inputs to the support vector machine.

28. A method for preprocessing input data prior to input to a support vector machine having multiple inputs, each of the inputs associated with a portion of the input data, wherein the input data include one or more outlier values, the method comprising:

receiving and storing the input data wherein the input data comprise run-time data;

analyzing said input data to determine said one or more outliers values;

removing said one or more outlier values, thereby generating corrected input data1 wherein said corrected input data comprise corrected run-time data; and outputting the corrected input data, said corrected input data comprising the input data to the support vector machine;

wherein the support vector machine comprises a non-linear model having a set of model parameters defining a representation of a system, wherein said model parameters of said support vector machine have been trained to represent said system, the method further comprising:

inputting said corrected run-time data into the support vector machine to generate run-time output data, wherein said run-time output data comprise one or both of control parameters for said system and predictive output information for said system.

29. The method of claim 28, wherein the support vector machine comprises a non-linear model having a set of model parameters defining a representation of a system, said model parameters capable of being trained; and wherein the input data comprise training data including target input data and target output data, wherein said corrected data comprise corrected training data including corrected target input data and corrected target output data;

the method further comprising:

training the support vector machine according to a predetermined training algorithm applied to said corrected target input data and said corrected target output data to develop model parameter values such that said support vector machine has stored therein a representation of the system that generated the target output data in response to the target input data.

30. The method of claim 28, wherein said control parameters are usable to determine control inputs to said system for run-time operation of said system.

31. The method of claim 28, further comprising:

replacing said one or more outlier values with replacement values, wherein said corrected input includes said replacement values.

32. The method of claim 31, wherein said replacing said one or more outlier values is performed using one or more of clipping, interpolation, extrapolation, spine fit, and sample/hold of a last prior value.

33. The method of claim 28, further comprising:

receiving user input specifying one or more data filtering operations to be performed on said input data, wherein said analyzing and said removing said one or more outlier values comprises performing said one or more data filtering operations on the input data.

34. The method of claim 28, further comprising:

displaying said input data prior to and after performing said filtering operations on said input data.

35. The method of claim 28, further comprising:

receiving user input specifying a portion of said input data for said data filtering operations.

36. The method of claim 28, wherein the input data comprise a plurality of variables, each of the variables comprising an input variable with an associated set of data wherein each of said variables comprises an input to said input buffer; and wherein each of at least a subset of said variables comprises a corresponding one of the inputs to the support vector machine.

* * * * *